US012050286B2

(12) United States Patent
Feru et al.

(10) Patent No.: US 12,050,286 B2
(45) Date of Patent: Jul. 30, 2024

(54) HYPER TEMPORAL LIDAR WITH DYNAMIC SHOT SCHEDULING USING A LASER ENERGY MODEL

(71) Applicant: AEYE, Inc., Dublin, CA (US)

(72) Inventors: Philippe Feru, Dublin, CA (US); Luis Dussan, Dublin, CA (US); Joel Benscoter, Dublin, CA (US); Il Woong Jung, Dublin, CA (US); Alex Liang, Dublin, CA (US); Igor Polishchuk, Dublin, CA (US); Allan Steinhardt, Dublin, CA (US)

(73) Assignee: AEye, Inc., Dublin, CA (US)

( * ) Notice: Subject to any disclaimer, the term of this patent is extended or adjusted under 35 U.S.C. 154(b) by 0 days.

(21) Appl. No.: 18/134,222

(22) Filed: Apr. 13, 2023

(65) Prior Publication Data
US 2023/0251355 A1    Aug. 10, 2023

Related U.S. Application Data

(63) Continuation of application No. 17/482,811, filed on Sep. 23, 2021, now Pat. No. 11,630,188.
(Continued)

(51) Int. Cl.
*G01S 7/481*    (2006.01)
*G01S 7/484*    (2006.01)
(Continued)

(52) U.S. Cl.
CPC .......... *G01S 7/4817* (2013.01); *G01S 7/4814* (2013.01); *G01S 7/484* (2013.01); *G01S 17/10* (2013.01); *G01S 17/931* (2020.01)

(58) Field of Classification Search
CPC ...... G01S 17/10; G01S 17/931; G01S 7/4814; G01S 7/4817; G01S 7/484
See application file for complete search history.

(56) References Cited

U.S. PATENT DOCUMENTS

| 4,017,146 A | 4/1977 | Lichtman |
| 4,579,430 A | 4/1986 | Bille |

(Continued)

FOREIGN PATENT DOCUMENTS

| CN | 1424591 A | 6/2003 |
| CN | 102023082 A | 4/2011 |

(Continued)

OTHER PUBLICATIONS

"Compressed Sensing," Wikipedia, 2019, downloaded Jun. 22, 2019 from https://en.wikipedia.org/wiki/Compressed_sensing, 16 pgs.
(Continued)

*Primary Examiner* — Eric L Bolda
(74) *Attorney, Agent, or Firm* — Ahmann Kloke LLP

(57) ABSTRACT

A lidar system that includes a laser source and a scannable mirror can also include a circuit that schedules a variable rate firing of a plurality of upcoming laser pulse shots by the laser source using a laser energy model as compared to a plurality of energy requirements applicable to the upcoming laser pulse shots, and wherein the laser energy model takes into consideration a retention of energy in the laser source after the upcoming laser pulse shots are fired and quantitatively predicts available energy amounts for the upcoming laser pulse shots from the laser source based on a history of prior laser pulse shots by the laser source. The laser energy model is capable of modeling the energy available for laser pulse shots in the laser source over very short time intervals (such as 10-100 nanoseconds).

20 Claims, 23 Drawing Sheets

Related U.S. Application Data

(60) Provisional application No. 63/166,475, filed on Mar. 26, 2021.

(51) Int. Cl.
*G01S 17/10* (2020.01)
*G01S 17/931* (2020.01)

(56) References Cited

U.S. PATENT DOCUMENTS

| | | |
|---|---|---|
| 4,888,785 A | 12/1989 | Lee |
| 4,907,337 A | 3/1990 | Krusi |
| 5,408,351 A | 4/1995 | Huang |
| 5,552,893 A | 9/1996 | Akasu |
| 5,596,600 A | 1/1997 | Dimos et al. |
| 5,625,644 A | 4/1997 | Myers |
| 5,638,164 A | 6/1997 | Landau |
| 5,808,775 A | 9/1998 | Inagaki et al. |
| 5,815,250 A | 9/1998 | Thomson et al. |
| 5,831,719 A | 11/1998 | Berg et al. |
| 5,870,181 A | 2/1999 | Andressen |
| 6,031,601 A | 2/2000 | McCusker et al. |
| 6,205,275 B1 | 3/2001 | Melville |
| 6,245,590 B1 | 6/2001 | Wine et al. |
| 6,288,816 B1 | 9/2001 | Melville et al. |
| 6,330,523 B1 | 12/2001 | Kacyra et al. |
| 6,339,604 B1 | 1/2002 | Smart |
| 6,704,619 B1 | 3/2004 | Coleman et al. |
| 6,748,180 B2 | 6/2004 | Feng |
| 6,836,320 B2 | 12/2004 | Deflumere et al. |
| 6,847,462 B1 | 1/2005 | Kacyra et al. |
| 6,926,227 B1 | 8/2005 | Young et al. |
| 7,038,608 B1 | 5/2006 | Gilbert |
| 7,206,063 B2 | 4/2007 | Anderson et al. |
| 7,236,235 B2 | 6/2007 | Dimsdale |
| 7,397,019 B1 | 7/2008 | Byars et al. |
| 7,436,494 B1 | 10/2008 | Kennedy et al. |
| 7,532,311 B2 | 5/2009 | Henderson et al. |
| 7,539,231 B1 | 5/2009 | Honea et al. |
| 7,701,558 B2 | 4/2010 | Walsh et al. |
| 7,800,736 B2 | 9/2010 | Pack et al. |
| 7,878,657 B2 | 2/2011 | Hajjar |
| 7,894,044 B1 | 2/2011 | Sullivan |
| 7,944,548 B2 | 5/2011 | Eaton |
| 8,072,663 B2 | 12/2011 | O'Neill et al. |
| 8,081,301 B2 | 12/2011 | Stann et al. |
| 8,120,754 B2 | 2/2012 | Kaehler |
| 8,228,579 B2 | 7/2012 | Sourani |
| 8,427,657 B2 | 4/2013 | Milanovi |
| 8,635,091 B2 | 1/2014 | Amigo et al. |
| 8,681,319 B2 | 3/2014 | Tanaka et al. |
| 8,896,818 B2 | 11/2014 | Walsh et al. |
| 9,069,061 B1 | 6/2015 | Harwit |
| 9,085,354 B1 | 7/2015 | Peeters et al. |
| 9,128,190 B1 | 9/2015 | Ulrich et al. |
| 9,261,881 B1 | 2/2016 | Ferguson et al. |
| 9,278,689 B1 | 3/2016 | Delp |
| 9,285,477 B1 | 3/2016 | Smith et al. |
| 9,305,219 B2 | 4/2016 | Ramalingam et al. |
| 9,315,178 B1 | 4/2016 | Ferguson et al. |
| 9,336,455 B1 | 5/2016 | Withers et al. |
| 9,360,554 B2 | 6/2016 | Retterath et al. |
| 9,383,753 B1 | 7/2016 | Templeton et al. |
| 9,437,053 B2 | 9/2016 | Jenkins et al. |
| 9,516,244 B2 | 12/2016 | Borowski |
| 9,575,184 B2 | 2/2017 | Gilliland et al. |
| 9,581,967 B1 | 2/2017 | Krause |
| 9,651,417 B2 | 5/2017 | Shpunt et al. |
| 9,679,367 B1 | 6/2017 | Wald et al. |
| 9,841,495 B2 | 12/2017 | Campbell et al. |
| 9,885,778 B2 | 2/2018 | Dussan |
| 9,897,687 B1 | 2/2018 | Campbell et al. |
| 9,897,689 B2 | 2/2018 | Dussan |
| 9,933,513 B2 | 4/2018 | Dussan et al. |
| 9,958,545 B2 | 5/2018 | Eichenholz et al. |
| 10,007,001 B1 | 6/2018 | LaChapelle et al. |
| 10,042,043 B2 | 8/2018 | Dussan |
| 10,042,159 B2 | 8/2018 | Dussan et al. |
| 10,073,166 B2 | 9/2018 | Dussan |
| 10,078,133 B2 | 9/2018 | Dussan |
| 10,088,558 B2 | 10/2018 | Dussan |
| 10,134,280 B1 | 11/2018 | You |
| 10,185,028 B2 | 1/2019 | Dussan et al. |
| 10,209,349 B2 | 2/2019 | Dussan et al. |
| 10,215,848 B2 | 2/2019 | Dussan |
| 10,282,591 B2 | 5/2019 | Lindner et al. |
| 10,379,205 B2 | 8/2019 | Dussan et al. |
| 10,386,464 B2 | 8/2019 | Dussan |
| 10,386,467 B2 | 8/2019 | Dussan et al. |
| 10,495,757 B2 | 12/2019 | Dussan et al. |
| 10,598,788 B1 | 3/2020 | Dussan et al. |
| 10,641,872 B2 | 5/2020 | Dussan et al. |
| 10,641,873 B2 | 5/2020 | Dussan et al. |
| 10,641,897 B1 | 5/2020 | Dussan et al. |
| 10,641,900 B2 | 5/2020 | Dussan et al. |
| 10,642,029 B2 | 5/2020 | Dussan et al. |
| 10,656,252 B1 | 5/2020 | Dussan et al. |
| 10,656,272 B1 | 5/2020 | Dussan et al. |
| 10,656,277 B1 | 5/2020 | Dussan et al. |
| 10,663,596 B2 | 5/2020 | Dussan et al. |
| 10,670,718 B1 | 6/2020 | Dussan et al. |
| 10,754,015 B2 | 8/2020 | Dussan et al. |
| 10,761,196 B2 | 9/2020 | Dussan et al. |
| 10,782,393 B2 | 9/2020 | Dussan et al. |
| 10,797,460 B2 | 10/2020 | Shand |
| 10,908,262 B2 | 2/2021 | Dussan |
| 10,908,265 B2 | 2/2021 | Dussan |
| 10,921,450 B2 | 2/2021 | Dussan et al. |
| 11,002,857 B2 | 5/2021 | Dussan et al. |
| 11,092,676 B2 | 8/2021 | Dussan et al. |
| 11,119,219 B1 | 9/2021 | LaChapelle et al. |
| 11,175,386 B2 | 11/2021 | Dussan et al. |
| 11,300,667 B1 | 4/2022 | Feru et al. |
| 11,442,152 B1 | 9/2022 | Feru et al. |
| 11,448,734 B1 | 9/2022 | Feru et al. |
| 11,460,552 B1 | 10/2022 | Feru et al. |
| 11,460,553 B1 | 10/2022 | Feru et al. |
| 11,460,556 B1 | 10/2022 | Feru et al. |
| 11,467,263 B1 | 10/2022 | Greene et al. |
| 11,474,212 B1 | 10/2022 | Feru et al. |
| 11,474,213 B1 | 10/2022 | Feru et al. |
| 11,474,214 B1 | 10/2022 | Greene et al. |
| 11,480,680 B2 | 10/2022 | Reddy et al. |
| 11,486,977 B2 | 11/2022 | Greene et al. |
| 11,493,610 B2 | 11/2022 | Feru et al. |
| 11,500,093 B2 | 11/2022 | Dussan et al. |
| 11,604,264 B2 | 3/2023 | Benscoter et al. |
| 11,619,740 B2 | 4/2023 | Reddy et al. |
| 11,630,188 B1 | 4/2023 | Feru et al. |
| 11,635,495 B1 | 4/2023 | Benscoter et al. |
| 11,675,059 B2 | 6/2023 | Feru et al. |
| 11,686,845 B2 | 6/2023 | Reddy et al. |
| 11,686,846 B2 | 6/2023 | Reddy et al. |
| 2002/0039391 A1 | 4/2002 | Wang et al. |
| 2002/0176067 A1 | 11/2002 | Charbon |
| 2003/0122687 A1 | 7/2003 | Trajkovic et al. |
| 2003/0151542 A1 | 8/2003 | Steinlechner et al. |
| 2003/0156658 A1 | 8/2003 | Dartois |
| 2004/0156336 A1 | 8/2004 | McFarland et al. |
| 2005/0024595 A1 | 2/2005 | Suzuki |
| 2005/0057654 A1 | 3/2005 | Byren |
| 2005/0216237 A1 | 9/2005 | Adachi et al. |
| 2006/0007362 A1 | 1/2006 | Lee et al. |
| 2006/0176468 A1 | 8/2006 | Anderson et al. |
| 2006/0176913 A1 | 8/2006 | Souhaite et al. |
| 2006/0197936 A1 | 9/2006 | Liebman et al. |
| 2006/0227315 A1 | 10/2006 | Beller |
| 2006/0265147 A1 | 11/2006 | Yamaguchi et al. |
| 2007/0024956 A1 | 2/2007 | Coyle |
| 2008/0136626 A1 | 6/2008 | Hudson et al. |
| 2008/0159591 A1 | 7/2008 | Ruedin |
| 2008/0231494 A1 | 9/2008 | Galati |
| 2009/0059201 A1 | 3/2009 | Willner et al. |
| 2009/0128864 A1 | 5/2009 | Inage |

(56) References Cited

U.S. PATENT DOCUMENTS

| | | |
|---|---|---|
| 2009/0242468 A1 | 10/2009 | Corben et al. |
| 2009/0279156 A1 | 11/2009 | Yen et al. |
| 2009/0279577 A1 | 11/2009 | McCarthy |
| 2009/0292468 A1 | 11/2009 | Wu et al. |
| 2009/0318815 A1 | 12/2009 | Barnes et al. |
| 2010/0027602 A1 | 2/2010 | Abshire et al. |
| 2010/0053715 A1 | 3/2010 | O'Neill et al. |
| 2010/0165322 A1 | 7/2010 | Kane et al. |
| 2010/0204964 A1 | 8/2010 | Pack et al. |
| 2011/0066262 A1 | 3/2011 | Kelly et al. |
| 2011/0085155 A1 | 4/2011 | Stann et al. |
| 2011/0127404 A1 | 6/2011 | Yen |
| 2011/0149268 A1 | 6/2011 | Marchant et al. |
| 2011/0149360 A1 | 6/2011 | Sourani |
| 2011/0153367 A1 | 6/2011 | Amigo et al. |
| 2011/0260036 A1 | 10/2011 | Baraniuk et al. |
| 2011/0282622 A1 | 11/2011 | Canter |
| 2011/0317147 A1 | 12/2011 | Campbell et al. |
| 2012/0038817 A1 | 2/2012 | McMackin et al. |
| 2012/0038903 A1 | 2/2012 | Weimer et al. |
| 2012/0044093 A1 | 2/2012 | Pala |
| 2012/0044476 A1 | 2/2012 | Earhart et al. |
| 2012/0236379 A1 | 9/2012 | da Silva et al. |
| 2012/0249996 A1 | 10/2012 | Tanaka et al. |
| 2012/0257186 A1 | 10/2012 | Rieger et al. |
| 2013/0050676 A1 | 2/2013 | d'Aligny |
| 2013/0177032 A1 | 7/2013 | Berendt |
| 2014/0021354 A1 | 1/2014 | Gagnon et al. |
| 2014/0078514 A1 | 3/2014 | Zhu |
| 2014/0201126 A1 | 7/2014 | Zadeh et al. |
| 2014/0211194 A1 | 7/2014 | Pacala et al. |
| 2014/0218791 A1 | 8/2014 | Desbiens et al. |
| 2014/0291491 A1 | 10/2014 | Shpunt et al. |
| 2014/0300732 A1 | 10/2014 | Friend et al. |
| 2014/0350836 A1 | 11/2014 | Stettner et al. |
| 2015/0006616 A1 | 1/2015 | Walley et al. |
| 2015/0046078 A1 | 2/2015 | Biess et al. |
| 2015/0081211 A1 | 3/2015 | Zeng et al. |
| 2015/0269439 A1 | 9/2015 | Versace et al. |
| 2015/0285625 A1 | 10/2015 | Deane |
| 2015/0304634 A1 | 10/2015 | Karvounis |
| 2015/0331113 A1 | 11/2015 | Stettner et al. |
| 2015/0334371 A1 | 11/2015 | Galera et al. |
| 2015/0369920 A1 | 12/2015 | Setono et al. |
| 2015/0378011 A1 | 12/2015 | Owechko |
| 2015/0378187 A1 | 12/2015 | Heck et al. |
| 2016/0003946 A1 | 1/2016 | Gilliland et al. |
| 2016/0005229 A1 | 1/2016 | Lee et al. |
| 2016/0041266 A1 | 2/2016 | Smits |
| 2016/0047895 A1 | 2/2016 | Dussan |
| 2016/0047896 A1 | 2/2016 | Dussan |
| 2016/0047897 A1 | 2/2016 | Dussan |
| 2016/0047898 A1 | 2/2016 | Dussan |
| 2016/0047899 A1 | 2/2016 | Dussan |
| 2016/0047900 A1 | 2/2016 | Dussan |
| 2016/0047903 A1 | 2/2016 | Dussan |
| 2016/0054735 A1 | 2/2016 | Switkes et al. |
| 2016/0146595 A1 | 5/2016 | Boufounos et al. |
| 2016/0274589 A1 | 9/2016 | Templeton et al. |
| 2016/0293647 A1 | 10/2016 | Lin et al. |
| 2016/0313445 A1 | 10/2016 | Bailey et al. |
| 2016/0379094 A1 | 12/2016 | Mittal et al. |
| 2017/0003392 A1 | 1/2017 | Bartlett et al. |
| 2017/0043771 A1 | 2/2017 | Ibanez-Guzman et al. |
| 2017/0158239 A1 | 6/2017 | Dhome et al. |
| 2017/0199280 A1 | 7/2017 | Nazemi et al. |
| 2017/0205873 A1 | 7/2017 | Shpunt et al. |
| 2017/0211932 A1 | 7/2017 | Zadravec et al. |
| 2017/0219695 A1 | 8/2017 | Hall et al. |
| 2017/0234973 A1 | 8/2017 | Axelsson |
| 2017/0242102 A1 | 8/2017 | Dussan et al. |
| 2017/0242103 A1 | 8/2017 | Dussan |
| 2017/0242104 A1 | 8/2017 | Dussan |
| 2017/0242105 A1 | 8/2017 | Dussan et al. |
| 2017/0242106 A1 | 8/2017 | Dussan et al. |
| 2017/0242107 A1 | 8/2017 | Dussan et al. |
| 2017/0242108 A1 | 8/2017 | Dussan et al. |
| 2017/0242109 A1 | 8/2017 | Dussan et al. |
| 2017/0263048 A1 | 9/2017 | Glaser et al. |
| 2017/0269197 A1 | 9/2017 | Hall et al. |
| 2017/0269198 A1 | 9/2017 | Hall et al. |
| 2017/0269209 A1 | 9/2017 | Hall et al. |
| 2017/0269215 A1 | 9/2017 | Hall et al. |
| 2017/0307876 A1 | 10/2017 | Dussan et al. |
| 2018/0031703 A1 | 2/2018 | Ngai et al. |
| 2018/0075309 A1 | 3/2018 | Sathyanarayana et al. |
| 2018/0088214 A1 | 3/2018 | O'Keeffe |
| 2018/0088236 A1 | 3/2018 | Eichenholz et al. |
| 2018/0113200 A1 | 4/2018 | Steinberg et al. |
| 2018/0120436 A1 | 5/2018 | Smits |
| 2018/0143300 A1 | 5/2018 | Dussan |
| 2018/0143324 A1 | 5/2018 | Keilaf et al. |
| 2018/0188355 A1 | 7/2018 | Bao et al. |
| 2018/0224533 A1 | 8/2018 | Dussan et al. |
| 2018/0238998 A1 | 8/2018 | Dussan et al. |
| 2018/0239000 A1 | 8/2018 | Dussan et al. |
| 2018/0239001 A1 | 8/2018 | Dussan et al. |
| 2018/0239004 A1 | 8/2018 | Dussan et al. |
| 2018/0239005 A1 | 8/2018 | Dussan et al. |
| 2018/0284234 A1 | 10/2018 | Curatu |
| 2018/0284278 A1 | 10/2018 | Russell et al. |
| 2018/0284279 A1 | 10/2018 | Campbell et al. |
| 2018/0299534 A1 | 10/2018 | LaChapelle et al. |
| 2018/0306927 A1 | 10/2018 | Slutsky et al. |
| 2018/0341103 A1 | 11/2018 | Dussan et al. |
| 2018/0372870 A1 | 12/2018 | Puglia |
| 2019/0018119 A1 | 1/2019 | Laifenfeld et al. |
| 2019/0025407 A1 | 1/2019 | Dussan |
| 2019/0056497 A1 | 2/2019 | Pacala et al. |
| 2019/0086514 A1 | 3/2019 | Dussan et al. |
| 2019/0086522 A1 | 3/2019 | Kubota et al. |
| 2019/0086550 A1 | 3/2019 | Dussan et al. |
| 2019/0097393 A1 | 3/2019 | Moench et al. |
| 2019/0101628 A1 | 4/2019 | Roger et al. |
| 2019/0107606 A1 | 4/2019 | Russell et al. |
| 2019/0154832 A1 | 5/2019 | Maleki et al. |
| 2019/0179026 A1 | 6/2019 | England et al. |
| 2019/0250273 A1 | 8/2019 | Honkanen et al. |
| 2019/0271767 A1 | 9/2019 | Keilaf et al. |
| 2019/0317217 A1 | 10/2019 | Day et al. |
| 2019/0318177 A1 | 10/2019 | Steinberg et al. |
| 2020/0025886 A1 | 1/2020 | Dussan et al. |
| 2020/0025887 A1 | 1/2020 | Dussan et al. |
| 2020/0025923 A1 | 1/2020 | Eichenholz |
| 2020/0041618 A1 | 2/2020 | Pelz et al. |
| 2020/0132818 A1 | 4/2020 | Dussan et al. |
| 2020/0200878 A1 | 6/2020 | Dussan et al. |
| 2020/0209400 A1 | 7/2020 | Dussan et al. |
| 2020/0225324 A1 | 7/2020 | Dussan et al. |
| 2020/0264286 A1 | 8/2020 | Dussan et al. |
| 2020/0333587 A1 | 10/2020 | Dussan et al. |
| 2020/0341146 A1 | 10/2020 | Dussan et al. |
| 2020/0341147 A1 | 10/2020 | Dussan et al. |
| 2020/0386867 A1 | 12/2020 | Darrer et al. |
| 2020/0400788 A1 | 12/2020 | Van Lierop et al. |
| 2021/0003679 A1 | 1/2021 | Dussan et al. |
| 2021/0058592 A1 | 2/2021 | Akanuma |
| 2021/0109197 A1 | 4/2021 | O'Keeffe |
| 2021/0111533 A1 | 4/2021 | Mousavian et al. |
| 2021/0141059 A1 | 5/2021 | Dussan |
| 2021/0247499 A1 | 8/2021 | Zhu et al. |
| 2021/0271072 A1 | 9/2021 | Schroedter et al. |
| 2021/0364611 A1 | 11/2021 | Dussan et al. |
| 2021/0376566 A1 | 12/2021 | Kuo et al. |
| 2022/0026573 A1 | 1/2022 | Baribault et al. |
| 2022/0026576 A1 | 1/2022 | Baribault et al. |

FOREIGN PATENT DOCUMENTS

| | | |
|---|---|---|
| CN | 101589316 B | 8/2012 |
| CN | 102667571 A | 9/2012 |
| CN | 103033806 A | 4/2013 |
| CN | 103885065 B | 4/2016 |
| CN | 103324945 B | 12/2016 |

(56) References Cited

FOREIGN PATENT DOCUMENTS

| | | |
|---|---|---|
| CN | 110892288 A | 3/2020 |
| CN | 107076838 B | 11/2021 |
| EP | 2957926 A1 | 12/2015 |
| EP | 2363927 B1 | 11/2016 |
| EP | 1901093 B1 | 11/2018 |
| JP | H0798381 A | 4/1995 |
| JP | H11-153664 A | 6/1999 |
| JP | 2000056018 A | 2/2000 |
| JP | 2000509150 A | 7/2000 |
| JP | 2003256820 A | 9/2003 |
| JP | 2004157044 A | 6/2004 |
| JP | 2005331273 A | 12/2005 |
| JP | 2006-329971 A | 12/2006 |
| JP | 2012202776 A | 10/2012 |
| JP | 2012252068 A | 12/2012 |
| JP | 2013015338 A | 1/2013 |
| JP | 2013156139 A | 8/2013 |
| JP | 2014059301 A | 4/2014 |
| JP | 2014059302 A | 4/2014 |
| JP | 2014077658 A | 5/2014 |
| WO | 2004034084 A1 | 4/2004 |
| WO | 2006/076474 A1 | 7/2006 |
| WO | 2008008970 A2 | 1/2008 |
| WO | 2012027410 A1 | 3/2012 |
| WO | 2016025908 A2 | 2/2016 |
| WO | 2017/143183 A1 | 8/2017 |
| WO | 2017/143217 A1 | 8/2017 |
| WO | 2018/152201 A1 | 8/2018 |
| WO | 2019010425 A1 | 1/2019 |
| WO | 2019199775 A1 | 10/2019 |
| WO | 2019/216937 A9 | 1/2020 |

OTHER PUBLICATIONS

"Rear-View Mirror", Wikipedia, The Free Encyclopedia, Nov. 24, 2021.
Analog Devices, "Data Sheet AD9680", 98 pages, 2014-2015.
Chen et al., "Estimating Depth from RGB and Sparse Sensing", European Conference on Computer Vision, Springer, 2018, pp. 176-192.
Donoho, "Compressed Sensing", IEEE Transactions on Information Theory, Apr. 2006, pp. 1289-1306, vol. 52, No. 4.
Fermann et al., "Ultrafast Lasers Technology and Applications", 2019, 3 pages.
Howland et al., "Compressive Sensing LIDAR for 3D Imaging", Optical Society of America, May 1-6, 2011, 2 pages.
Hui et al., "Analysis of Scanning Characteristics of a Two-Dimensional Scanning Lidar", Infrared (Monthly), Jun. 2010, pp. 10-14, vol. 31 No. 6 (http://journal.sitp.ac.cn/hw).
Ishida et al., "Wide Angle and High Frequency (>120 Degrees@ 10 KHZ/90 Degrees@ 30 KHZ) Resonant Si-Mems Mirror Using a Novel Tuning-Fork Driving", IEEE Mems, 2020, 5 pages.
Johnson et al., "Development of a Dual-Mirror-Scan Elevation-Monopulse Antenna System", Proceedings of the 8th European Radar Conference, 2011, pp. 281-284, Manchester, UK.
Kessler, "An afocal beam relay for laser XY scanning systems", Proc. of SPIE vol. 8215, 9 pages, 2012.
Kim et al., "Investigation on the occurrence of mutual interference between pulsed terrestrial LIDAR scanners", 2015 IEEE Intelligent Vehicles Symposium (IV), Jun. 28-Jul. 1, 2015, COEX, Seoul, Korea, pp. 437-442.
Maxim Integrated Products, Inc., Tutorial 800, "Design A Low-Jitter Clock for High Speed Data Converters", 8 pages, Jul. 17, 2002.
Moss et al., "Low-cost compact MEMS scanning LADAR system for robotic applications", Proc. of SPIE, 2012, vol. 8379, 837903-1 to 837903-9.
Office Action for U.S. Appl. No. 17/482,787, dated Jan. 11, 2022.
Office Action for U.S. Appl. No. 17/482,793 dated Feb. 1, 2022.
Office Action for U.S. Appl. No. 17/482,811 dated Jan. 20, 2022.
Office Action for U.S. Appl. No. 17/482,820 dated Feb. 17, 2022.
Office Action for U.S. Appl. No. 17/482,882 dated Jan. 13, 2022.
Office Action for U.S. Appl. No. 17/482,886 dated Jan. 31, 2022.
Office Action for U.S. Appl. No. 17/490,231 dated Apr. 18, 2022.
Office Action for U.S. Appl. No. 17/490,265 dated Feb. 14, 2022.
Office Action for U.S. Appl. No. 17/490,280 dated Apr. 11, 2022.
Office Action for U.S. Appl. No. 17/490,289 dated Jan. 20, 2022.
Office Action for U.S. Appl. No. 17/520,136, dated Feb. 1, 2022.
Office Action for U.S. Appl. No. 17/520,159 dated Feb. 2, 2022.
Office Action for U.S. Appl. No. 17/520,189 dated Feb. 4, 2022.
Office Action for U.S. Appl. No. 17/524,962 dated Mar. 22, 2022.
Office Action for U.S. Appl. No. 17/525,034 dated Mar. 30, 2022.
Paschotta, "Field Guide to Laser Pulse Generation", SPIE Field Guides, 134 pages, vol. FG14, 2008.
Polyakov, "Single-Photon Detector Calibration", National Institute of Standards and Technology, 2015, pp. 2.
Redmayne et al., "Understanding the Effect of Clock Jitter on High Speed ADCs", Design Note 1013, Linear Technology, 4 pages, 2006.
Rehn, "Optical properties of elliptical reflectors", Opt. Eng. 43(7), pp. 1480-1488, Jul. 2004.
Sharafutdinova et al., "Improved field scanner incorporating parabolic optics. Part 1: Simulation", Applied Optics, vol. 48, No. 22, p. 4389-4396, Aug. 2009.
White, "Application Note: A1R HD25: The Latest In Resonant Scanning Technology Allows New Live-Cell Imaging Approaches", Nature Methods, Jan. 2019, Accessed via the web Jan. 21, 2022, https://www.nature.com/articles/d42473-018-00319-2.
Prosecution History for U.S. Appl. No. 17/520,136, now U.S. Pat. No. 11,474,214, filed Nov. 5, 2021.
Prosecution History for U.S. Appl. No. 17/520,159, now U.S. Pat. No. 11,486,977, filed Nov. 5, 2021.
Prosecution History for U.S. Appl. No. 17/554,189, filed Dec. 17, 2021, now U.S. Pat. No. 11,604,264, granted Mar. 14, 2023.
Prosecution History for U.S. Appl. No. 17/482,787, filed Sep. 23, 2021, now U.S. Pat. No. 11,442,152, granted Sep. 13, 2022.
Prosecution History for U.S. Appl. No. 17/482,793, filed Sep. 23, 2021, now U.S. Pat. No. 11,448,734, granted Sep. 20, 2022.
Prosecution History for U.S. Appl. No. 17/482,806, filed Sep. 23, 2021, now U.S. Pat. No. 11,300,667, granted Apr. 12, 2022.
Prosecution History for U.S. Appl. No. 17/482,811, filed Sep. 23, 2021, now U.S. Pat. No. 11,630,188, granted Apr. 18, 2023.
Prosecution History for U.S. Appl. No. 17/482,820, filed Sep. 23, 2021, now U.S. Pat. No. 11,460,556, granted Oct. 4, 2022.
Prosecution History for U.S. Appl. No. 17/482,882, filed Sep. 23, 2021, now U.S. Pat. No. 11,460,552, granted Oct. 4, 2022.
Prosecution History for U.S. Appl. No. 17/482,886, filed Sep. 23, 2021, now U.S. Pat. No. 11,474,212, granted Oct. 18, 2022.
Prosecution History for U.S. Appl. No. 17/482,947, filed Sep. 23, 2021, now U.S. Pat. No. 11,474,213, granted Oct. 18, 2022.
Prosecution History for U.S. Appl. No. 17/482,983, filed Sep. 23, 2021, now U.S. Pat. No. 11,675,059, granted Jun. 13, 2023.
Prosecution History for U.S. Appl. No. 17/483,008, filed Sep. 23, 2021, now U.S. Pat. No. 11,460,553, granted Oct. 4, 2022.
Prosecution History for U.S. Appl. No. 17/483,034, filed Sep. 23, 2021, now U.S. Pat. No. 11,493,610, granted Nov. 8, 2022.
Prosecution History for U.S. Appl. No. 17/490,231, filed Sep. 30, 2021, now U.S. Pat. No. 11,686,845, granted Jun. 27, 2023.
Prosecution History for U.S. Appl. No. 17/490,265, filed Sep. 30, 2021, now U.S. Pat. No. 11,480,680, granted Oct. 25, 2022.
Prosecution History for U.S. Appl. No. 17/490,280, filed Sep. 30, 2021, now U.S. Pat. No. 11,686,846, granted Jun. 27, 2023.
Prosecution History for U.S. Appl. No. 17/490,289, filed Sep. 30, 2021, now U.S. Pat. No. 11,619,740, granted Apr. 4, 2023.
Prosecution History for U.S. Appl. No. 17/524,962, filed Nov. 12, 2021, now U.S. Pat. No. 11,500,093, granted Nov. 15, 2022.
Prosecution History for U.S. Appl. No. 17/554,212, filed Dec. 17, 2021, now U.S. Pat. No. 11,635,495, granted Apr. 25, 2023.
Prosecution History for U.S. Appl. No. 17/520,189, now U.S. Pat. No. 11,467,263, filed Nov. 5, 2021.

When mirror 110 is horizontal:
- Theta ($\theta$) = 0°
- Mu ($\mu$) = Phi ($\phi$)

When mirror 110 is tilted to a positive non-zero angle, Theta ($\theta$):
- Angle of Pulse Reflection (relative to mirror 110) = $\theta + \phi$
- $\mu = 2\theta + \phi$ When mirror 110 is tilted to a negative non-zero angle, $-\theta$:
- Angle of Pulse Reflection (relative to mirror 110) = $\phi - \theta$
- $\mu = \phi - 2\theta$

TRY: (1, 9, 17)

| | Start (t=0) (Angle Zero) | Time Slot 1 (Angle A) | Time Slot 2 (Angle B) | Time Slot 3 (Angle C) | Time Slot 4 (Angle D) | Time Slot 5 (Angle E) | Time Slot 6 (Angle F) | Time Slot 7 (Angle G) | Time Slot 8 (Angle H) | Time Slot 9 (Angle I) | Time Slot 10 (Angle J) |
|---|---|---|---|---|---|---|---|---|---|---|---|
| Seed Energy (S) | | 1 | 1 | 2 | 3 | 4 | 5 | 6 | 7 | 8 | 1 |
| Fiber Energy (F) | | 3 | 2 | 2 | 2 | 2 | 2 | 2 | 2 | 2 | 5 |
| Combined Seed and Fiber Energy (S+F) | | 4 | | | | | | | | 10 | |
| Shot Energy (EF) | | 2 | | | | | | | | 5 | |
| Leftover Fiber Energy (F(next)) | 3 | 2 | | | | | | | | 5 | |

Left-to-Right Scan

| | Time Slot 20 (Angle Zero) | Time Slot 19 (Angle A) | Time Slot 18 (Angle B) | Time Slot 17 (Angle C) | Time Slot 16 (Angle D) | Time Slot 15 (Angle E) | Time Slot 14 (Angle F) | Time Slot 13 (Angle G) | Time Slot 12 (Angle H) | Time Slot 11 (Angle I) |
|---|---|---|---|---|---|---|---|---|---|---|
| Seed Energy (S) | | | | 8 | 7 | 6 | 5 | 4 | 3 | 2 |
| Fiber Energy (F) | | | | 5 | 5 | 5 | 5 | 5 | 5 | 5 |
| Combined Seed and Fiber Energy (S+F) | | | | 13 | | | | | | |
| Shot Energy (EF) | | | | 6.5 | | | | | | |
| Leftover Fiber Energy (F(next)) | | | | 6.5 | | | | | | |

Right-to-Left Scan

TRY: (3, 9, 21)

Left-to-Right Scan

| | Start (t=0) (Angle Zero) | Time Slot 1 (Angle A) | Time Slot 2 (Angle B) | Time Slot 3 (Angle C) | Time Slot 4 (Angle D) | Time Slot 5 (Angle E) | Time Slot 6 (Angle F) | Time Slot 7 (Angle G) | Time Slot 8 (Angle H) | Time Slot 9 (Angle I) | Time Slot 10 (Angle J) |
|---|---|---|---|---|---|---|---|---|---|---|---|
| Seed Energy (S) | | 1 | 2 | 3 | 1 | 2 | 3 | 4 | 5 | 6 | 1 |
| Fiber Energy (F) | | 3 | 3 | 3 | 3 | 3 | 3 | 3 | 3 | 3 | 4.5 |
| Combined Seed and Fiber Energy (S+F) | | | | 6 | | | | | | 9 | |
| Shot Energy (EF) | | | | 3 | | | | | | 4.5 | |
| Leftover Fiber Energy (F(next)) | 3 | | | 3 | | | | | | 4.5 | |

Right-to-Left Scan

| | Time Slot 20 (Angle Zero) | Time Slot 19 (Angle A) | Time Slot 18 (Angle B) | Time Slot 17 (Angle C) | Time Slot 16 (Angle D) | Time Slot 15 (Angle E) | Time Slot 14 (Angle F) | Time Slot 13 (Angle G) | Time Slot 12 (Angle H) | Time Slot 11 (Angle I) |
|---|---|---|---|---|---|---|---|---|---|---|
| Seed Energy (S) | 11 | 10 | 9 | 8 | 7 | 6 | 5 | 4 | 3 | 2 |
| Fiber Energy (F) | 4.5 | 4.5 | 4.5 | 4.5 | 4.5 | 4.5 | 4.5 | 4.5 | 4.5 | 4.5 |
| Combined Seed and Fiber Energy (S+F) | | | | | | | | | | |
| Shot Energy (EF) | | | | | | | | | | |
| Leftover Fiber Energy (F(next)) | | | | | | | | | | |

Left-to-Right Scan

| | Time Slot 21 (Angle A) | Time Slot 22 (Angle B) | Time Slot 23 (Angle C) | Time Slot 24 (Angle D) | Time Slot 25 (Angle E) | Time Slot 26 (Angle F) | Time Slot 27 (Angle G) | Time Slot 28 (Angle H) | Time Slot 29 (Angle I) | Time Slot 30 (Angle J) |
|---|---|---|---|---|---|---|---|---|---|---|
| Seed Energy (S) | 12 | | | | | | | | | |
| Fiber Energy (F) | 4.5 | | | | | | | | | |
| Combined Seed and Fiber Energy (S+F) | 16.5 | | | | | | | | | |
| Shot Energy (EF) | 8.25 | | | | | | | | | |
| Leftover Fiber Energy (F(next)) | 8.25 | | | | | | | | | |

HYPER TEMPORAL LIDAR WITH DYNAMIC SHOT SCHEDULING USING A LASER ENERGY MODEL

CROSS-REFERENCE AND PRIORITY CLAIM TO RELATED PATENT APPLICATIONS

This patent application is a continuation of U.S. patent application Ser. No. 17/482,811, filed Sep. 23, 2021, and entitled "Hyper Temporal Lidar with Dynamic Laser Control Using Safety Models", now U.S. Pat. No. 11,630,188, which claims priority to U.S. provisional patent application 63/166,475, filed Mar. 26, 2021, and entitled "Hyper Temporal Lidar with Dynamic Laser Control", the entire disclosures of each of which are incorporated herein by reference.

This patent application is related to (1) U.S. patent application Ser. No. 17/482,787, filed Sep. 23, 2021, and entitled "Hyper Temporal Lidar with Dynamic Laser Control Using a Laser Energy Model", now U.S. Pat. No. 11,442,152, (2) U.S. patent application Ser. No. 17/482,793, filed Sep. 23, 2021, and entitled "Hyper Temporal Lidar with Dynamic Laser Control Using Laser Energy and Mirror Motion Models", now U.S. Pat. No. 11,448,734, (3) U.S. patent application Ser. No. 17/482,806, filed Sep. 23, 2021, and entitled "Hyper Temporal Lidar with Dynamic Laser Control for Scan Line Shot Scheduling", now U.S. Pat. No. 11,300,667, (4) U.S. patent application Ser. No. 17/482,820, filed Sep. 23, 2021, and entitled "Hyper Temporal Lidar with Shot Scheduling for Variable Amplitude Scan Mirror", now U.S. Pat. No. 11,460,556, (5) U.S. patent application Ser. No. 17/482,882, filed Sep. 23, 2021, and entitled "Hyper Temporal Lidar with Dynamic Control of Variable Energy Laser Source", now U.S. Pat. No. 11,460,552, (6) U.S. patent application Ser. No. 17/482,886, filed Sep. 23, 2021, and entitled "Hyper Temporal Lidar with Dynamic Laser Control and Shot Order Simulation", now U.S. Pat. No. 11,474,212, (7) U.S. patent application Ser. No. 17/482,947, filed Sep. 23, 2021, and entitled "Hyper Temporal Lidar with Dynamic Laser Control Using Marker Shots", now U.S. Pat. No. 11,474,213, (8) U.S. patent application Ser. No. 17/482,983, filed Sep. 23, 2021, and entitled "Hyper Temporal Lidar with Elevation-Prioritized Shot Scheduling", now U.S. Pat. No. 11,675,059, (9) U.S. patent application Ser. No. 17/483,008, filed Sep. 23, 2021, and entitled "Hyper Temporal Lidar with Dynamic Laser Control Using Different Mirror Motion Models for Shot Scheduling and Shot Firing", now U.S. Pat. No. 11,460,553, and (10) U.S. patent application Ser. No. 17/483,034, filed Sep. 23, 2021, and entitled "Hyper Temporal Lidar with Detection-Based Adaptive Shot Scheduling", now U.S. Pat. No. 11,493,610, the entire disclosures of each of which are incorporated herein by reference.

INTRODUCTION

There is a need in the art for lidar systems that operate with low latency and rapid adaptation to environmental changes. This is particularly the case for automotive applications of lidar as well as other applications where the lidar system may be moving at a high rate of speed or where there is otherwise a need for decision-making in short time intervals. For example, when an object of interest is detected in the field of view for a lidar transmitter, it is desirable for the lidar transmitter to rapidly respond to this detection by firing high densities of laser pulses at the detected object. However, as the firing rate for the lidar transmitter increases, this places pressure on the operational capabilities of the laser source employed by the lidar transmitter because the laser source will need re-charging time.

This issue becomes particularly acute in situations where the lidar transmitter has a variable firing rate. With a variable firing rate, the laser source's operational capabilities are not only impacted by periods of high density firing but also periods of low density firing. As charge builds up in the laser source during a period where the laser source is not fired, a need arises to ensure that the laser source does not overheat or otherwise exceed its maximum energy limits.

The lidar transmitter may employ a laser source that uses optical amplification to support the generation of laser pulses. Such laser sources have energy characteristics that are heavily impacted by time and the firing rate of the laser source. These energy characteristics of a laser source that uses optical amplification have important operational impacts on the lidar transmitter when the lidar transmitter is designed to operate with fast scan times and laser pulses that are targeted on specific range points in the field of view.

As a technical solution to these problems in the art, the inventors disclose that a laser energy model can be used to model the available energy in the laser source over time. The timing schedule for laser pulses fired by the lidar transmitter can then be determined using energies that are predicted for the different scheduled laser pulse shots based on the laser energy model. This permits the lidar transmitter to reliably ensure at a highly granular level that each laser pulse shot has sufficient energy to meet operational needs, including when operating during periods of high density/high resolution laser pulse firing. The laser energy model is capable of modeling the energy available for laser pulses in the laser source over very short time intervals as discussed in greater detail below. With such short interval time modeling, the laser energy modeling can be referred to as a transient laser energy model.

Furthermore, the inventors also disclose that mirror motion can be modeled so that the system can also reliably predict where a scanning mirror is aimed within a field of view over time. This mirror motion model is also capable of predicting mirror motion over short time intervals as discussed in greater detail below. In this regard, the mirror motion model can also be referred to as a transient mirror motion model. The model of mirror motion over time can be linked with the model of laser energy over time to provide still more granularity in the scheduling of laser pulses that are targeted at specific range points in the field of view. Thus, a control circuit can translate a list of arbitrarily ordered range points to be targeted with laser pulses into a shot list of laser pulses to be fired at such range points using the modeled laser energy coupled with the modeled mirror motion. In this regard, the "shot list" can refer to a list of the range points to be targeted with laser pulses as combined with timing data that defines a schedule or sequence by which laser pulses will be fired toward such range points.

The inventors also disclose that a shot list for upcoming laser pulse shots that are modeled according to the laser energy and mirror motion models can further be controlled based on eye safety and/or camera safety models to prevent the lidar system firing too much laser energy into defined spatial areas over defined time periods and thus reduce the risk of damage to eyes and/or cameras in the field of view.

Through the use of such models, the lidar system can provide hyper temporal processing where laser pulses can be scheduled and fired at high rates with high timing precision and high spatial targeting/pointing precision. This results in a lidar system that can operate at low latency, high frame rates, and intelligent range point targeting where regions of interest in the field of view can be targeted with rapidly-fired and spatially dense laser pulse shots.

These and other features and advantages of the invention will be described in greater detail below.

BRIEF DESCRIPTION OF THE DRAWINGS

FIGS. 7D-7F depict different examples of laser energy predictions produced by the laser energy model with respect to different shot order candidates.

DETAILED DESCRIPTION OF EXAMPLE EMBODIMENTS

Figure 1:
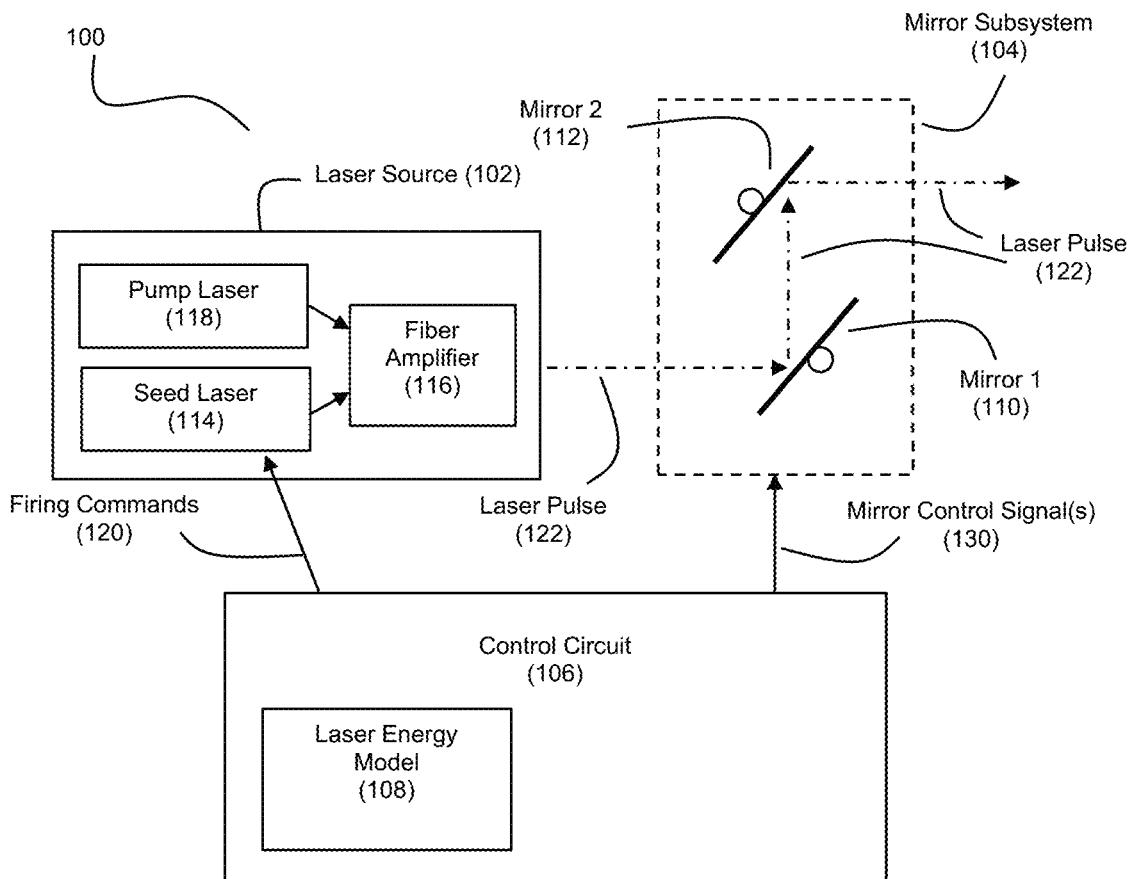
FIG. 1 depicts an example lidar transmitter that uses a laser energy model to schedule laser pulses.

FIG. 1 shows an example embodiment of a lidar transmitter 100 that can be employed to support hyper temporal lidar. In an example embodiment, the lidar transmitter 100 can be deployed in a vehicle such as an automobile. However, it should be understood that the lidar transmitter 100 described herein need not be deployed in a vehicle. As used herein, "lidar", which can also be referred to as "lidar", refers to and encompasses any of light detection and ranging, laser radar, and laser detection and ranging. In the example of FIG. 1, the lidar transmitter 100 includes a laser source 102, a mirror subsystem 104, and a control circuit 106. Control circuit 106 uses a laser energy model 108 to govern the firing of laser pulses 122 by the laser source 102. Laser pulses 122 transmitted by the laser source 102 are sent into the environment via mirror subsystem 104 to target various range points in a field of view for the lidar transmitter 100. These laser pulses 122 can be interchangeably referred to as laser pulse shots (or more simply, as just "shots"). The field of view will include different addressable coordinates (e.g., {azimuth, elevation} pairs) which serve as range points that can be targeted by the lidar transmitter 100 with the laser pulses 122.

In the example of FIG. 1, laser source 102 can use optical amplification to generate the laser pulses 122 that are transmitted into the lidar transmitter's field of view via the mirror subsystem 104. In this regard, a laser source 102 that includes an optical amplifier can be referred to as an optical amplification laser source 102. In the example of FIG. 1, the optical amplification laser source 102 includes a seed laser 114, an optical amplifier 116, and a pump laser 118. In this laser architecture, the seed laser 114 provides the input (signal) that is amplified to yield the transmitted laser pulse 122, while the pump laser 118 provides the power (in the form of the energy deposited by the pump laser 118 into the optical amplifier 116). So, the optical amplifier 116 is fed by two inputs—the pump laser 118 (which deposits energy into the optical amplifier 116) and the seed laser 114 (which provides the signal that stimulates the energy in the optical amplifier 116 and induces pulse 122 to fire).

Thus, the pump laser 118, which can take the form of an electrically-driven pump laser diode, continuously sends energy into the optical amplifier 116. The seed laser 114, which can take the form of an electrically-driven seed laser that includes a pulse formation network circuit, controls when the energy deposited by the pump laser 118 into the optical amplifier 116 is released by the optical amplifier 116 as a laser pulse 122 for transmission. The seed laser 114 can also control the shape of laser pulse 122 via the pulse formation network circuit (which can drive the pump laser diode with the desired pulse shape). The seed laser 114 also injects a small amount of (pulsed) optical energy into the optical amplifier 116.

Given that the energy deposited in the optical amplifier 116 by the pump laser 118 and seed laser 114 serves to seed the optical amplifier 116 with energy from which the laser pulses 122 are generated, this deposited energy can be referred to as "seed energy" for the laser source 102.

The optical amplifier 116 operates to generate laser pulse 122 from the energy deposited therein by the seed laser 114 and pump laser 118 when the optical amplifier 116 is induced to fire the laser pulse 122 in response to stimulation of the energy therein by the seed laser 114. The optical amplifier 116 can take the form of a fiber amplifier. In such an embodiment, the laser source 102 can be referred to as a pulsed fiber laser source. With a pulsed fiber laser source 102, the pump laser 118 essentially places the dopant electrons in the fiber amplifier 116 into an excited energy state. When it is time to fire laser pulse 122, the seed laser 114 stimulates these electrons, causing them to emit energy and collapse down to a lower (ground) state, which results in the emission of pulse 122. An example of a fiber amplifier that can be used for the optical amplifier 116 is a doped fiber amplifier such as an Erbium-Doped Fiber Amplifier (EDFA).

It should be understood that other types of optical amplifiers can be used for the optical amplifier 116 if desired by a practitioner. For example, the optical amplifier 116 can take the form of a semiconductor amplifier. In contrast to a laser source that uses a fiber amplifier (where the fiber amplifier is optically pumped by pump laser 118), a laser source that uses a semiconductor amplifier can be electrically pumped. As another example, the optical amplifier 116 can take the form of a gas amplifier (e.g., a $CO_2$ gas amplifier). Moreover, it should be understood that a practitioner may choose to include a cascade of optical amplifiers 116 in laser source 102.

In an example embodiment, the pump laser 118 can exhibit a fixed rate of energy buildup (where a constant amount of energy is deposited in the optical amplifier 116 per unit time). However, it should be understood that a practitioner may choose to employ a pump laser 118 that exhibits a variable rate of energy buildup (where the amount of energy deposited in the optical amplifier 116 varies per unit time).

The laser source 102 fires laser pulses 122 in response to firing commands 120 received from the control circuit 106. In an example where the laser source 102 is a pulsed fiber laser source, the firing commands 120 can cause the seed laser 114 to induce pulse emissions by the fiber amplifier 116. In an example embodiment, the lidar transmitter 100 employs non-steady state pulse transmissions, which means that there will be variable timing between the commands 120 to fire the laser source 102. In this fashion, the laser pulses 122 transmitted by the lidar transmitter 100 will be spaced in time at irregular intervals. There may be periods of relatively high densities of laser pulses 122 and periods of relatively low densities of laser pulses 122. Examples of laser vendors that provide such variable charge time control include Luminbird and ITF. As examples, lasers that have the capacity to regulate pulse timing over timescales corresponding to preferred embodiments discussed herein and which are suitable to serve as laser source 102 in these preferred embodiments are expected to exhibit laser wavelengths of 1.5 μm and available energies in a range of around hundreds of nano-Joules to around tens of micro-Joules, with timing controllable from hundreds of nanoseconds to tens of microseconds and with an average power range from around 0.25 Watts to around 4 Watts.

The mirror subsystem 104 includes a mirror that is scannable to control where the lidar transmitter 100 is aimed. In the example embodiment of FIG. 1, the mirror subsystem 104 includes two mirrors—mirror 110 and mirror 112. Mirrors 110 and 112 can take the form of MEMS mirrors. However, it should be understood that a practitioner may choose to employ different types of scannable mirrors. Mirror 110 is positioned optically downstream from the laser source 102 and optically upstream from mirror 112. In this fashion, a laser pulse 122 generated by the laser source 102 will impact mirror 110, whereupon mirror 110 will reflect the pulse 122 onto mirror 112, whereupon mirror 112 will reflect the pulse 122 for transmission into the environment. It should be understood that the outgoing pulse 122 may pass through various transmission optics during its propagation from mirror 112 into the environment.

In the example of FIG. 1, mirror 110 can scan through a plurality of mirror scan angles to define where the lidar transmitter 100 is targeted along a first axis. This first axis can be an X-axis so that mirror 110 scans between azimuths. Mirror 112 can scan through a plurality of mirror scan angles to define where the lidar transmitter 100 is targeted along a second axis. The second axis can be orthogonal to the first axis, in which case the second axis can be a Y-axis so that mirror 112 scans between elevations. The combination of mirror scan angles for mirror 110 and mirror 112 will define a particular {azimuth, elevation} coordinate to which the lidar transmitter 100 is targeted. These azimuth, elevation pairs can be characterized as {azimuth angles, elevation angles} and/or {rows, columns} that define range points in the field of view which can be targeted with laser pulses 122 by the lidar transmitter 100.

A practitioner may choose to control the scanning of mirrors 110 and 112 using any of a number of scanning techniques. In a particularly powerful embodiment, mirror 110 can be driven in a resonant mode according to a sinusoidal signal while mirror 112 is driven in a point-to-point mode according to a step signal that varies as a function of the range points to be targeted with laser pulses 122 by the lidar transmitter 100. In this fashion, mirror 110 can be operated as a fast-axis mirror while mirror 112 is operated as a slow-axis mirror. When operating in such a resonant mode, mirror 110 scans through scan angles in a sinusoidal pattern. In an example embodiment, mirror 110 can be scanned at a frequency in a range between around 100 Hz and around 20 kHz. In a preferred embodiment, mirror 110 can be scanned at a frequency in a range between around 10 kHz and around 15 kHz (e.g., around 12 kHz). As noted above, mirror 112 can be driven in a point-to-point mode according to a step signal that varies as a function of the range points to be targeted with laser pulses 122 by the lidar transmitter 100. Thus, if the lidar transmitter 100 is to fire a laser pulse 122 at a particular range point having an elevation of X, then the step signal can drive mirror 112 to scan to the elevation of X. When the lidar transmitter 100 is later to fire a laser pulse 122 at a particular range point having an elevation of Y, then the step signal can drive mirror 112 to scan to the elevation of Y. In this fashion, the mirror subsystem 104 can selectively target range points that are identified for targeting with laser pulses 122. It is expected that mirror 112 will scan to new elevations at a much slower rate than mirror 110 will scan to new azimuths. As such, mirror 110 may scan back and forth at a particular elevation (e.g., left-to-right, right-to-left, and so on) several times before mirror 112 scans to a new elevation. Thus, while the mirror 112 is targeting a particular elevation angle, the lidar transmitter 100 may fire a number of laser pulses 122 that target different azimuths at that elevation while mirror 110 is scanning through different azimuth angles. U.S. Pat. Nos. 10,078,133 and 10,642,029, the entire disclosures of which are incorporated herein by reference, describe examples of mirror scan control using techniques and transmitter architectures such as these (and others) which can be used in connection with the example embodiments described herein.

Control circuit 106 is arranged to coordinate the operation of the laser source 102 and mirror subsystem 104 so that laser pulses 122 are transmitted in a desired fashion. In this regard, the control circuit 106 coordinates the firing commands 120 provided to laser source 102 with the mirror control signal(s) 130 provided to the mirror subsystem 104. In the example of FIG. 1, where the mirror subsystem 104 includes mirror 110 and mirror 112, the mirror control signal(s) 130 can include a first control signal that drives the scanning of mirror 110 and a second control signal that drives the scanning of mirror 112. Any of the mirror scan techniques discussed above can be used to control mirrors 110 and 112. For example, mirror 110 can be driven with a sinusoidal signal to scan mirror 110 in a resonant mode, and mirror 112 can be driven with a step signal that varies as a function of the range points to be targeted with laser pulses 122 to scan mirror 112 in a point-to-point mode.

As discussed in greater detail below, control circuit 106 can use a laser energy model 108 to determine a timing schedule for the laser pulses 122 to be transmitted from the laser source 102. This laser energy model 108 can model the available energy within the laser source 102 for producing laser pulses 122 over time in different shot schedule scenarios. By modeling laser energy in this fashion, the laser energy model 108 helps the control circuit 106 make decisions on when the laser source 102 should be triggered to fire laser pulses. Moreover, as discussed in greater detail below, the laser energy model 108 can model the available energy within the laser source 102 over short time intervals (such as over time intervals in a range from 10-100 nanoseconds), and such a short interval laser energy model 108 can be referred to as a transient laser energy model 108.

Control circuit 106 can include a processor that provides the decision-making functionality described herein. Such a processor can take the form of a field programmable gate array (FPGA) or application-specific integrated circuit (ASIC) which provides parallelized hardware logic for implementing such decision-making. The FPGA and/or ASIC (or other compute resource(s)) can be included as part of a system on a chip (SoC). However, it should be understood that other architectures for control circuit 106 could be used, including software-based decision-making and/or hybrid architectures which employ both software-based and hardware-based decision-making. The processing logic implemented by the control circuit 106 can be defined by machine-readable code that is resident on a non-transitory machine-readable storage medium such as memory within or available to the control circuit 106. The code can take the form of software or firmware that define the processing operations discussed herein for the control circuit 106. This code can be downloaded onto the control circuit 106 using any of a number of techniques, such as a direct download via a wired connection as well as over-the-air downloads via wireless networks, which may include secured wireless networks. As such, it should be understood that the lidar transmitter 100 can also include a network interface that is configured to receive such over-the-air downloads and update the control circuit 106 with new software and/or firmware. This can be particularly advantageous for adjusting the lidar transmitter 100 to changing regulatory environments with respect to criteria such as laser dosage and the like. When using code provisioned for over-the-air updates, the control circuit 106 can operate with unidirectional messaging to retain function safety.

Figure 2A:
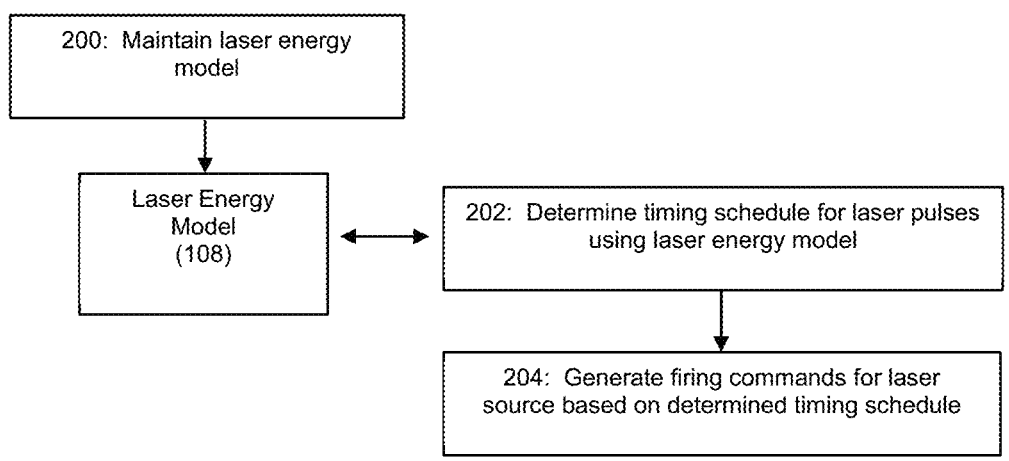
FIG. 2A depicts an example process flow the control circuit of FIG. 1.

Modeling Laser Energy Over Time:

FIG. 2A shows an example process flow for the control circuit 106 with respect to using the laser energy model 108 to govern the timing schedule for laser pulses 122. At step 200, the control circuit 106 maintains the laser energy model 108. This step can include reading the parameters and expressions that define the laser energy model 108, discussed in greater detail below. Step 200 can also include updating the laser energy model 108 over time as laser pulses 122 are triggered by the laser source 102 as discussed below.

In an example embodiment where the laser source 102 is a pulsed fiber laser source as discussed above, the laser energy model 108 can model the energy behavior of the seed laser 114, pump laser 118, and fiber amplifier 116 over time as laser pulses 122 are fired. As noted above, the fired laser pulses 122 can be referred to as "shots". For example, the laser energy model 108 can be based on the following parameters:

$CE(t)$, which represents the combined amount of energy within the fiber amplifier 116 at the moment when the laser pulse 122 is fired at time t.

$EF(t)$, which represents the amount of energy fired in laser pulse 122 at time t;

$E_P$, which represents the amount of energy deposited by the pump laser 118 into the fiber amplifier 116 per unit of time.

$S(t+\delta)$, which represents the cumulative amount of seed energy that has been deposited by the pump laser 118 and seed laser 114 into the fiber amplifier 116 over the time duration $\delta$, where $\delta$ represents the amount of time between the most recent laser pulse 122 (for firing at time t) and the next laser pulse 122 (to be fired at time $t+\delta$).

$F(t+\delta)$, which represents the amount of energy left behind in the fiber amplifier 116 when the pulse 122 is fired at time t (and is thus available for use with the next pulse 122 to be fired at time $t+\delta$).

$CE(t+\delta)$, which represents the amount of combined energy within the fiber amplifier 116 at time $t+\delta$ (which is the sum of $S(t+\delta)$ and $F(t+\delta)$)

$EF(t+\delta)$, which represents the amount of energy fired in laser pulse 122 fired at time $t+\delta$ a and b, where "a" represents a proportion of energy transferred from the fiber amplifier 116 into the laser pulse 122 when the laser pulse 122 is fired, where "b" represents a proportion of energy retained in the fiber amplifier 116 after the laser pulse 122 is fired, where a+b=1.

While the seed energy (S) includes both the energy deposited in the fiber amplifier 116 by the pump laser 118 and the energy deposited in the fiber amplifier 116 by the seed laser 114, it should be understood that for most embodiments the energy from the seed laser 114 will be very small relative to the energy from the pump laser 118. As such, a practitioner can choose to model the seed energy solely in terms of energy produced by the pump laser 118 over time. Thus, after the pulsed fiber laser source 102 fires a laser pulse at time t, the pump laser 118 will begin re-supplying the fiber amplifier 116 with energy over time (in accordance with $E_P$) until the seed laser 116 is triggered at time $t+\delta$ to cause the fiber amplifier 116 to emit the next laser pulse 122 using the energy left over in the fiber amplifier 116 following the previous shot plus the new energy that has been deposited in the fiber amplifier 116 by pump laser 118 since the previous shot. As noted above, the parameters a and b model how much of the energy in the fiber amplifier 116 is transferred into the laser pulse 122 for transmission and how much of the energy is retained by the fiber amplifier 116 for use when generating the next laser pulse 122.

The energy behavior of pulsed fiber laser source 102 with respect to the energy fired in laser pulses 122 in this regard can be expressed as follows:

$$EF(t)=aCE(t)$$

$$F(t+\delta)=bCE(t)$$

$$S(t+\delta)=\delta E_P$$

$$CE(t+\delta)=S(t+\delta)+F(t+\delta)$$

$$EF(t+\delta)=aCE(t+\delta)$$

With these relationships, the value for CE(t) can be re-expressed in terms of EF(t) as follows:

$$CE(t) = \frac{EF(t)}{a}$$

Furthermore, the value for F(t+δ) can be re-expressed in terms of EF(t) as follows:

$$F(t+\delta) = \frac{bEF(t)}{a}$$

This means that the values for CE(t+δ) and EF(t+δ) can be re-expressed as follows:

$$CE(t+\delta) = \delta E_P + \frac{bEF(t)}{a}$$

$$EF(t+\delta) = a\left(\delta E_P + \frac{bEF(t)}{a}\right)$$

And this expression for EF(t+δ) shortens to:

$$EF(t+\delta) = a\delta E_P + bEF(t)$$

It can be seen, therefore, that the energy to be fired in a laser pulse 122 at time t+δ in the future can be computed as a function of how much energy was fired in the previous laser pulse 122 at time t. Given that a, b, $E_P$, and EF(t) are known values, and δ is a controllable variable, these expressions can be used as the laser energy model 108 that predicts the amount of energy fired in a laser pulse at select times in the future (as well as how much energy is present in the fiber amplifier 116 at select times in the future).

While this example models the energy behavior over time for a pulsed fiber laser source 102, it should be understood that these models could be adjusted to reflect the energy behavior over time for other types of laser sources.

Thus, the control circuit 106 can use the laser energy model 108 to model how much energy is available in the laser source 102 over time and can be delivered in the laser pulses 122 for different time schedules of laser pulse shots. With reference to FIG. 2A, this allows the control circuit 106 to determine a timing schedule for the laser pulses 122 (step 202). For example, at step 202, the control circuit 106 can compare the laser energy model 108 with various defined energy requirements to assess how the laser pulse shots should be timed. As examples, the defined energy requirements can take any of a number of forms, including but not limited to (1) a minimum laser pulse energy, (2) a maximum laser pulse energy, (3) a desired laser pulse energy (which can be per targeted range point for a lidar transmitter 100 that selectively targets range points with laser pulses 122), (4) eye safety energy thresholds, and/or (5) camera safety energy thresholds. The control circuit 106 can then, at step 204, generate and provide firing commands 120 to the laser source 102 that trigger the laser source 102 to generate laser pulses 122 in accordance with the determined timing schedule. Thus, if the control circuit 106 determines that laser pulses should be generated at times t1, t2, t3, . . . , the firing commands 120 can trigger the laser source to generate laser pulses 122 at these times.

A control variable that the control circuit 106 can evaluate when determining the timing schedule for the laser pulses is the value of δ, which controls the time interval between successive laser pulse shots. The discussion below illustrates how the choice of δ impacts the amount of energy in each laser pulse 122 according to the laser energy model 108.

For example, during a period where the laser source 102 is consistently fired every 6 units of time, the laser energy model 108 can be used to predict energy levels for the laser pulses as shown in the following toy example.

Toy Example 1, where $E_P$=1 unit of energy; δ=1 unit of time; the initial amount of energy stored by the fiber laser 116 is 1 unit of energy; a=0.5 and b=0.5:

| Shot Number | 1 | 2 | 3 | 4 | 5 |
|---|---|---|---|---|---|
| Time | t + 1 | t + 2 | t + 3 | t + 4 | t + 5 |
| Seed Energy from Pump Laser (S) | 1 | 1 | 1 | 1 | 1 |
| Leftover Fiber Energy (F) | 1 | 1 | 1 | 1 | 1 |
| Combined Energy (S + F) | 2 | 2 | 2 | 2 | 2 |
| Energy Fired (EF) | 1 | 1 | 1 | 1 | 1 |

If the rate of firing is increased, this will impact how much energy is included in the laser pulses. For example, relative to Toy Example 1, if the firing rate is doubled (δ=0.5 units of time) (while the other parameters are the same), the laser energy model 108 will predict the energy levels per laser pulse 122 as follows below with Toy Example 2.

Toy Example 2, where $E_P$=1 unit of energy; δ=0.5 units of time; the initial amount of energy stored by the fiber laser 116 is 1 unit of energy; a=0.5 and b=0.5:

| Shot Number | 1 | 2 | 3 | 4 | 5 |
|---|---|---|---|---|---|
| Time | t + 0.5 | t + 1 | t + 1.5 | t + 2 | t + 3.5 |
| Seed Energy from Pump Laser (S) | 0.5 | 0.5 | 0.5 | 0.5 | 0.5 |
| Leftover Fiber Energy (F) | 1 | 0.75 | 0.625 | 0.5625 | 0.53125 |
| Combined Energy (S + F) | 1.5 | 1.25 | 1.125 | 1.0625 | 1.03125 |
| Energy Fired (EF) | 0.75 | 0.625 | 0.5625 | 0.53125 | 0.515625 |

Thus, in comparing Toy Example 1 with Toy Example 2 it can be seen that increasing the firing rate of the laser will decrease the amount of energy in the laser pulses 122. As example embodiments, the laser energy model 108 can be used to model a minimum time interval in a range between around 10 nanoseconds to around 100 nanoseconds. This timing can be affected by both the accuracy of the clock for control circuit 106 (e.g., clock skew and clock jitter) and the minimum required refresh time for the laser source 102 after firing.

If the rate of firing is decreased relative to Toy Example 1, this will increase how much energy is included in the laser pulses. For example, relative to Toy Example 1, if the firing rate is halved (δ=2 units of time) (while the other parameters are the same), the laser energy model 108 will predict the energy levels per laser pulse 122 as follows below with Toy Example 3.

Toy Example 3, where $E_P$=1 unit of energy; δ=2 units of time; the initial amount of energy stored by the fiber laser 116 is 1 unit of energy; a=0.5 and b=0.5:

| Shot Number | 1 | 2 | 3 | 4 | 5 |
|---|---|---|---|---|---|
| Time | t + 2 | t + 4 | t + 6 | t + 8 | t + 10 |
| Seed Energy from Pump Laser (S) | 2 | 2 | 2 | 2 | 2 |
| Leftover Fiber Energy (F) | 1 | 1.5 | 1.75 | 1.875 | 1.9375 |
| Combined Energy (S + F) | 3 | 3.5 | 3.75 | 3.875 | 3.9375 |
| Energy Fired (EF) | 1.5 | 1.75 | 1.875 | 1.9375 | 1.96875 |

If a practitioner wants to maintain a consistent amount of energy per laser pulse, it can be seen that the control circuit 106 can use the laser energy model 108 to define a timing schedule for laser pulses 122 that will achieve this goal (through appropriate selection of values for δ).

For practitioners that want the lidar transmitter 100 to transmit laser pulses at varying intervals, the control circuit 106 can use the laser energy model 108 to define a timing schedule for laser pulses 122 that will maintain a sufficient amount of energy per laser pulse 122 in view of defined energy requirements relating to the laser pulses 122. For example, if the practitioner wants the lidar transmitter 100 to have the ability to rapidly fire a sequence of laser pulses (for example, to interrogate a target in the field of view with high resolution) while ensuring that the laser pulses in this sequence are each at or above some defined energy minimum, the control circuit 106 can define a timing schedule that permits such shot clustering by introducing a sufficiently long value for δ just before firing the clustered sequence. This long δ value will introduce a "quiet" period for the laser source 102 that allows the energy in seed laser 114 to build up so that there is sufficient available energy in the laser source 102 for the subsequent rapid fire sequence of laser pulses. As indicated by the decay pattern of laser pulse energy reflected by Toy Example 2, increasing the starting value for the seed energy (S) before entering the time period of rapidly-fired laser pulses will make more energy available for the laser pulses fired close in time with each other.

Toy Example 4 below shows an example shot sequence in this regard, where there is a desire to fire a sequence of 5 rapid laser pulses separated by 0.25 units of time, where each laser pulse has a minimum energy requirement of 1 unit of energy. If the laser source has just concluded a shot sequence after which time there is 1 unit of energy retained in the fiber laser 116, the control circuit can wait 25 units of time to allow sufficient energy to build up in the seed laser 114 to achieve the desired rapid fire sequence of 5 laser pulses 122, as reflected in the table below.

Toy Example 4, where $E_P$=1 unit of energy; $δ_{LONG}$=25 units of time; $δ_{SHORT}$=0.25 units of time; the initial amount of energy stored by the fiber laser 116 is 1 unit of energy; a=0.5 and b=0.5; and the minimum pulse energy requirement is 1 unit of energy:

| Shot Number | 1 | 2 | 3 | 4 | 5 |
|---|---|---|---|---|---|
| Time | t + 25 | t + 25.25 | t + 25.5 | t + 25.75 | t + 26 |
| Seed Energy from Pump Laser (S) | 25 | 0.25 | 0.25 | 0.25 | 0.25 |
| Leftover Fiber Energy (F) | 1 | 13 | 6.625 | 3.4375 | 1.84375 |
| Combined Energy (S + F) | 26 | 13.25 | 6.875 | 3.6875 | 2.09375 |
| Energy Fired (EF) | 13 | 6.625 | 3.4375 | 1.84375 | 1.046875 |

Figure 16:
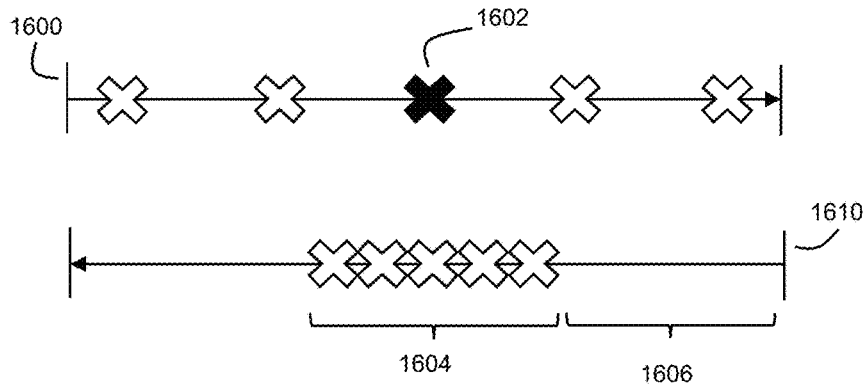
FIG. 16 illustrates how the lidar transmitter can change its firing rate to probe regions in a field of view with denser groupings of laser pulses.

This ability to leverage "quiet" periods to facilitate "busy" periods of laser activity means that the control circuit 106 can provide highly agile and responsive adaptation to changing circumstances in the field of view. For example, FIG. 16 shows an example where, during a first scan 1600 across azimuths from left to right at a given elevation, the laser source 102 fires 5 laser pulses 122 that are relatively evenly spaced in time (where the laser pulses are denoted by the "X" marks on the scan 1600). If a determination is made that an object of interest is found at range point 1602, the control circuit 106 can operate to interrogate the region of interest 1604 around range point 1602 with a higher density of laser pulses on second scan 1610 across the azimuths from right to left. To facilitate this high density period of rapidly fired laser pulses within the region of interest 1604, the control circuit 106 can use the laser energy model 108 to determine that such high density probing can be achieved by inserting a lower density period 1606 of laser pulses during the time period immediately prior to scanning through the region of interest 1604. In the example of FIG. 16, this lower density period 1604 can be a quiet period where no laser pulses are fired. Such timing schedules of laser pulses can be defined for different elevations of the scan pattern to permit high resolution probing of regions of interest that are detected in the field of view.

The control circuit 106 can also use the energy model 108 to ensure that the laser source 102 does not build up with too much energy. For practitioners that expect the lidar transmitter 100 to exhibit periods of relatively infrequent laser pulse firings, it may be the case that the value for δ in some instances will be sufficiently long that too much energy will build up in the fiber amplifier 116, which can cause problems for the laser source 102 (either due to equilibrium overheating of the fiber amplifier 116 or non-equilibrium overheating of the fiber amplifier 116 when the seed laser 114 induces a large amount of pulse energy to exit the fiber amplifier 116). To address this problem, the control circuit 106 can insert "marker" shots that serve to bleed off energy from the laser source 102. Thus, even though the lidar transmitter 100 may be primarily operating by transmitting laser pulses 122 at specific, selected range points, these marker shots can be fired regardless of the selected list of range points to be targeted for the purpose of preventing damage to the laser source 102. For example, if there is a maximum energy threshold for the laser source 102 of 25 units of energy, the control circuit 106 can consult the laser energy model 108 to identify time periods where this maximum energy threshold would be violated. When the control circuit 106 predicts that the maximum energy threshold would be violated because the laser pulses have been too infrequent, the control circuit 106 can provide a firing command 120 to the laser source 102 before the maximum energy threshold has been passed, which triggers the laser source 102 to fire the marker shot that bleeds energy out of the laser source 102 before the laser source's energy has gotten too high. This maximum energy threshold can be tracked and assessed in any of a number of ways depending on how the laser energy model 108 models the various aspects of laser operation. For example, it can be evaluated as a maximum energy threshold for the fiber amplifier 116 if the energy model 108 tracks the energy in the fiber amplifier 116 (S+F) over time. As another example, the maximum energy threshold can be evaluated as a maximum value of the duration δ (which would be set to prevent an amount of seed energy (S) from being deposited into the fiber amplifier 116 that may cause damage when taking the values for $E_P$ and a presumed value for F into consideration.

While the toy examples above use simplified values for the model parameters (e.g. the values for $E_P$ and δ) for the purpose of ease of explanation, it should be understood that practitioners can select values for the model parameters or otherwise adjust the model components to accurately reflect the characteristics and capabilities of the laser source 102 being used. For example, the values for $E_P$, a, and b can be empirically determined from testing of a pulsed fiber laser source (or these values can be provided by a vendor of the pulsed fiber laser source). Moreover, a minimum value for δ can also be a function of the pulsed fiber laser source 102. That is, the pulsed fiber laser sources available from different vendors may exhibit different minimum values for δ, and this minimum value for δ (which reflects a maximum achievable number of shots per second) can be included among the vendor's specifications for its pulsed fiber laser source.

Furthermore, in situations where the pulsed fiber laser source 102 is expected or observed to exhibit nonlinear behaviors, such nonlinear behavior can be reflected in the model. As an example, it can be expected that the pulsed fiber laser source 102 will exhibit energy inefficiencies at high power levels. In such a case, the modeling of the seed energy (S) can make use of a clipped, offset (affine) model for the energy that gets delivered to the fiber amplifier 116 by pump laser 118 for pulse generation. For example, in this case, the seed energy can be modeled in the laser energy model 108 as:

$$S(t+\delta)=E_P\max(a_1\delta+a_0,\text{offset})$$

The values for $a_1$, $a_0$, and offset can be empirically measured for the pulsed fiber laser source 102 and incorporated into the modeling of $S(t+\delta)$ used within the laser energy model 108. It can be seen that for a linear regime, the value for $a_1$ would be 1, and the values for $a_0$ and offset would be 0. In this case, the model for the seed energy $S(t+\delta)$ reduces to $\delta E_P$ as discussed in the examples above.

Figure 2B:
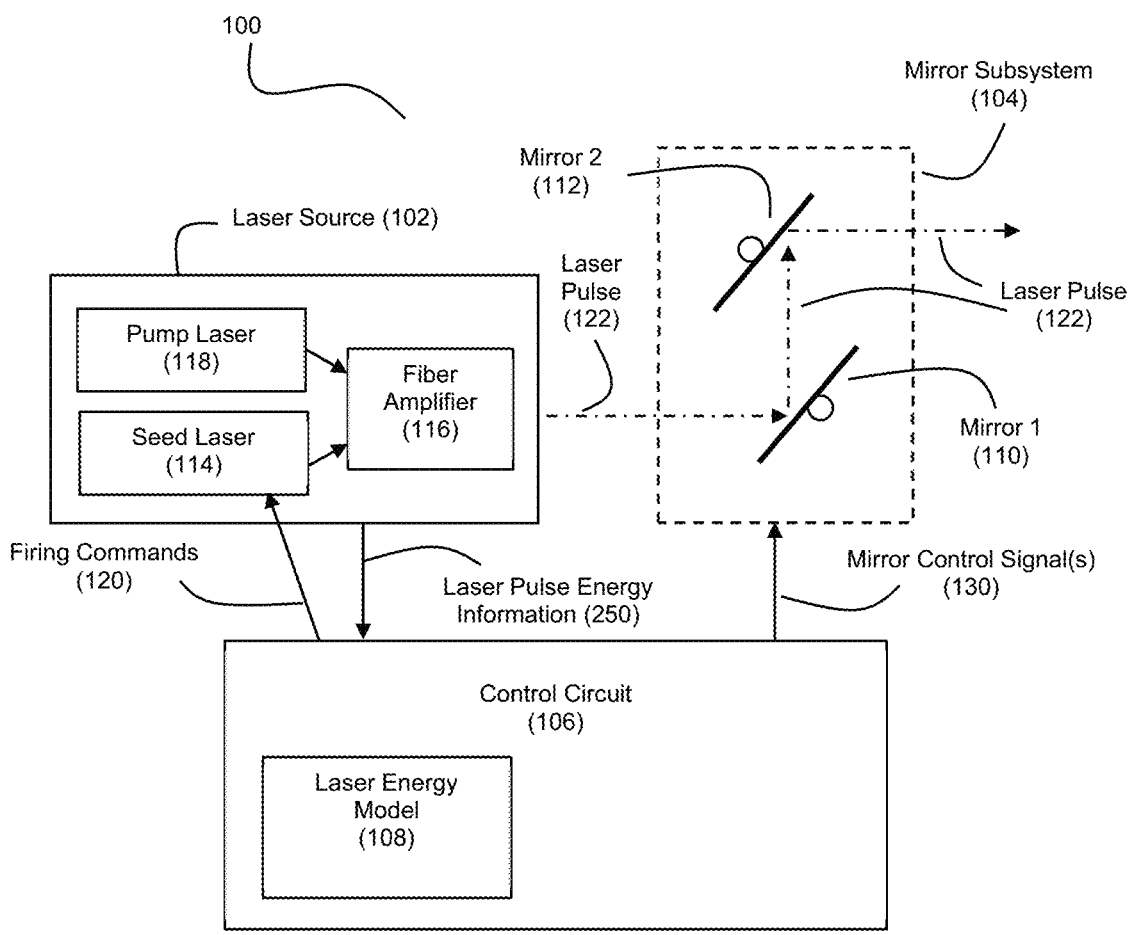
FIG. 2B-2D depict additional examples of lidar transmitters that use a laser energy model to schedule laser pulses.

The control circuit 106 can also update the laser energy model 108 based on feedback that reflects the energies within the actual laser pulses 122. In this fashion, laser energy model 108 can better improve or maintain its accuracy over time. In an example embodiment, the laser source 102 can monitor the energy within laser pulses 122 at the time of firing. This energy amount can then be reported by the laser source 102 to the control circuit 106 (see 250 in FIG. 2B) for use in updating the model 108. Thus, if the control circuit 106 detects an error between the actual laser pulse energy and the modeled pulse energy, then the control circuit 106 can introduce an offset or other adjustment into model 108 to account for this error.

For example, it may be necessary to update the values for a and b to reflect actual operational characteristics of the laser source 102. As noted above, the values of a and b define how much energy is transferred from the fiber amplifier 116 into the laser pulse 122 when the laser source 102 is triggered and the seed laser 114 induces the pulse 122 to exit the fiber amplifier 116. An updated value for a can be computed from the monitored energies in transmitted pulses 122 (PE) as follows:

$$a=\operatorname{argmin}_a(\Sigma_{k=1\ldots N}|PE(t_k+\delta_k)+aPE(t_k)-(1-a)\delta t_k|^2)$$

In this expression, the values for PE represent the actual pulse energies at the referenced times ($t_k$ or $t_k+\delta_k$). This is a regression problem and can be solved using commercial software tools such as those available from MATLAB, Wolfram, PTC, ANSYS, and others. In an ideal world, the respective values for PE(t) and PE(t+δ) will be the same as the modeled values of EF(t) and EF(t+δ), However, for a variety of reasons, the gain factors a and b may vary due to laser efficiency considerations (such as heat or aging whereby back reflections reduce the resonant efficiency in the laser cavity). Accordingly, a practitioner may find it useful to update the model 108 over time to reflect the actual operational characteristics of the laser source 102 by periodically computing updated values to use for a and b.

Figure 2C:
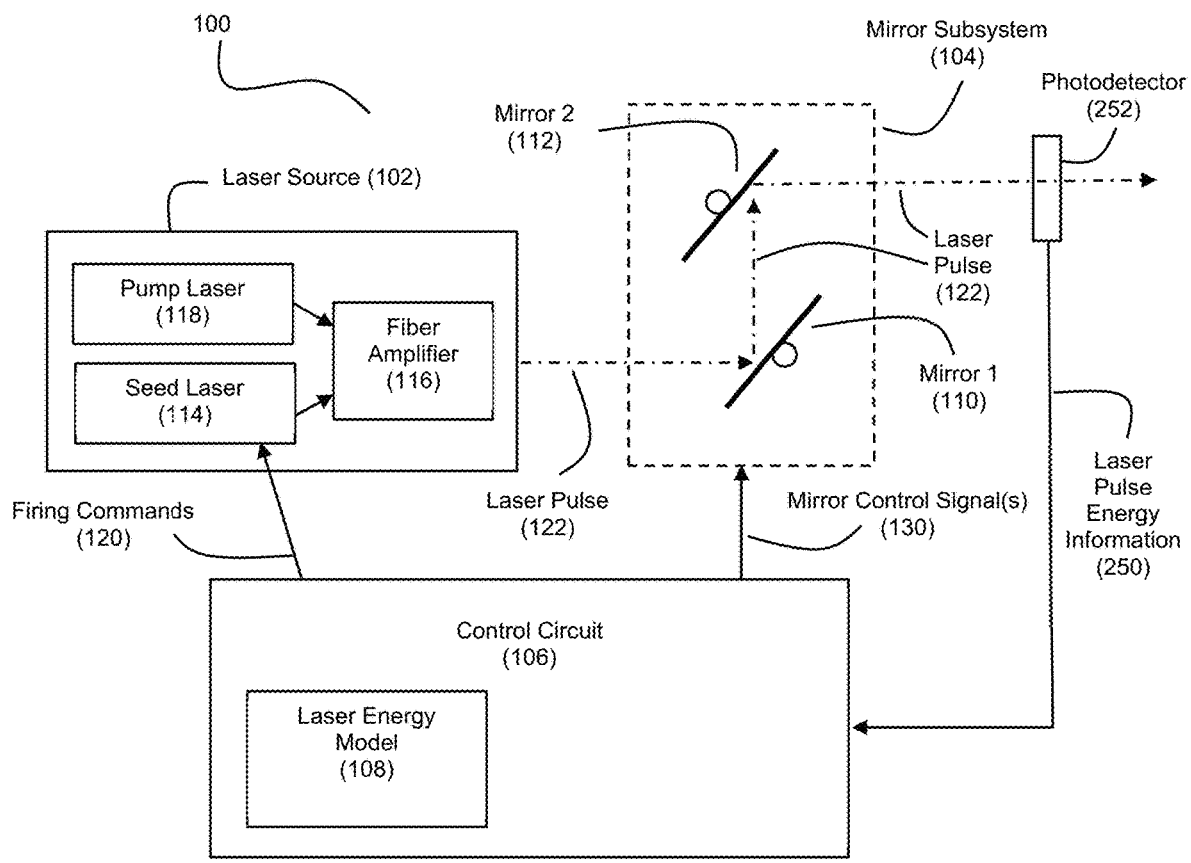
Figure 2D:
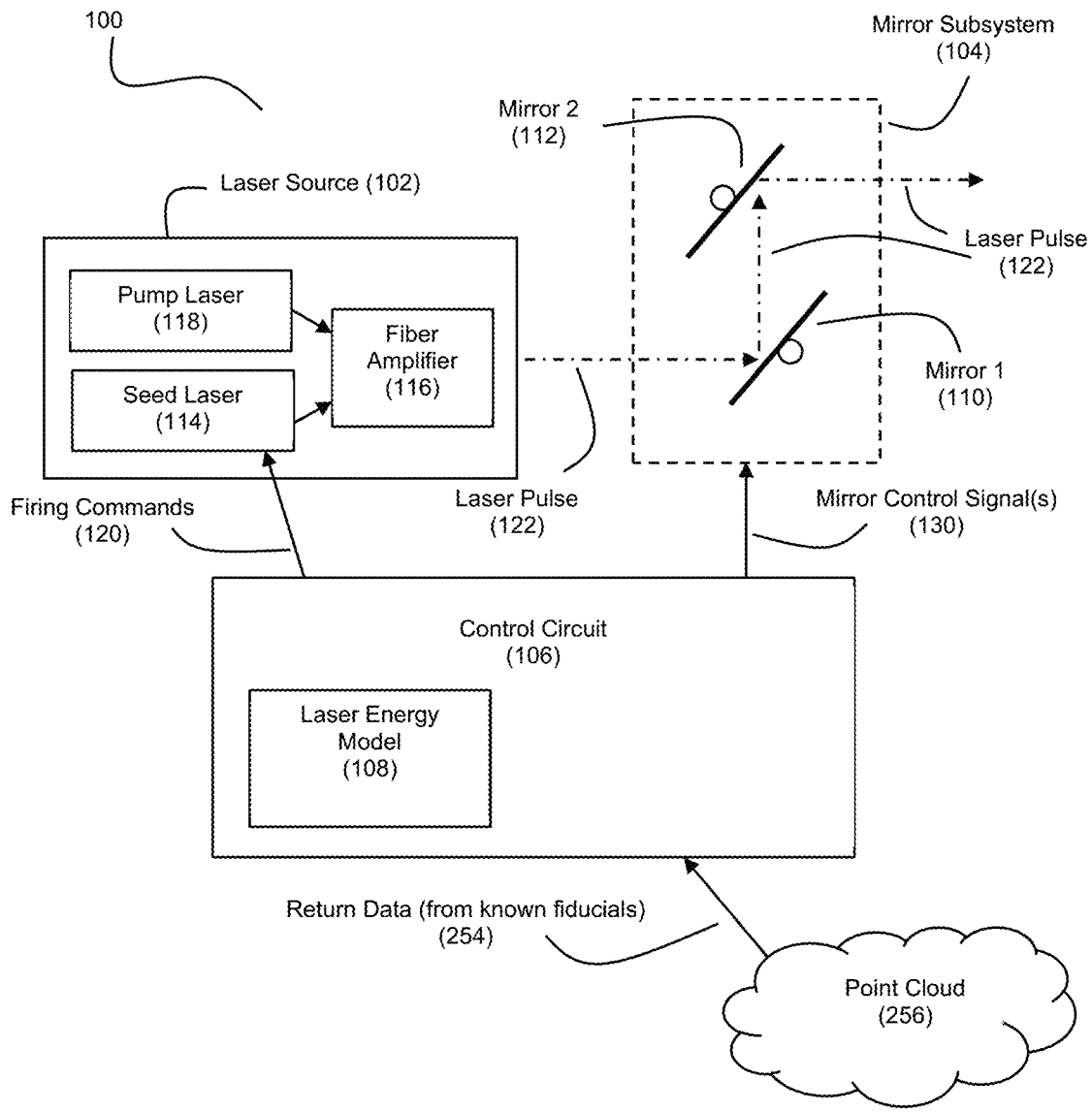

In scenarios where the laser source 102 does not report its own actual laser pulse energies, a practitioner can choose to include a photodetector at or near an optical exit aperture of the lidar transmitter 100 (e.g., see photodetector 252 in FIG. 2C). The photodetector 252 can be used to measure the energy within the transmitted laser pulses 122 (while allowing laser pulses 122 to propagate into the environment toward their targets), and these measured energy levels can be used to detect potential errors with respect to the modeled energies for the laser pulses so model 108 can be adjusted as noted above. As another example for use in a scenario where the laser source 102 does not report its own actual laser pulse energies, a practitioner derives laser pulse energy from return data 254 with respect to returns from known fiducial objects in a field of view (such as road signs which are regulated in terms of their intensity values for light returns) (see 254 in FIG. 2D) as obtained from a point cloud 256 for the lidar system. Additional details about such energy derivations are discussed below. Thus, in such an example, the model 108 can be periodically re-calibrated using point cloud data for returns from such fiducials, whereby the control circuit 106 derives the laser pulse energy that would have produced the pulse return data found in the point cloud 256. This derived amount of laser pulse energy can then be compared with the modeled laser pulse energy for adjustment of the laser energy model 108 as noted above.

Modeling Mirror Motion Over Time:

In a particularly powerful example embodiment, the control circuit 106 can also model mirror motion to predict where the mirror subsystem 104 will be aimed at a given point in time. This can be especially helpful for lidar transmitters 100 that selectively target specific range points in the field of view with laser pulses 122. By coupling the modeling of laser energy with a model of mirror motion, the control circuit 106 can set the order of specific laser pulse shots to be fired to targeted range points with highly granular and optimized time scales. As discussed in greater detail below, the mirror motion model can model mirror motion over short time intervals (such as over time intervals in a range from 5-50 nanoseconds). Such a short interval mirror motion model can be referred to as a transient mirror motion model.

Figure 3:
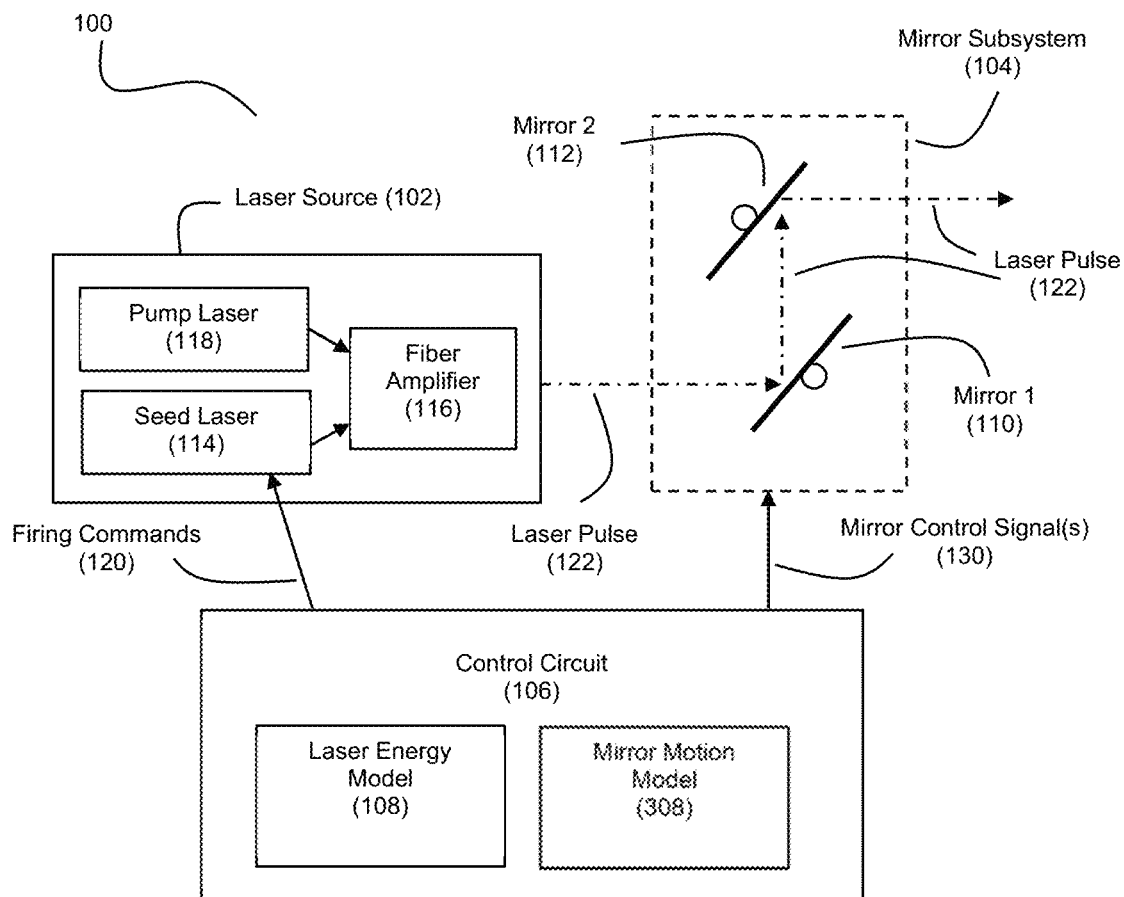
FIG. 3 depicts an example lidar transmitter that uses a laser energy model and a mirror motion model to schedule laser pulses.

FIG. 3 shows an example lidar transmitter 100 where the control circuit 106 uses both a laser energy model 108 and a mirror motion model 308 to govern the timing schedule for laser pulses 122.

In an example embodiment, the mirror subsystem 104 can operate as discussed above in connection with FIG. 1. For example, the control circuit 106 can (1) drive mirror 110 in a resonant mode using a sinusoidal signal to scan mirror 110 across different azimuth angles and (2) drive mirror 112 in a point-to-point mode using a step signal to scan mirror 112 across different elevations, where the step signal will vary as a function of the elevations of the range points to be targeted with laser pulses 122. Mirror 110 can be scanned as a fast-axis mirror, while mirror 112 is scanned as a slow-axis mirror. In such an embodiment, a practitioner can choose to use the mirror motion model 308 to model the motion of mirror 110 as (comparatively) mirror 112 can be characterized as effectively static for one or more scans across azimuth angles.

Figure 4A:
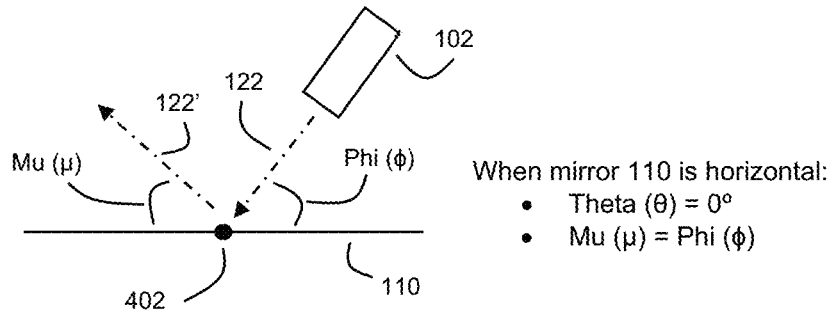
FIGS. 4A-4D illustrate how mirror motion can be modeled for a mirror that scans in a resonant mode.
Figure 4B:
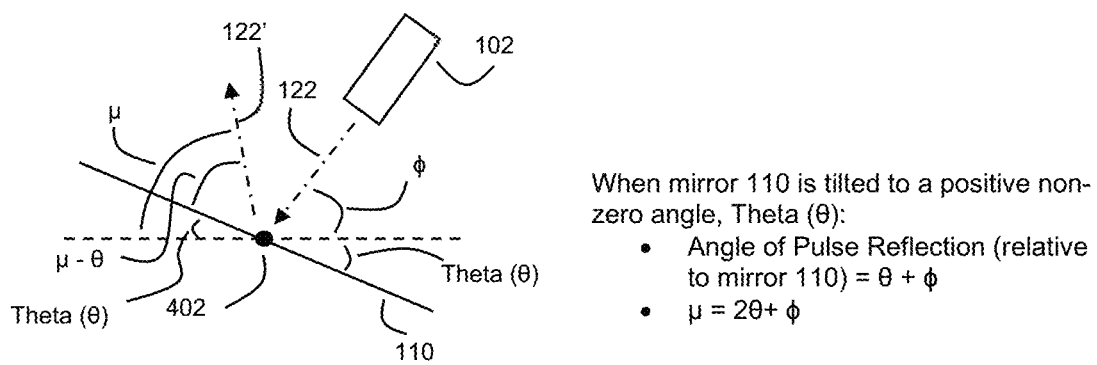
Figure 4C:
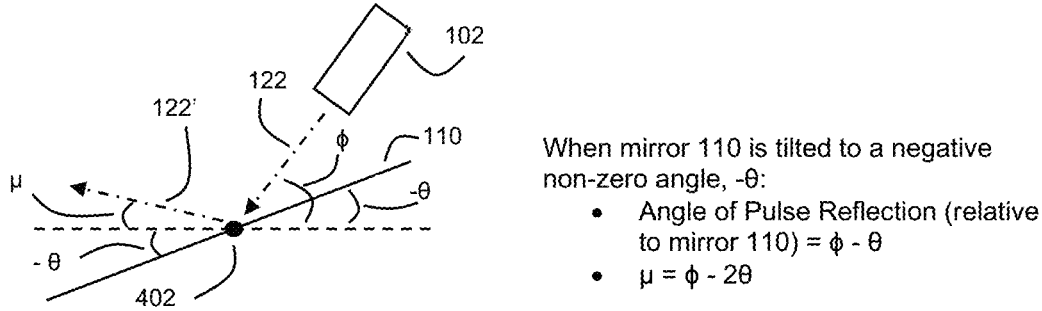

FIGS. 4A-4C illustrate how the motion of mirror 110 can be modeled over time. In these examples, (1) the angle theta ($\theta$) represents the tilt angle of mirror 110, (2) the angle phi ($\phi$) represents the angle at which a laser pulse 122 from the laser source 102 will be incident on mirror 110 when mirror 110 is in a horizontal position (where $\theta$ is zero degrees—see FIG. 4A), and (3) the angle mu ($\mu$) represents the angle of pulse 422 as reflected by mirror 110 relative to the horizontal position of mirror 110. In this example, the angle $\mu$ can represent the scan angle of the mirror 110, where this scan angle can also be referred to as a shot angle for mirror 110 as angle $\mu$ corresponds to the angle at which reflected laser pulse 122' will be directed into the field of view if fired at that time.

FIG. 4A shows mirror 110, where mirror 110 is at "rest" with a tilt angle $\theta$ of zero degrees, which can be characterized as the horizon of mirror 110. Laser source 102 is oriented in a fixed position so that laser pulses 122 will impact mirror 110 at the angle $\phi$ relative to the horizontal position of mirror 110. Given the property of reflections, it should be understood that the value of the shot angle $\mu$ will be the same as the value of angle $\phi$ when the mirror 110 is horizontal (where $\theta=0$).

FIG. 4B shows mirror 110 when it has been tilted about pivot 402 to a positive non-zero value of 0. It can be seen that the tilting of mirror to angle $\theta$ will have the effect of steering the reflected laser pulse 122' clockwise and to the right relative to the angle of the reflected laser pulse 122' in FIG. 4A (when mirror 110 was horizontal).

Mirror 110 will have a maximum tilt angle that can be referred to as the amplitude A of mirror 110. Thus, it can be understood that mirror 110 will scan through its tilt angles between the values of $-A$ (which corresponds to $-\theta_{Max}$) and $+A$ (which corresponds to $+\theta_{Max}$). It can be seen that the angle of reflection for the reflected laser pulse 122' relative to the actual position of mirror 110 is the sum of $\theta+\phi$ as shown by FIG. 4B. In then follows that the value of the shot angle $\mu$ will be equal to $2\theta+\phi$, as can be seen from FIG. 4B.

When driven in a resonant mode according to sinusoidal control signal, mirror 110 will change its tilt angle $\theta$ according to a cosine oscillation, where its rate of change is slowest at the ends of its scan (when it changes its direction of tilt) and fastest at the mid-point of its scan. In an example where the mirror 110 scans between maximum tilt angles of $-A$ to $+A$, the value of the angle $\theta$ as a function of time can be expressed as:

$$\theta = A\cos(2\pi f t)$$

where f represents the scan frequency of mirror 110 and t represents time. Based on this model, it can be seen that the value for $\theta$ can vary from A (when $t=0$) to 0 (when t is a value corresponding to 90 degrees of phase (or 270 degrees of phase) to $-A$ (when t is a value corresponding to 180 degrees of phase).

This means that the value of the shot angle $\mu$ can be expressed as a function of time by substituting the cosine expression for $\theta$ into the expression for the shot angle of $\mu = 2\theta + \phi$ as follows:

$$\mu = 2A\cos(2\pi f t) + \varphi$$

From this expression, one can then solve for t to produce an expression as follows:

$$t = \frac{\arccos\left(\frac{\mu - \varphi}{2A}\right)}{2\pi f}$$

This expression thus identifies the time t at which the scan of mirror 110 will target a given shot angle $\phi$. Thus, when the control circuit 106 wants to target a shot angle of ft, the time at which mirror 110 will scan to this shot angle can be readily computed given that the values for $\phi$, A, and f will be known. In this fashion, the mirror motion model 308 can model that shot angle as a function of time and predict the time at which the mirror 110 will target a particular shot angle.

FIG. 4C shows mirror 110 when it has been tilted about pivot 402 to a negative non-zero value of $-\theta$. It can be seen that the tilting of mirror to angle $-\theta$ will have the effect of steering the reflected laser pulse 122' counterclockwise and to the left relative to the angle of the reflected laser pulse 122' in FIG. 4A (when mirror 110 was horizontal). FIG. 4C also demonstrates a constraint for a practitioner in the selection of the value for the angle $\phi$. Laser source 102 will need to be positioned so that the angle $\phi$ is greater than the value of A to avoid a situation where the underside of the tilted mirror 110 occludes the laser pulse 122 when mirror is tilted to a value of $\theta$ that is greater than $\phi$. Furthermore, the value of the angle $\phi$ should not be 90° to avoid a situation where the mirror 110 will reflect the laser pulse 122 back into the laser source 102. A practitioner can thus position the laser source 102 at a suitable angle $\phi$ accordingly.

Figure 4D:
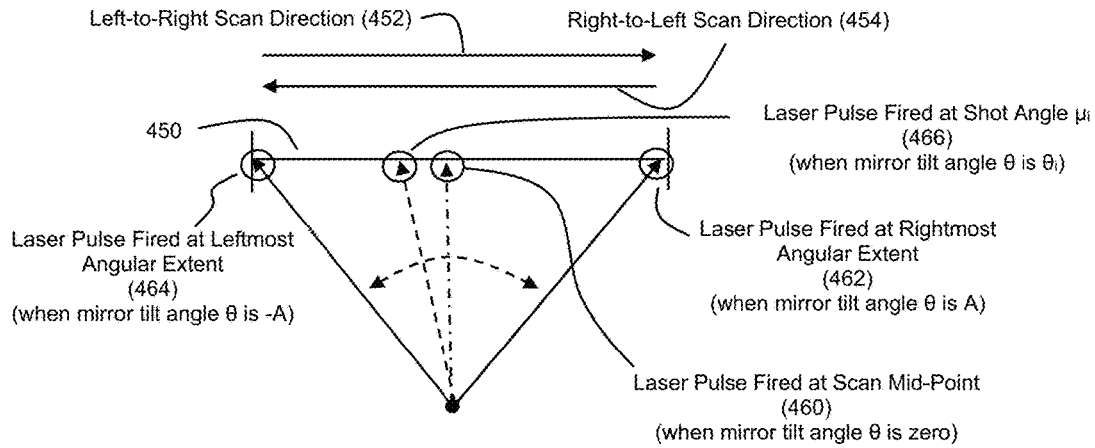

FIG. 4D illustrates a translation of this relationship to how the mirror 110 scans across a field of view 450. The mirror 110 will alternately scan in a left-to-right direction 452 and right-to-left direction 454 as mirror 110 tilts between its range of tilt angles (e.g., $\theta=-A$ through $+A$). For the example of FIG. 4A where the value for $\theta$ is zero, this means that a laser pulse fired at the untilted mirror 110 will be directed as shown by 460 in FIG. 4D, where the laser pulse is directed toward a range point at the mid-point of scan. The shot angle $\mu$ for this "straight ahead" gaze is $\phi$ as discussed above in connection with FIG. 4A. As the angle $\theta$ increases from $\theta=0$, this will cause the laser pulses directed by mirror 110 to scan to the right in the field of view until the mirror 110 tilts to the angle $\theta=+A$. When $\theta=+A$, mirror 110 will be at the furthest extent of its rightward scan 452, and it will direct a laser pulse as shown by 462. The shot angle $\mu$ for this rightmost scan position will be the value $\mu=2A+\phi$. From that point, the mirror 110 will begin scanning leftward in direction 454 by reducing its tilt angle $\theta$. The mirror 110 will once again scan through the mid-point and eventually reach a tilt angle of $\theta=-A$. When $\theta=-A$, mirror 110 will be at the furthest extent of its leftward scan 452, and it will direct a laser pulse as shown by 464. The shot angle $\mu$ for this leftmost scan position will be the value $\mu=\phi-2A$. From that point, the mirror 110 will begin tilting in the rightward direction 450 again, and the scan repeats. As noted above, due to the mirror motion model 308, the control circuit 106 will know the time at which the mirror 110 is targeting a shot angle of $\mu_i$ to direct a laser pulse as shown by 466 of FIG. 4D.

In an example embodiment, the values for $+A$ and $-A$ can be values in a range between $+/-10$ degrees and $+/-20$ degrees (e.g., $+/-16$ degrees) depending on the nature of mirror chosen as mirror 110. In an example where A is 16 degrees and mirror 110 scans as discussed above in connection with FIGS. 4A-4D, it can be understood that the angular extent of the scan for mirror 110 would be 64 degrees (or 2 A from the scan mid-point in both the right and left directions for a total of 4 A).

Figure 4E:
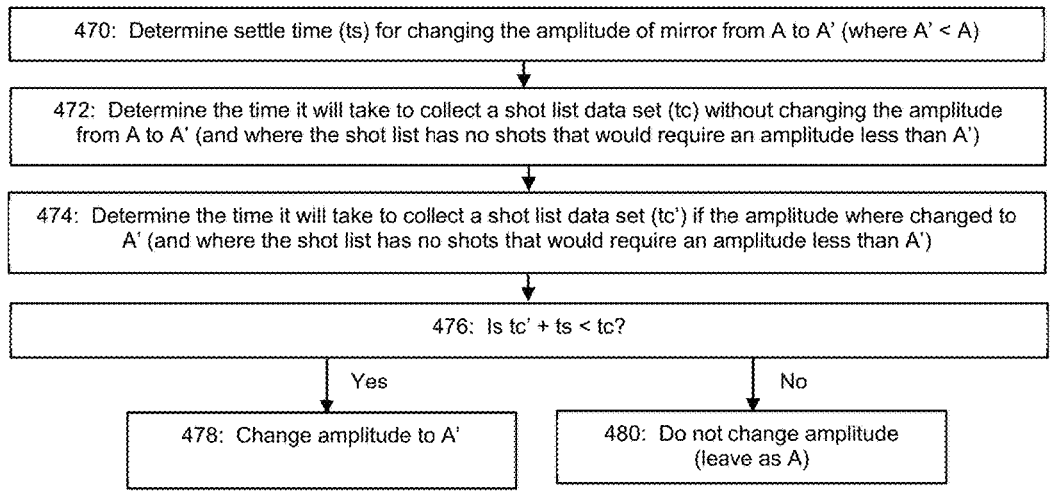
FIG. 4E depicts an example process flow for controllably adjusting an amplitude for mirror scanning.

In some example embodiments, the value for A in the mirror motion model 308 can be a constant value. However, some practitioners may find it desirable to deploy a mirror 110 that exhibits an adjustable value for A (e.g., a variable amplitude mirror such as a variable amplitude MEMS mirror can serve as mirror 110). From the relationships discussed above, it can be seen that the time required to move between two shot angles is reduced when the value for amplitude A is reduced. The control circuit 106 can leverage this relationship to determine whether it is desirable to adjust the amplitude of the mirror 110 before firing a sequence of laser pulses 122. FIG. 4E shows an example process flow in this regard. At step 470, the control circuit 106 determines the settle time (ts) for changing the amplitude from A to A' (where A'<A). It should be understood that changing the mirror amplitude in this fashion will introduce a time period where the mirror is relatively unstable, and time will need to be provided to allow the mirror to settle down to a stable position. This settling time can be empirically determined or tracked for the mirror 110, and the control circuit 106 can maintain this settle time value as a control parameter. At step 472, the control circuit 106 determines the time it will take to collect a shot list data set in a circumstance where the amplitude of the mirror is unchanged (amplitude remains A). This time can be referenced as collection time tc. This value for tc can be computed through the use of the laser energy model 108 and mirror motion model 308 with reference to the shots included in a subject shot list. At step 474, the control circuit 106 determines the time it will take to collect the same shot list data set in a circumstance where the amplitude of the mirror is changed to A'. This time can be referenced as collection time tc'. This value for tc' can be computed through the use of the laser energy model 108 and mirror motion model 308 (as adjusted in view of the reduced amplitude of A') with reference to the shots included in the subject shot list. At step 476, the control circuit compares tc with the sum of tc' and ts. If the sum (tc'+ts) is less than tc, this means that it will be time efficient to change the mirror amplitude to A'. In this circumstance, the process flow proceeds to step 478, and the control circuit 106 adjusts the amplitude of mirror 110 to A'. If the sum (tc'+ts) is not less than tc, then the control circuit 106 leaves the amplitude value unchanged (step 480).

Figure 5:
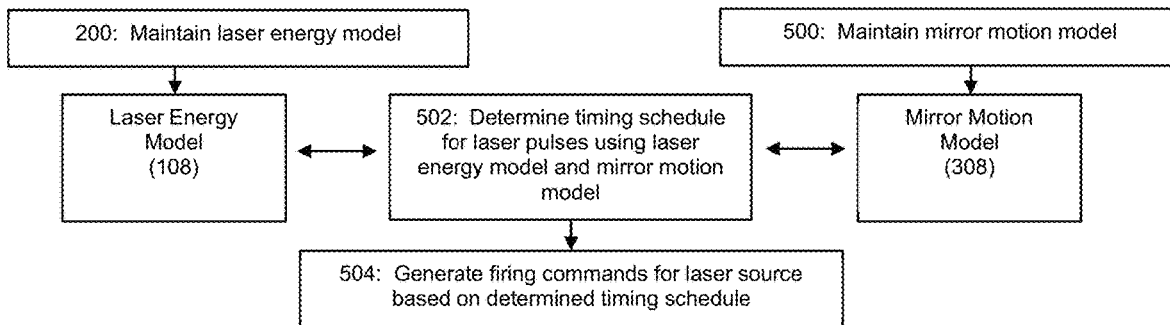
FIG. 5 depicts an example process flow for the control circuit of FIG. 3.

Model-Based Shot Scheduling:

FIG. 5 shows an example process flow for the control circuit 106 to use both the laser energy model 108 and the mirror motion model 308 to determine the timing schedule for laser pulses 122. Step 200 can operate as described above with reference to FIG. 2A to maintain the laser energy model 108. At step 500, the control circuit 106 maintains the mirror motion model 308. As discussed above, this model 308 can model the shot angle that the mirror will target as a function of time. Accordingly, the mirror motion model 308 can predict the shot angle of mirror 110 at a given time t. To maintain and update the model 308, the control circuit 108 can establish the values for A, φ, and f to be used for the model 308. These values can be read from memory or determined from the operating parameters for the system.

At step 502, the control circuit 106 determines a timing schedule for laser pulses 122 using the laser energy model 108 and the mirror motion model 308. By linking the laser energy model 108 and the mirror motion model 308 in this regard, the control circuit 106 can determine how much energy is available for laser pulses targeted toward any of the range points in the scan pattern of mirror subsystem 104. For purposes of discussion, we will consider an example embodiment where mirror 110 scans in azimuth between a plurality of shot angles at a high rate while mirror 112 scans in elevation at a sufficiently slower rate so that the discussion below will assume that the elevation is held steady while mirror 110 scans back and forth in azimuth. However, the techniques described herein can be readily extended to modeling the motion of both mirrors 110 and 112.

If there is a desire to target a range point at a Shot Angle A with a laser pulse of at least X units of energy, the control circuit 106, at step 502, can consult the laser energy model 108 to determine whether there is sufficient laser energy for the laser pulse when the mirror 110's scan angle points at Shot Angle A. If there is sufficient energy, the laser pulse 122 can be fired when the mirror 110 scans to Shot Angle A. If there is insufficient energy, the control circuit 106 can wait to take the shot until after mirror 110 has scanned through and back to pointing at Shot Angle A (if the laser energy model 108 indicates there is sufficient laser energy when the mirror returns to Shot Angle A). The control circuit 106 can compare the shot energy requirements for a set of shot angles to be targeted with laser pulses to determine when the laser pulses 122 should be fired. Upon determination of the timing schedule for the laser pulses 122, the control circuit 106 can generate and provide firing commands 120 to the laser source 102 based on this determined timing schedule (step 504).

Figure 6A:
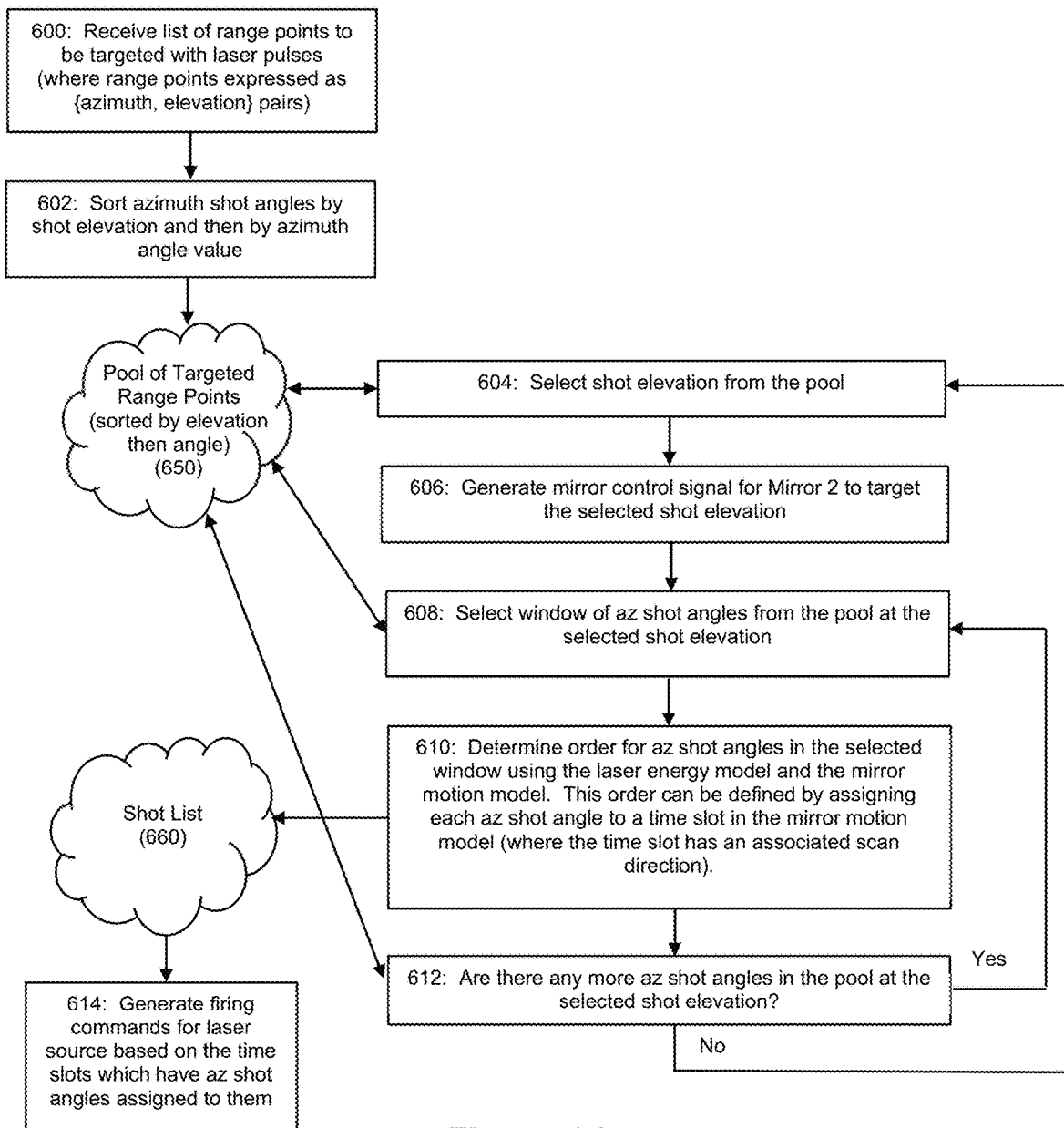
FIGS. 6A and 6B depict example process flows for shot scheduling using the control circuit of FIG. 3.
Figure 6B:
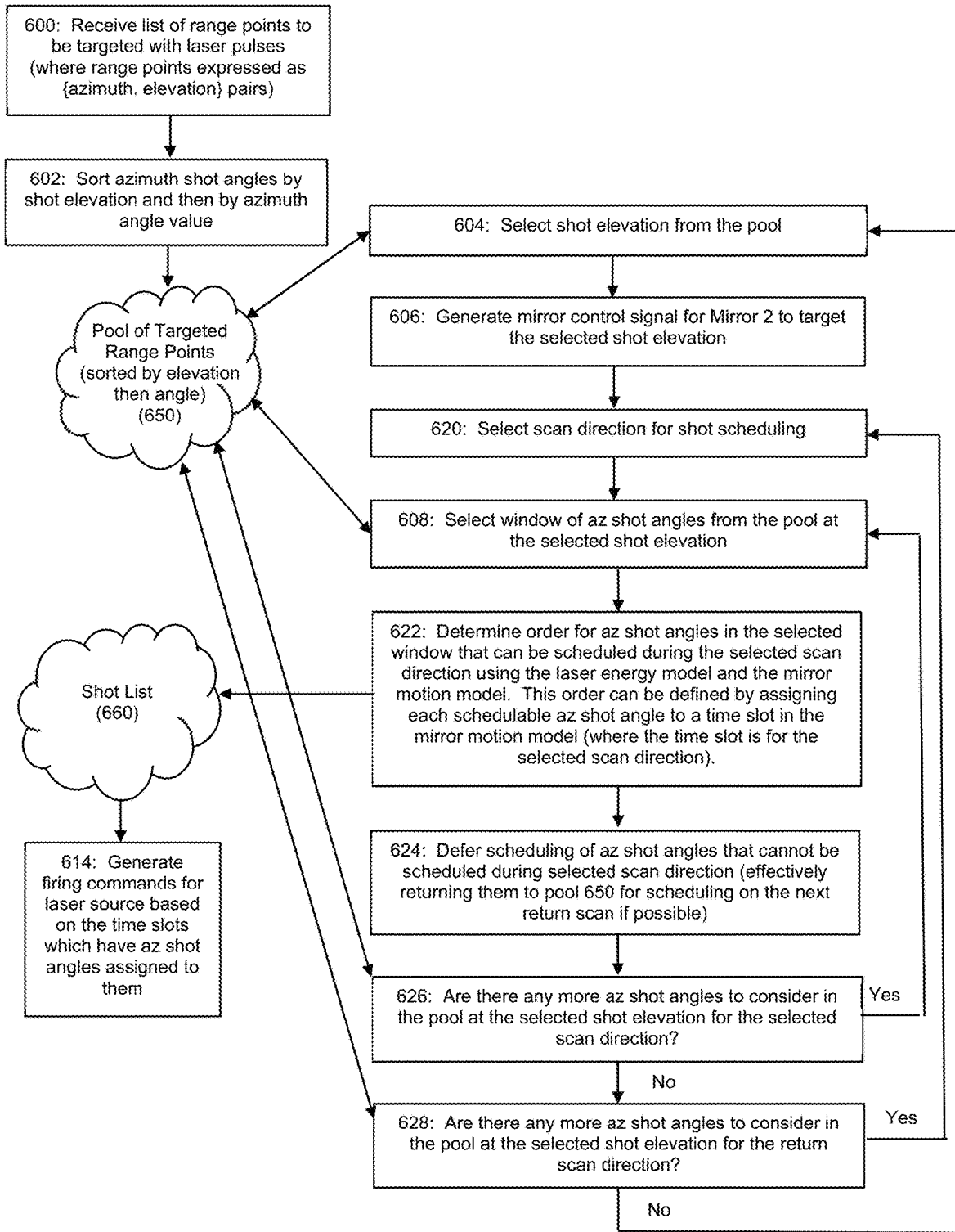

FIGS. 6A and 6B show example process flows for implementing steps 502 and 504 of FIG. 5 in a scenario where the mirror subsystem 104 includes mirror 110 that scans through azimuth shot angles in a resonant mode (fast-axis) and mirror 112 that scans through elevation shot angles in a point-to-point mode (slow-axis). Lidar transmitter 100 in these examples seeks to fire laser pulses 122 at intelligently selected range points in the field of view. With the example of FIG. 6A, the control circuit 106 schedules shots for batches of range points at a given elevation on whichever scan direction of the mirror 110 is schedulable for those range points according to the laser energy model 108. With the example of FIG. 6B, the control circuit 106 seeks to schedule shots for as many range points as it can at a given elevation for each scan direction of the mirror 110 in view of the laser energy model 108. For any shots at the subject elevation that cannot be scheduled for a given scan direction due to energy model constraints, the control circuit 106 then seeks to schedule those range points on the reverse scan (and so on until all of the shots are scheduled).

The process flow of FIG. 6A begins with step 600. At step 600, the control circuit 106 receives a list of range points to be targeted with laser pulses. These range points can be expressed as (azimuth angle, elevation angle) pairs, and they may be ordered arbitrarily.

At step 602, the control circuit 106 sorts the range points by elevation to yield sets of azimuth shot angles sorted by elevation. The elevation-sorted range points can also be sorted by azimuth shot angle (e.g., where all of the shot angles at a given elevation are sorted in order of increasing azimuth angle (smallest azimuth shot angle to largest azimuth shot angle) or decreasing azimuth angle (largest azimuth shot angle to smallest azimuth shot angle). For the purposes of discussing the process flows of FIGS. 6A and 6B, these azimuth shot angles can be referred to as the shot angles for the control circuit 106. Step 602 produces a pool 650 of range points to be targeted with shots (sorted by elevation and then by shot angle).

At step 604, the control circuit 106 selects a shot elevation from among the shot elevations in the sorted list of range points in pool 650. The control circuit 106 can make this selection on the basis of any of a number of criteria. The order of selection of the elevations will govern which elevations are targeted with laser pulses 122 before others.

Figure 17A:
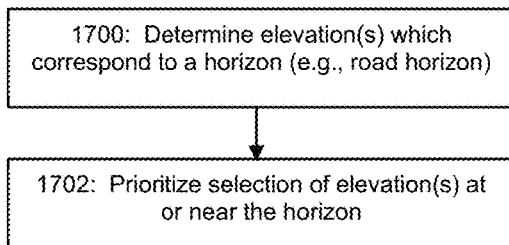
FIGS. 17A-17F depict example process flows for prioritized selections of elevations with respect to shot scheduling.

Accordingly, in an example embodiment, the control circuit 106 can prioritize the selection of elevations at step 604 that are expected to encompass regions of interest in the field of view. As an example, some practitioners may find the horizon in the field of view (e.g., a road horizon) to be high priority for targeting with laser pulses 122. In such a case, step 604 can operate as shown by FIG. 17A to determine the elevation(s) which correspond to a horizon in the field of view (e.g. identify the elevations at or near the road horizon) (see step 1702) and then prioritize the selection of those elevations from pool 650 (see step 1702). Step 1702 can be performed by analyzing lidar return point cloud data and/or camera images of the field of view to identify regions in the field of view that are believed to qualify as the horizon (e.g., using contrast detection techniques, edge detection techniques, and/or other pattern processing techniques applied to lidar or image data).

Figure 17B:
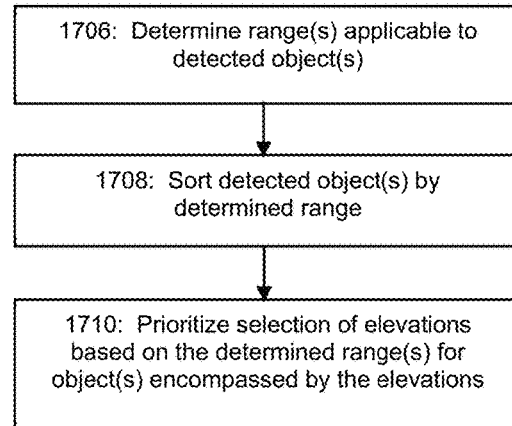

As another example, the control circuit 106 can prioritize the selection of elevations based on the range(s) to detected object(s) in the field of view. Some practitioners may find it desirable to prioritize the shooting of faraway objects in the field of view. Other practitioners may find it desirable to prioritize the shooting of nearby objects in the field of view. Thus, in an example such as that shown by FIG. 17B, the range(s) applicable to detected object(s) is determined (see step 1706). This range information will be available from the lidar return point cloud data. At step 1708, the control circuit sorts the detected object(s) by their determined range(s). Then, at step 1710, the control circuit 106 prioritizes the selection of elevations from pool 650 based on the determined range(s) for object(s) included in those elevations. With step 1710, prioritization can be given to larger range values than for smaller range values if the practitioner wants to shoot faraway objects before nearby objects. For practitioners that want to shoot nearby objects before faraway objects, step 1710 can give priority to smaller range values than for larger range values. Which objects are deemed faraway and which are deemed nearby can be controlled using any of a number of techniques. For example, a range threshold can be defined, and the control circuit 106 can make the elevation selections based on which elevations include sorted objects whose range is above (or below as the case may be) the defined range threshold. As another example, the relative ranges for the sorted objects can be used to control the selection of elevations (where the sort order of either farthest to nearest or nearest to farthest governs the selection of elevations which include those objects).

Figure 17C:
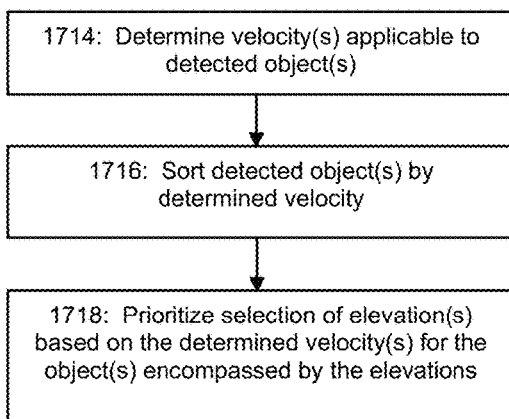

As yet another example, the control circuit 106 can prioritize the selection of elevations based on the velocity(ies) of detected object(s) in the field of view. Some practitioners may find it desirable to prioritize the shooting of fast-moving objects in the field of view. FIG. 17C shows an example process flow for this. At step 1714, the velocity is determined for each detected object in the field of view. This velocity information can be derived from the lidar return point cloud data. At step 1716, the control circuit 106 can sort the detected object(s) by the determined velocity(ies). The control circuit 106 can then use determined velocities for the sorted objects as a basis for prioritizing the selection of elevations which contain those detected objects (step 1718). This prioritization at step 1718 can be carried out in any of a number of ways. For example, a velocity threshold can be defined, and step 1718 can prioritize the selection of elevation include an object moving at or above this defined velocity threshold. As another example, the relative velocities of the sorted objects can be used where an elevation that includes an object moving faster than another object can be selected before an elevation that includes the another (slower moving) object.

Figure 17D:
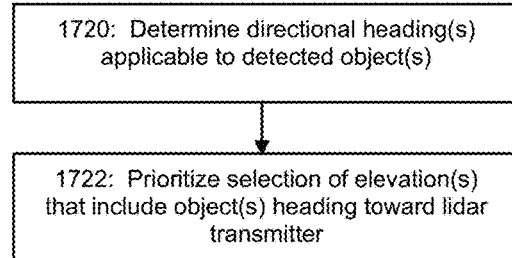

As yet another example, the control circuit 106 can prioritize the selection of elevations based on the directional heading(s) of detected object(s) in the field of view. Some practitioners may find it desirable to prioritize the shooting of objects in the field of view that moving toward the lidar transmitter 100. FIG. 17D shows an example process flow for this. At step 1720, the directional heading is determined for each detected object in the field of view. This directional heading can be derived from the lidar return point cloud data. The control circuit 1722 can then prioritize the selection of elevation(s) that include object(s) that are determined to be heading toward the lidar transmitter 100 (within some specified degree of tolerance where the elevation that contains an object heading near the lidar transmitter 100 would be selected before an elevation that contains an object moving away from the lidar transmitter 100).

Figure 17E:
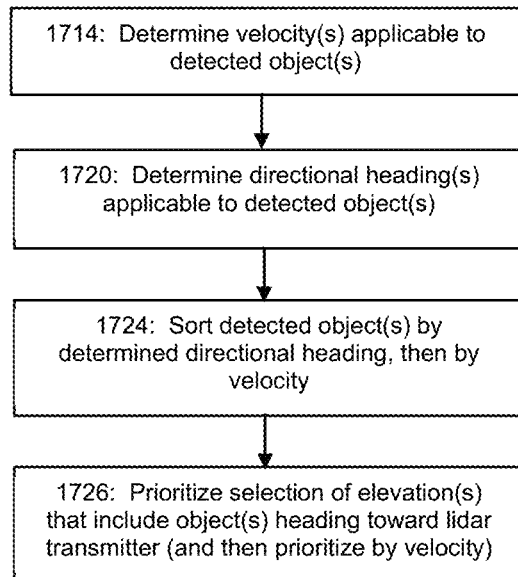

Further still, some practitioners may find it desirable to combine the process flows of FIGS. 17C and 17D to prioritize the selection of fast-moving objects that are heading toward the lidar transmitter 100. An example for this is shown by FIG. 17E. With FIG. 17E, steps 1714 and 1720 can be performed as discussed above. At step 1724, the detected object(s) are sorted by their directional headings (relative to the lidar transmitter 100) and then by the determined velocities. At step 1726, the elevations which contain objected deemed to be heading toward the lidar transmitter 100 (and moving faster than other such objects) are prioritized for selection.

Figure 17F:
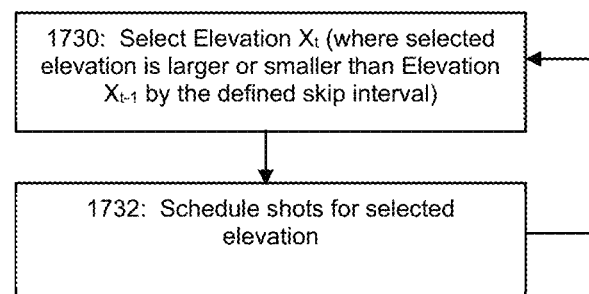

In another example embodiment, the control circuit 106 can select elevations at step 604 based on eye safety or camera safety criteria. For example, eye safety requirements may specify that the lidar transmitter 100 should not direct more than a specified amount of energy in a specified spatial area over of a specified time period. To reduce the risk of firing too much energy into the specified spatial area, the control circuit 106 can select elevations in a manner that avoids successive selections of adjacent elevations (e.g., jumping from Elevation 1 to Elevation 3 rather than Elevation 2) to insert more elevation separation between laser pulses that may be fired close in time. This manner of elevation selection may optionally be implemented dynamically (e.g., where elevation skips are introduced if the control circuit 106 determines that the energy in a defined spatial area has exceeded some level that is below but approaching the eye safety thresholds). Furthermore, it should be understood that the number of elevations to skip (a skip interval) can be a value selected by a practitioner or user to define how many elevations will be skipped when progressing from elevation-to-elevation. As such, a practitioner may choose to set the elevation skip interval to be a value larger than 1 (e.g., a skip interval of 5, which would cause the system to progress from Elevation 3 to Elevation 9). Furthermore, similar measures can be taken to avoid hitting cameras that may be located in the field of view with too much energy. FIG. 17F depicts an example process flow for this approach. At step 1730, the control circuit 106 selects Elevation $X_t$ (where this selected elevation is larger (or smaller) than the preceding selected elevation (Elevation $X_{t-1}$) by the defined skip interval. Then, the control circuit 106 schedules the shots for the selected elevation (step 1732), and the process flow returns to step 1730 where the next elevation (Elevation $X_{t+1}$) is selected (according to the skip interval relative to Elevation $X_t$).

Thus, it should be understood that step 604 can employ a prioritized classification system that decides the order in which elevations are to be targeted with laser pulses 122 based on the criteria of FIGS. 17A-17F or any combinations of any of these criteria.

At step 606, the control circuit 106 generates a mirror control signal for mirror 112 to drive mirror 112 so that it targets the angle of the selected elevation. As noted, this mirror control signal can be a step signal that steps mirror 112 up (or down) to the desired elevation angle. In this fashion, it can be understood that the control circuit 106 will be driving mirror 112 in a point-to-point mode where the mirror control signal for mirror 112 will vary as a function of the range points to be targeted with laser pulses (and more precisely, as a function of the order of range points to be targeted with laser pulses).

At step 608, the control circuit 106 selects a window of azimuth shot angles that are in the pool 650 at the selected elevation. The size of this window governs how many shot angles that the control circuit 106 will order for a given batch of laser pulses 122 to be fired. This window size can be referred to as the search depth for the shot scheduling. A practitioner can configure the control circuit 106 to set this window size based on any of a number of criteria. While the toy examples discussed below use a window size of 3 for purposes of illustration, it should be understood that practitioners may want to use a larger (or smaller) window size in practice. For example, in an example embodiment, the size of the window may be a value in a range between 2 shots and 12 shots. However, should the control circuit 106 have larger capacities for parallel processing or should there be more lenient time constraints on latency, a practitioner may find it desirable to choose larger window sizes. Furthermore, the control circuit 106 can consider a scan direction for the mirror 110 when selecting the shot angles to include in this window. Thus, if the control circuit 106 is scheduling shots for a scan direction corresponding to increasing shot angles, the control circuit 106 can start from the smallest shot angle in the sorted pool 650 and include progressively larger shot angles in the shot angle sort order of the pool 650. Similarly, if the control circuit 106 is scheduling shots for a scan direction corresponding to decreasing shot angles, the control circuit 106 can start from the largest shot angle in the sorted pool 650 and include progressively smaller shot angles in the shot angle sort order of the pool 650.

At step 610, the control circuit 106 determines an order for the shot angles in the selected window using the laser energy model 108 and the mirror motion model 308. As discussed above, this ordering operation can compare candidate orderings with criteria such as energy requirements relating to the shots to find a candidate ordering that satisfies the criteria. Once a valid candidate ordering of shot angles is found, this can be used as ordered shot angles that will define the timing schedule for the selected window of laser pulses 122. Additional details about example embodiments for implementing step 610 are discussed below.

Once the shot angles in the selected window have been ordered at step 610, the control circuit 106 can add these ordered shot angles to the shot list 660. As discussed in greater detail below, the shot list 660 can include an ordered listing of shot angles and a scan direction corresponding to each shot angle.

At step 612, the control circuit 106 determines whether there are any more shot angles in pool 650 to consider at the selected elevation. In other words, if the window size does not encompass all of the shot angles in the pool 650 at the selected elevation, then the process flow can loop back to step 608 to grab another window of shot angles from the pool 650 for the selected elevation. If so, the process flow can then perform steps 610 and 612 for the shot angles in this next window.

Once all of the shots have been scheduled for the shot angles at the selected elevation, the process flow can loop back from step 612 to step 604 to select the next elevation from pool 650 for shot angle scheduling. As noted above, this selection can proceed in accordance with a defined prioritization of elevations. From there, the control circuit 106 can perform steps 606-614 for the shot angles at the newly selected elevation.

Meanwhile, at step 614, the control circuit 106 generates firing commands 120 for the laser source 102 in accordance with the determined order of shot angles as reflected by shot list 660. By providing these firing commands 120 to the laser source 102, the control circuit 106 triggers the laser source 102 to transmit the laser pulses 122 in synchronization with the mirrors 110 and 112 so that each laser pulse 122 targets its desired range point in the field of view. Thus, if the shot list includes Shot Angles A and C to be fired at during a left-to-right scan of the mirror 110, the control circuit 106 can use the mirror motion model 308 to identify the times at which mirror 110 will be pointing at Shot Angles A and C on a left-to-right scan and generate the firing commands 120 accordingly. The control circuit 106 can also update the pool 650 to mark the range points corresponding to the firing commands 120 as being "fired" to effectively remove those range points from the pool 650.

In the example of FIG. 6B, as noted above, the control circuit 106 seeks to schedule as many shots as possible on each scan direction of mirror 110. Steps 600, 602, 604, and 606 can proceed as described above for FIG. 6A.

At step 620, the control circuit 106 selects a scan direction of mirror 110 to use for scheduling. A practitioner can choose whether this scheduling is to start with a left-to-right scan direction or a right-to-left scan direction. Then, step 608 can operate as discussed above in connection with FIG. 6A, but where the control circuit 106 uses the scan direction selected at step 620 to govern which shot angles are included in the selected window. Thus, if the selected scan direction corresponds to increasing shot angles, the control circuit 106 can start from the smallest shot angle in the sorted pool 650 and include progressively larger shot angles in the shot angle sort order of the pool 650. Similarly, if the selected scan direction corresponds to decreasing shot angles, the control circuit 106 can start from the largest shot angle in the sorted pool 650 and include progressively smaller shot angles in the shot angle sort order of the pool 650.

At step 622, the control circuit 106 determines an order for the shot angles based on the laser energy model 108 and the mirror motion model 308 as discussed above for step 610, but where the control circuit 106 will only schedule shot angles if the laser energy model 108 indicates that those shot angles are schedulable on the scan corresponding to the selected scan direction.

Scheduled shot angles are added to the shot list 660. But, if the laser energy model 108 indicates that the system needs to wait until the next return scan (or later) to take a shot at a shot angle in the selected window, then the scheduling of that shot angle can be deferred until the next scan direction for mirror 110 (see step 624). This effectively returns the unscheduled shot angle to pool 650 for scheduling on the next scan direction if possible.

At step 626, the control circuit 106 determines if there are any more shot angles in pool 650 at the selected elevation that are to be considered for scheduling on the scan corresponding to the selected scan direction. If so, the process flow returns to step 608 to grab another window of shot angles at the selected elevation (once again taking into consideration the sort order of shot angles at the selected elevation in view of the selected scan direction).

Once the control circuit 106 has considered all of the shot angles at the selected elevation for scheduling on the selected scan direction, the process flow proceeds to step 628 where a determination is made as to whether there are any more unscheduled shot angles from pool 650 at the scheduled elevation. If so, the process flow loops back to step 620 to select the next scan direction (i.e., the reverse scan direction). From there, the process flow proceeds through steps 608, 622, 624, 626, and 628 until all of the unscheduled shot angles for the selected elevation have been scheduled and added to shot list 660. Once step 628 results in a determination that all of the shot angles at the selected elevation have been scheduled, the process flow can loop back to step 604 to select the next elevation from pool 650 for shot angle scheduling. As noted above, this selection can proceed in accordance with a defined prioritization of elevations, and the control circuit 106 can perform steps 606, 620, 608, 622, 624, 626, 628, and 614 for the shot angles at the newly selected elevation.

Thus, it can be understood that the process flow of FIG. 6B will seek to schedule all of the shot angles for a given elevation during a single scan of mirror 110 (from left-to-right or right-to-left as the case may be) if possible in view of the laser energy model 108. However, should the laser energy model 108 indicate that more time is needed to fire shots at the desired shot angles, then some of the shot angles may be scheduled for the return scan (or subsequent scan) of mirror 110.

It should also be understood that the control circuit 106 will always be listening for new range points to be targeted with new laser pulses 122. As such, steps 600 and 602 can be performed while steps 604-614 are being performed (for FIG. 6A) or while steps 604, 606, 620, 608, 622, 624, 626, 628, and 614 are being performed (for FIG. 6B). Similarly, step 614 can be performed by the control circuit 106 while the other steps of the FIGS. 6A and 6B process flows are being performed. Furthermore, it should be understood that the process flows of FIGS. 6A and 6B can accommodate high priority requests for range point targeting. For example, as described in U.S. Pat. No. 10,495,757, the entire disclosure of which is incorporated herein by reference, a request may be received to target a set of range points in a high priority manner. Thus, the control circuit 106 can also always be listening for such high priority requests and then cause the process flow to quickly begin scheduling the firing of laser pulses toward such range points. In a circumstance where a high priority targeting request causes the control circuit 106 to interrupt its previous shot scheduling, the control circuit 106 can effectively pause the current shot schedule, schedule the new high priority shots (using the same scheduling techniques) and then return to the previous shot schedule once laser pulses 122 have been fired at the high priority targets.

Accordingly, as the process flows of FIGS. 6A and 6B work their way through the list of range points in pool 650, the control circuit 106 will provide improved scheduling of laser pulses 122 fired at those range points through use of the laser energy model 108 and mirror motion model 308 as compared to defined criteria such as shot energy thresholds for those shots. Moreover, by modeling laser energy and mirror motion over short time intervals on the order of nanoseconds using transient models as discussed above, these shot scheduling capabilities of the system can be characterized as hyper temporal because highly precise shots with highly precise energy amounts can be accurately scheduled over short time intervals if necessary.

While FIGS. 6A and 6B show their process flows as an iterated sequence of steps, it should be understood that if the control circuit 106 has sufficient parallelized logic resources, then many of the iterations can be unrolled and performed in parallel without the need for return loops (or using a few number of returns through the steps). For example, different windows of shot angles at the selected elevation can be processed in parallel with each other if the control circuit 106 has sufficient parallelized logic capacity. Similarly, the control circuit 106 can also work on scheduling for different elevations at the same time if it has sufficient parallelized logic capacity.

Figure 7A:
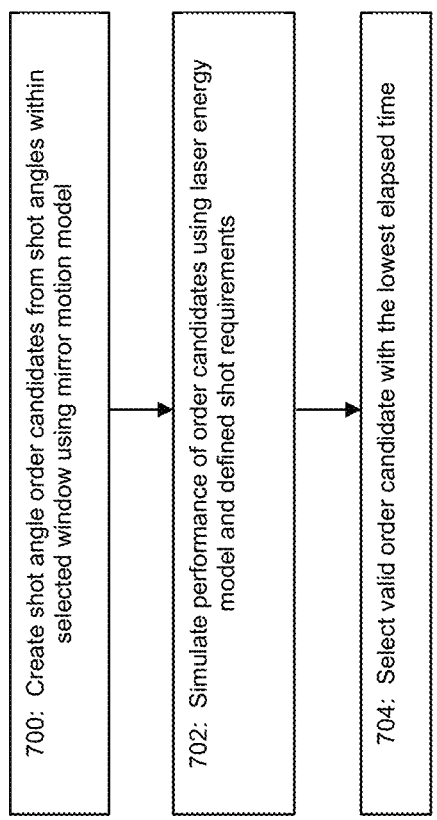
FIG. 7A depicts an example process flow for simulating and evaluating different shot ordering candidates based on the laser energy model and the mirror motion model.

FIG. 7A shows an example process flow for carrying out step 610 of FIG. 6A. At step 700, the control circuit 106 creates shot angle order candidates from the shot angles that are within the window selected at step 608. These candidates can be created based on the mirror motion model 308.

Figure 7B:
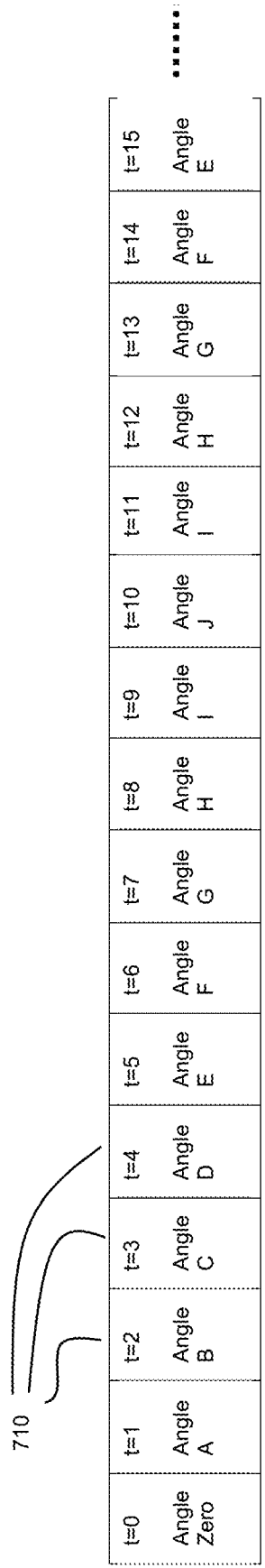
FIG. 7B depicts an example of how time slots in a mirror scan can be related to the shot angles for the mirror using the mirror motion model.

For example, as shown by FIG. 7B, the times at which the mirror 110 will target the different potential shot angles can be predicted using the mirror motion model 308. Thus, each shot angle can be assigned a time slot 710 with respect to the scan of mirror 110 across azimuth angles (and back). As shown by FIG. 7B, if mirror 110 starts at Angle Zero at Time 1, it will then scan to Angle A at Time 2, then scan to Angle B at Time 3, and so on through its full range of angles (which in the example of FIG. 7B reaches Angle J before the mirror 110 begins scanning back toward Angle Zero). The time slots for these different angles can be computed using the mirror motion model 308. Thus, if the window of shot angles identifies Angle A, Angle C, and Angle I as the shot angles, then the control circuit 106 will know which time slots of the mirror scan for mirror 110 will target those shot angles. For example, according to FIG. 7B, Time Slots 1, 3, and 9 will target Angles A, C, and I. On the return scan, Time Slot 11 will also target Angle I (as shown by FIG. 7B), while Time Slots 17 and 19 will also target Angles C and A respectively.

As example embodiments, the time slots 710 can correspond to time intervals in a range between around 5 nanoseconds and around 50 nanoseconds, which would correspond to angular intervals of around 0.01 to 0.1 degrees if mirror 110 is scanning at 12 kHz over an angular extent of 64 degrees (where +/−A is +/−16 degrees).

To create the order candidates at step 700, the control circuit 106 can generate different permutations of time slot sequences for different orders of the shot angles in the selected window. Continuing with an example where the shot angles are A, C, and I, step 700 can produce the following set of example order candidates (where each order candidate can be represented by a time slot sequence):

| Order Candidate | Time Slot Sequence | Comments |
| --- | --- | --- |
| Candidate 1 | 1, 3, 9 | This would correspond to firing laser pulses in the shot angle order of ACI during the first scan for mirror 110 (which moves from left-to-right) |
| Candidate 2 | 1, 9, 17 | This would correspond to firing laser pulses in the shot angle order of AIC, where laser pulses are fired at Shot Angles A and I during the first scan for mirror 110 and where the laser pulse is fired at Shot Angle C during the second (return) scan for mirror 110 (where this second scan moves from right-to-left). |
| Candidate 3 | 3, 9, 19 | This would correspond to firing laser pulses in the shot angle order of CIA, where laser pulses are fired at Shot Angles C and I during the first scan for mirror 110 and where the laser pulse is fired at Shot Angle A during the second (return) scan for mirror 110. |
| Candidate 4 | 3, 9, 21 | This would correspond to firing laser pulses in the shot angle order of CIA, where laser pulses are fired at Shot Angles C and I during the first scan for mirror 110 and where the laser pulse is fired at Shot Angle A during the third scan for mirror 110 (which moves from left-to-right) |
| ... | ... | ... |

It should be understood that the control circuit 106 could create additional candidate orderings from different permutations of time slot sequences for Shot Angles A, C, and I. A practitioner can choose to control how many of such candidates will be considered by the control circuit 106.

At step 702, the control circuit 106 simulates the performance of the different order candidates using the laser energy model 108 and the defined shot requirements. As discussed above, these shot requirements may include requirements such as minimum energy thresholds for each laser pulse (which may be different for each shot angle), maximum energy thresholds for each laser pulse (or for the laser source), and/or desired energy levels for each laser pulse (which may be different for each shot angle).

Figure 7C:
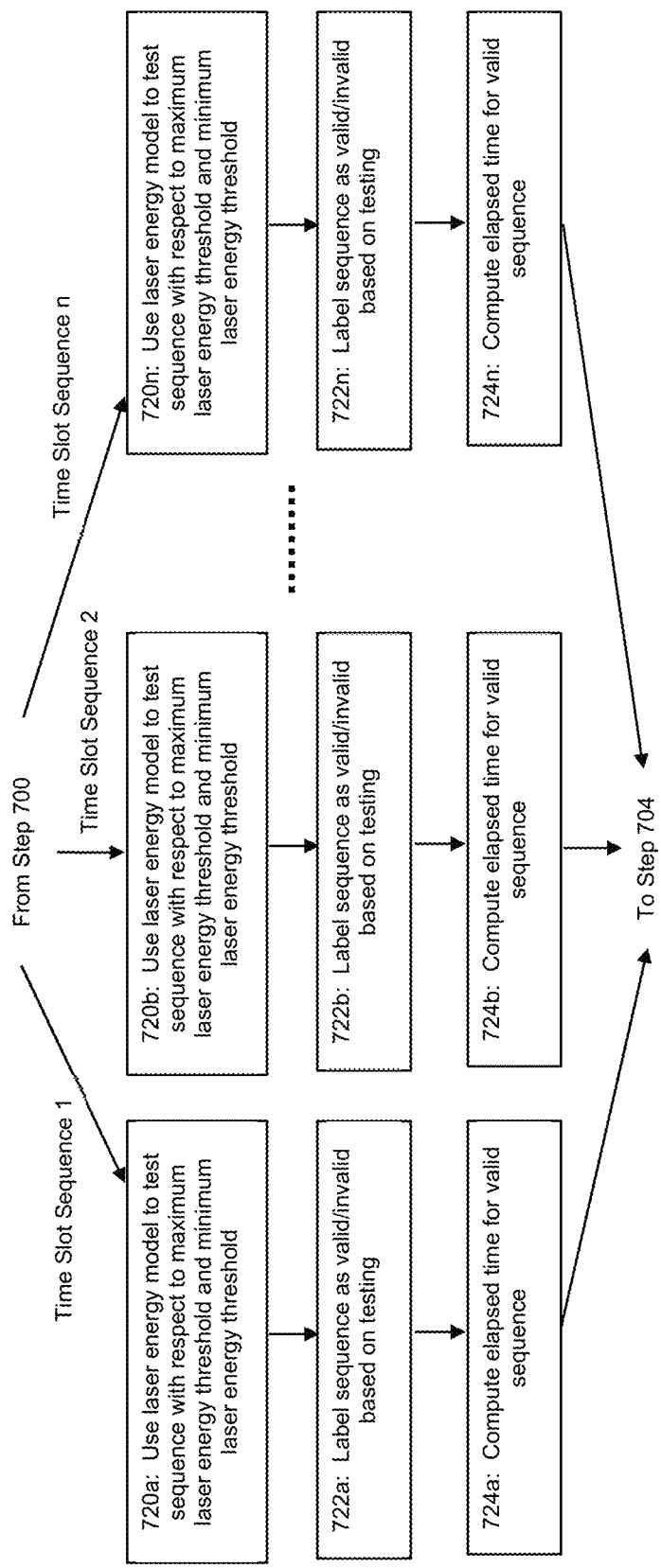
FIG. 7C depicts an example process flow for simulating different shot ordering candidates based on the laser energy model.

To reduce computational latency, this simulation and comparison with shot requirements can be performed in parallel for a plurality of the different order candidates using parallelized logic resources of the control circuit 106. An example of such parallelized implementation of step 702 is shown by FIG. 7C. In the example of FIG. 7C, steps 720, 722, and 724 are performed in parallel with respect to a plurality of the different time slot sequences that serve as the order candidates. Thus, steps 720a, 722a, and 724a are performed for Time Slot Sequence 1; steps 720b, 722b, and 724b are performed for Time Slot Sequence 2; and so on through steps 720n, 722n, and 724n for Time Slot Sequence n.

At step 720, the control circuit 106 uses the laser energy model 108 to predict the energy characteristics of the laser source and resultant laser pulse if laser pulse shots are fired at the time slots corresponding to the subject time slot sequence. These modeled energies can then be compared to criteria such as a maximum laser energy threshold and a minimum laser energy threshold to determine if the time slot sequence would be a valid sequence in view of the system requirements. At step 722, the control circuit 106 can label each tested time slot sequence as valid or invalid based on this comparison between the modeled energy levels and the defined energy requirements. At step 724, the control circuit 106 can compute the elapsed time that would be needed to fire all of the laser pulses for each valid time slot sequence. For example, Candidate 1 from the example above would have an elapsed time duration of 9 units of time, while Candidate 2 from the example above would have an elapsed time duration of 17 units of time.

Figure 7D:
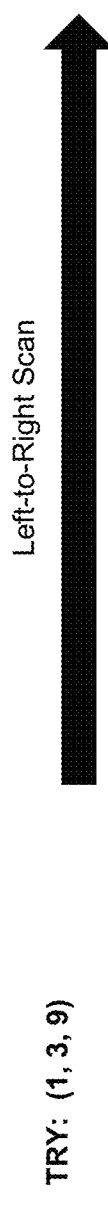

FIGS. 7D, 7E, and 7F show examples of such simulations of time slot sequences for our example where the shot angles to be scheduled with laser pulses are Shot Angles A, C, and I. In this scenario, we will assume that the laser energy model 108 will employ (1) the value for $E_S$ as a constant value of 1 unit of energy per unit of time and (2) the values for a and b as 0.5 each. Furthermore, we will assume that there are 3 units of energy left in the fiber laser 116 when the scan begins (and where the scan begins at Angle Zero while moving from left-to-right).

Moreover, for the purposes of this example, the energy requirements for the shots can be defined as (8,3,4) for minimum shot energies with respect to shot angles A, C, and I respectively, and where the maximum laser energy for the laser source can be defined as 20 units of combined seed and stored fiber energy (which would translate to a maximum laser pulse energy of 10 units of energy).

FIG. 7D shows an example result for simulating the time slot sequence of laser pulses at time slots 1, 3, and 9. In this example, it can be seen that this time slot sequence is invalid because the shot energy for Time Slot 1 (targeting Shot Angle A) is only 2 units of energy, which is below the minimum energy threshold of 8 units for Shot Angle A. This time slot sequence also fails because the shot energy for Time Slot 3 (targeting Shot Angle C) is only 2 units of energy, which is below the minimum energy threshold of 3 units for Shot Angle C.

FIG. 7E shows an example result for simulating the time slot sequence of laser pulses at time slots 1, 9, and 17. In this example, it can be seen that this time slot sequence is invalid because the shot energy for Time Slot 1 (targeting Shot Angle A) is too low.

FIG. 7F shows an example result for simulating the time slot sequence of laser pulses at time slots 3, 9, and 21. In this example, it can be seen that this time slot sequence is valid because the shot energies for each time slot are at or above the minimum energy thresholds for their corresponding shot angles (and none of the time slots would violate the maximum energy threshold for the laser source). It can be further surmised from FIG. 7F that a simulation of a Time Slot Sequence of (3,9,19) also would have failed because there is insufficient energy in a laser pulse that would have been fired at Shot Angle A.

Accordingly, the simulation of these time slot sequences would result in a determination that the time slot sequence of (3,9,21) is a valid candidate, which means that this time slot sequence can define the timing schedule for laser pulses fired toward the shot angles in the selected window. The elapsed time for this valid candidate is 21 units of time.

Returning to FIG. 7A, at step 704, the control circuit 106 selects the valid order candidate which has the lowest elapsed time. Thus, in a scenario where the simulations at step 702 would have produced two or more valid order candidates, the control circuit 106 will select the order candidate that will complete its firing of laser pulses the soonest which helps improve the latency of the system.

For example embodiments, the latency with which the control circuit 106 is able to determine the shot angle order and generate appropriate firing commands is an important operational characteristic for the lidar transmitter 100. To maintain high frame rates, it is desirable for the control circuit 106 to carry out the scheduling operations for all of the shot angles at a selected elevation in the amount of time it takes to scan mirror 110 through a full left-to-right or right-to-left scan if feasible in view of the laser energy model 108 (where this time amount is around 40 microseconds for a 12 kHz scan frequency). Moreover, it is also desirable for the control circuit 106 to be able to schedule shots for a target that is detected based on returns from shots on the current scan line during the next return scan (e.g., when a laser pulse 122 fired during the current scan detects something of interest that is to be interrogated with additional shots (see FIG. 16 discussed above)). In this circumstance, the detection path for a pulse return through a lidar receiver and into a lidar point cloud generator where the target of interest is detected will also need to be taken into account. This portion of the processing is expected to require around 0.4 to 10 microseconds, which leaves around 30 microseconds for the control circuit 106 to schedule the new shots at the region of interest during the next return scan if possible. For a processor of the control circuit 106 which has 2G flops of processing per second (which is a value available from numerous FPGA and ASIC vendors), this amounts to 50 operations per update, which is sufficient for the operations described herein. For example, the control circuit 106 can maintain lookup tables (LUTs) that contain pre-computed values of shot energies for different time slots within the scan. Thus, the simulations of step 702 can be driven by looking up precomputed shot energy values for the defined shot angles/time slots. The use of parallelized logic by the control circuit 106 to accelerate the simulations helps contribute to the achievement of such low latency. Furthermore, practitioners can adjust operational parameters such as the window size (search depth) in a manner to achieve desired latency targets.

Figure 8:
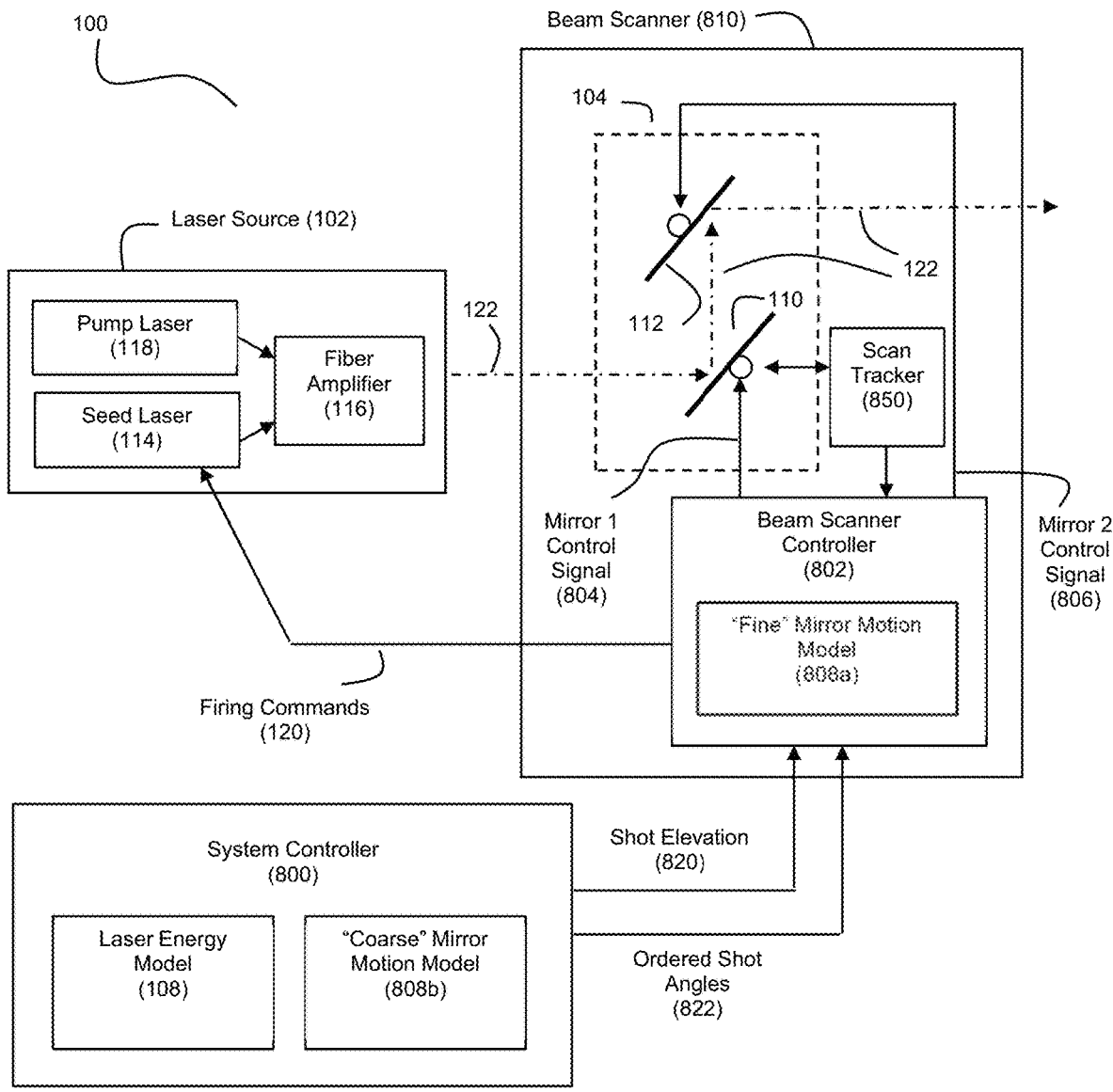
FIG. 8 depicts an example lidar transmitter that uses a laser energy model and a mirror motion model to schedule laser pulses, where the control circuit includes a system controller and a beam scanner controller.

FIG. 8 shows an example embodiment for the lidar transmitter 100 where the control circuit 106 comprises a system controller 800 and a beam scanner controller 802. System controller 800 and beam scanner controller 802 can each include a processor and memory for use in carrying out its tasks. The mirror subsystem 104 can be part of beam scanner 810 (which can also be referred to as a lidar scanner). Beam scanner controller 802 can be embedded as part of the beam scanner 810. In this example, the system controller 800 can carry out steps 600, 602, 604, 608, 610, and 612 of FIG. 6A if the control circuit 106 employs the FIG. 6A process flow (or steps 600, 602, 604, 620, 608, 622, 624, 626, and 628 of FIG. 6B if the control circuit 106 employs the FIG. 6B process flow), while beam scanner controller 802 carries out steps 606 and 614 for the FIGS. 6A and 6B process flows. Accordingly, once the system controller 800 has selected the elevation and the order of shot angles, this information can be communicated from the system controller 800 to the beam scanner controller 802 as shot elevation 820 and ordered shot angles 822.

The ordered shot angles 822 can also include flags that indicate the scan direction for which the shot is to be taken at each shot angle. This scan direction flag will also allow the system to recognize scenarios where the energy model indicates there is a need to pass by a time slot for a shot angle without firing a shot and then firing the shot when the scan returns to that shot angle in a subsequent time slot. For example, with reference to the example above, the scan direction flag will permit the system to distinguish between Candidate 3 (for the sequence of shot angles CIA at time slots 3, 9, and 19) versus Candidate 4 (for the same sequence of shot angles CIA but at time slots 3, 9, and 21). A practitioner can explicitly assign a scan direction to each ordered shot angle by adding the scan direction flag to each ordered shot angle if desired, or a practitioner indirectly assign a scan direction to each ordered shot angle by adding the scan direction flag to the ordered shot angles for which there is a change in scan direction. Together, the shot elevations 802 and order shot angles 822 serve as portions of the shot list 660 used by the lidar transmitter 100 to target range points with laser pulses 122.

The beam scanner controller 802 can generate control signal 806 for mirror 112 based on the defined shot elevation 820 to drive mirror 112 to a scan angle that targets the elevation defined by 820. Meanwhile, the control signal 804 for mirror 110 will continue to be the sinusoidal signal that drives mirror 110 in a resonant mode. However, some practitioners may choose to also vary control signal 804 as a function of the ordered shot angles 822 (e.g., by varying amplitude A as discussed above).

In the example of FIG. 8, the mirror motion model 308 can comprise a first mirror motion model 808a maintained and used by the beam scanner controller 802 and a second mirror motion model 808b maintained and used by the system controller 800. With FIG. 8, the task of generating the firing commands 120 can be performed by the beam scanner controller 802. The beam scanner controller 810 can include a feedback system 850 that tracks the actual mirror tilt angles θ for mirror 110. This feedback system 850 permits the beam scanner controller 802 to closely monitor the actual tilt angles of mirror 110 over time which then translates to the actual scan angles μ of mirror 110. This knowledge can then be used to adjust and update mirror motion model 808a maintained by the beam scanner controller 802. Because model 808a will closely match the actual scan angles for mirror 110 due to the feedback from 850, we can refer to model 808a as the "fine" mirror motion model 808a. In this fashion, when the beam scanner controller 802 is notified of the ordered shot angles 822 to be targeted with laser pulses 122, the beam scanner controller 802 can use this "fine" mirror motion model 808a to determine when the mirror has hit the time slots which target the ordered shot angles 822. When these time slots are hit according to the "fine" mirror motion model 808a, the beam scanner controller 802 can generate and provide corresponding firing commands 120 to the laser source 102.

Examples of techniques that can be used for the scan tracking feedback system 850 are described in the above-referenced and incorporated U.S. Pat. No. 10,078,133. For example, the feedback system 850 can employ optical feedback techniques or capacitive feedback techniques to monitor and adjust the scanning (and modeling) of mirror 110. Based on information from the feedback system 850, the beam scanner controller 802 can determine how the actual mirror scan angles may differ from the modeled mirror scan angles in terms of frequency, phase, and/or maximum amplitude. Accordingly, the beam scanner controller 802 can then incorporate one or more offsets or other adjustments relating the detected errors in frequency, phase, and/or maximum amplitude into the mirror motion model 808*a* so that model 808*a* more closely reflects reality. This allows the beam scanner controller 802 to generate firing commands 120 for the laser source 102 that closely match up with the actual shot angles to be targeted with the laser pulses 122.

Errors in frequency and maximum amplitude within the mirror motion model 808*a* can be readily derived from the tracked actual values for the tilt angle θ as the maximum amplitude A should be the maximum actual value for θ, and the actual frequency is measurable based on tracking the time it takes to progress from actual values for A to −A and back.

Phased locked loops (or techniques such as PID control, both available as software tools in MATLAB) can be used to track and adjust the phase of the model 808*a* as appropriate. The expression for the tilt angle θ that includes a phase component (p) can be given as:

$$\theta = A\cos(2\pi ft + p)$$

From this, we can recover the value for the phase p by the relation:

$$\theta \approx A\cos(2\pi ft) - A\sin(2\pi ft)p$$

Solving for p, this yields the expression:

$$p = \frac{A\cos(2\pi ft) - \theta}{A\sin(2\pi ft)}$$

Given that the tracked values for A, f, t, and θ are each known, the value for p can be readily computed. It should be understood that this expression for p assumes that the value of the p is small, which will be an accurate assumption if the actual values for A, f, t, and θ are updated frequently and the phase is also updated frequently. This computed value of p can then be used by the "fine" mirror motion model 808*a* to closely track the actual shot angles for mirror 110, and identify the time slots that correspond to those shot angles according to the expression:

$$t = \frac{\arccos\left(\frac{\mu - \varphi}{2A}\right) - p}{2\pi f}$$

While a practitioner will find it desirable for the beam scanner controller 802 to rely on the highly accurate "fine" mirror motion model 808*a* when deciding when the firing commands 120 are to be generated, the practitioner may also find that the shot scheduling operations can suffice with less accurate mirror motion modeling. Accordingly, the system controller 800 can maintain its own model 808*b*, and this model 808*b* can be less accurate than model 808*a* as small inaccuracies in the model 808*b* will not materially affect the energy modeling used to decide on the ordered shot angles 822. In this regard, model 808*b* can be referred to as a "coarse" mirror motion model 808*b*. If desired, a practitioner can further communicate feedback from the beam scanner controller 802 to the system controller 800 so the system controller 800 can also adjusts its model 808*b* to reflect the updates made to model 808*a*. In such a circumstance, the practitioner can also decide on how frequently the system will pass these updates from model 808*a* to model 808*b*.

Figure 9:
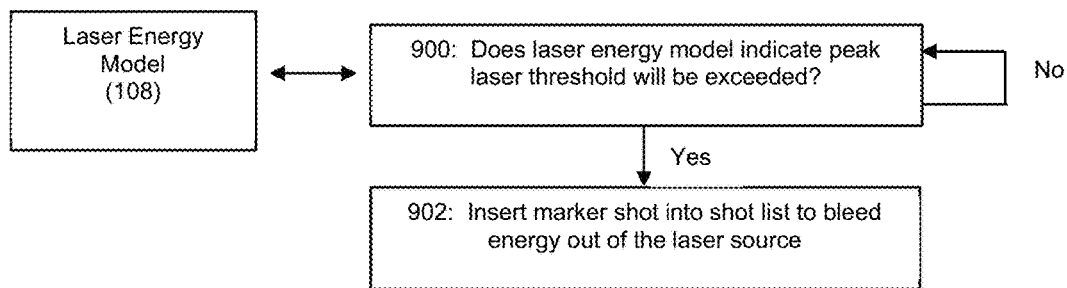
FIG. 9 depicts an example process flow for inserting marker shots into a shot list.

Marker Shots to Bleed Off and/or Regulate Shot Energy:

FIG. 9 depicts an example process flow for execution by the control circuit 106 to insert marker shots into the shot list in order to bleed off energy from the laser source 102 when needed. As discussed above, the control circuit 106 can consult the laser energy model 108 as applied to the range points to be targeted with laser pulses 122 to determine whether a laser energy threshold would be violated. If so, the control circuit 106 may insert a marker shot into the shot list to bleed energy out of the laser source 102 (step 902). In an example embodiment, this threshold can be set to define a maximum or peak laser energy threshold so as to avoid damage to the laser source 102. In another example embodiment, this threshold can be set to achieve a desired consistency, smoothness, and/or balance in the energies of the laser pulse shots.

For example, one or more marker shots can be fired to bleed off energy so that a later targeted laser pulse shot (or set of targeted shots) exhibits a desired amount of energy. As an example embodiment, the marker shots can be used to bleed off energy so that the targeted laser pulse shots exhibit consistent energy levels despite a variable rate of firing for the targeted laser pulse shots (e.g., so that the targeted laser pulse shots will exhibit X units of energy (plus or minus some tolerance) even if those targeted laser pulse shots are irregularly spaced in time). The control circuit 106 can consult the laser energy model 108 to determine when such marker shots should be fired to regulate the targeted laser pulse shots in this manner.

Figure 10:
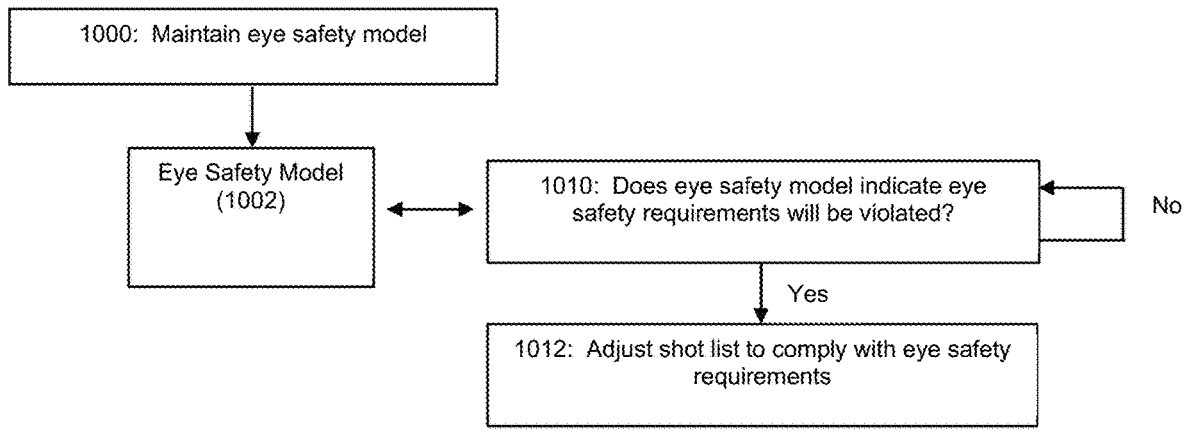
FIG. 10 depicts an example process flow for using an eye safety model to adjust a shot list.

Modeling Eye and Camera Safety Over Time:

FIG. 10 depicts an example process flow for execution by the control circuit 106 where eye safety requirements are also used to define or adjust the shot list. To support these operations, the control circuit 106 can also, at step 1000, maintain an eye safety model 1002. Eye safety requirements for a lidar transmitter 100 may be established to define a maximum amount of energy that can be delivered within a defined spatial area in the field of view over a defined time period. Since the system is able to model per pulse laser energy with respect to precisely targeted range points over highly granular time periods, this allows the control circuit 106 to also monitor whether a shot list portion would violate eye safety requirements. Thus, the eye safety model 1002 can model how much aggregated laser energy is delivered to the defined spatial area over the defined time period based on the modeling produced from the laser energy model 108 and the mirror motion model 308. At step 1010, the control circuit 106 uses the eye safety model 1002 to determine whether the modeled laser energy that would result from a simulated sequence of shots would violate the eye safety requirements. If so, the control circuit can adjust the shot list to comply with the eye safety requirements (e.g., by inserting longer delays between ordered shots delivered close in space, by re-ordering the shots, etc.), as shown by step 1012.

Figure 11:
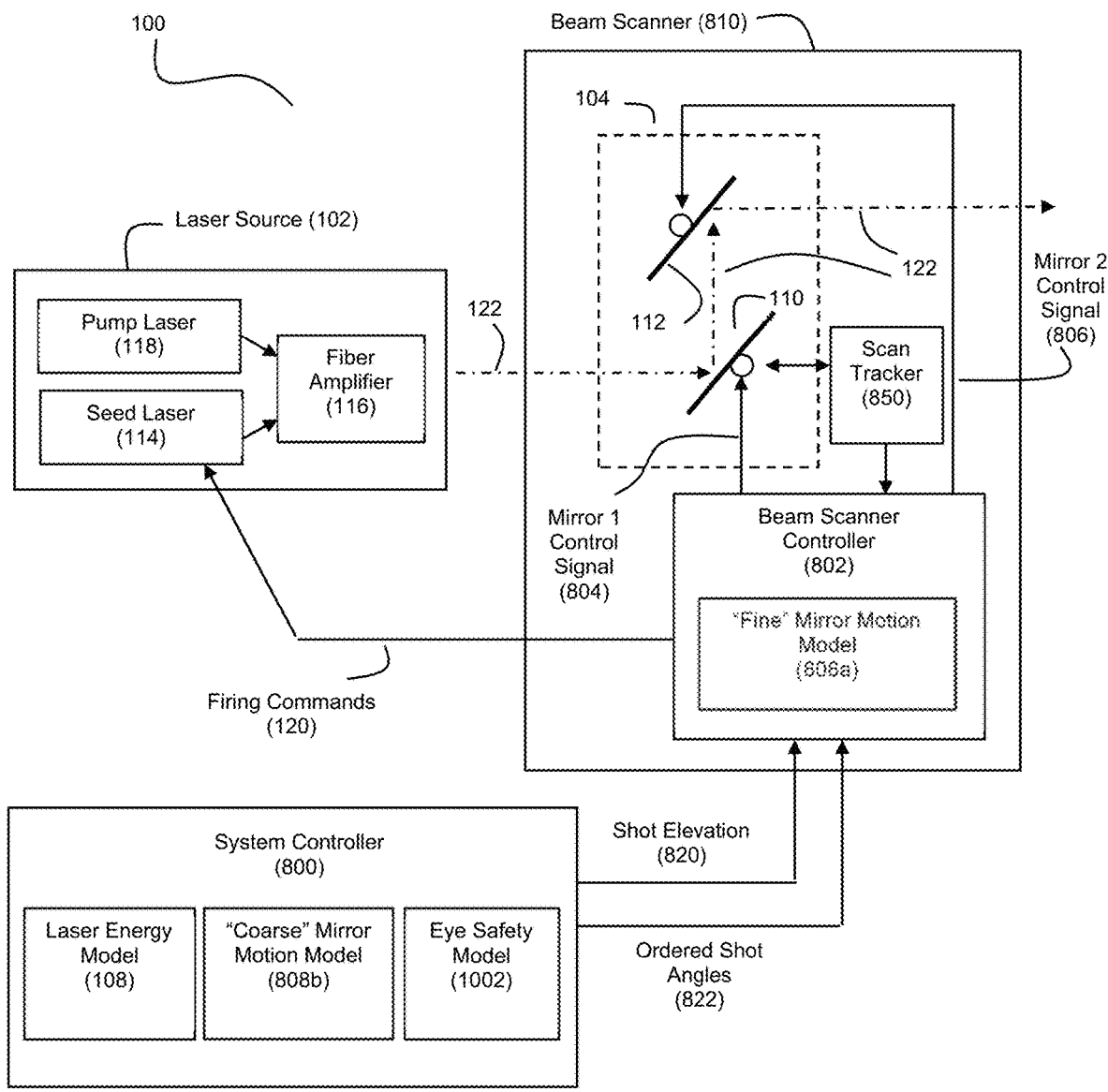
FIG. 11 depicts an example lidar transmitter that uses a laser energy model, a mirror motion model, and an eye safety model to schedule laser pulses.
Figure 12:
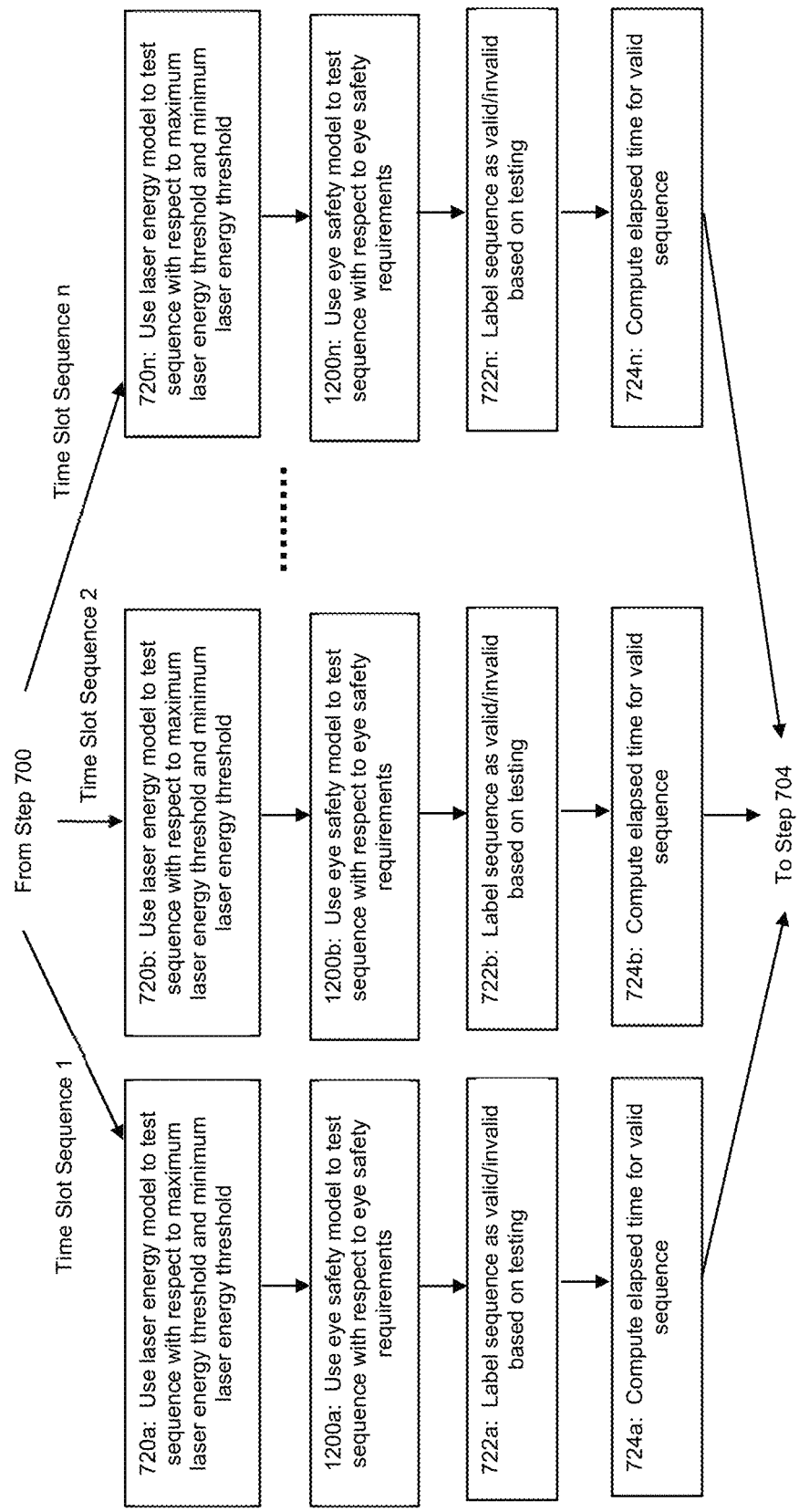
FIG. 12 depicts an example process flow for simulating different shot ordering candidates based on the laser energy model and eye safety model.

FIG. 11 shows an example lidar transmitter 100 that is similar in nature to the example of FIG. 8, but where the system controller 800 also considers the eye safety model 1002 when deciding on how to order the shot angles. FIG. 12 shows how the simulation step 702 from FIG. 7A can be performed in example embodiments where the eye safety model 1002 is used. As shown by FIG. 12, each parallel path can include steps 720, 722, and 724 as discussed above. Each parallel path can also include a step 1200 to be performed prior to step 722 where the control circuit 106 uses the eye safety model 1002 to test whether the modeled laser energy for the subject time slot sequence would violate eye safety requirements. If the subject time slot sequence complies with the criteria tested at steps 720 and 1200, then the subject time slot sequence can be labeled as valid. If the subject time slot sequence violates the criteria tested at steps 720 or 1200, then the subject time slot sequence can be labeled as invalid.

Similar to the techniques described for eye safety in connection with FIGS. 10, 11, and 12, it should be understood that a practitioner can also use the control circuit to model and evaluate whether time slot sequences would violate defined camera safety requirements. To reduce the risk of laser pulses 122 impacting on and damaging cameras in the field of view, the control circuit can also employ a camera safety model in a similar manner and toward similar ends as the eye safety model 1002. In the camera safety scenario, the control circuit 106 can respond to detections of objects classified as cameras in the field of view by monitoring how much aggregated laser energy will impact that camera object over time. If the model indicates that the camera object would have too much laser energy incident on it in too short of a time period, the control circuit can adjust the shot list as appropriate.

Moreover, as noted above with respect to the laser energy model 108 and the mirror motion model 308, the eye safety and camera safety models can track aggregated energy delivered to defined spatial areas over defined time periods over short time intervals, and such short interval eye safety and camera safety models can be referred to as transient eye safety and camera safety models.

Additional Example Embodiments

Figure 13:
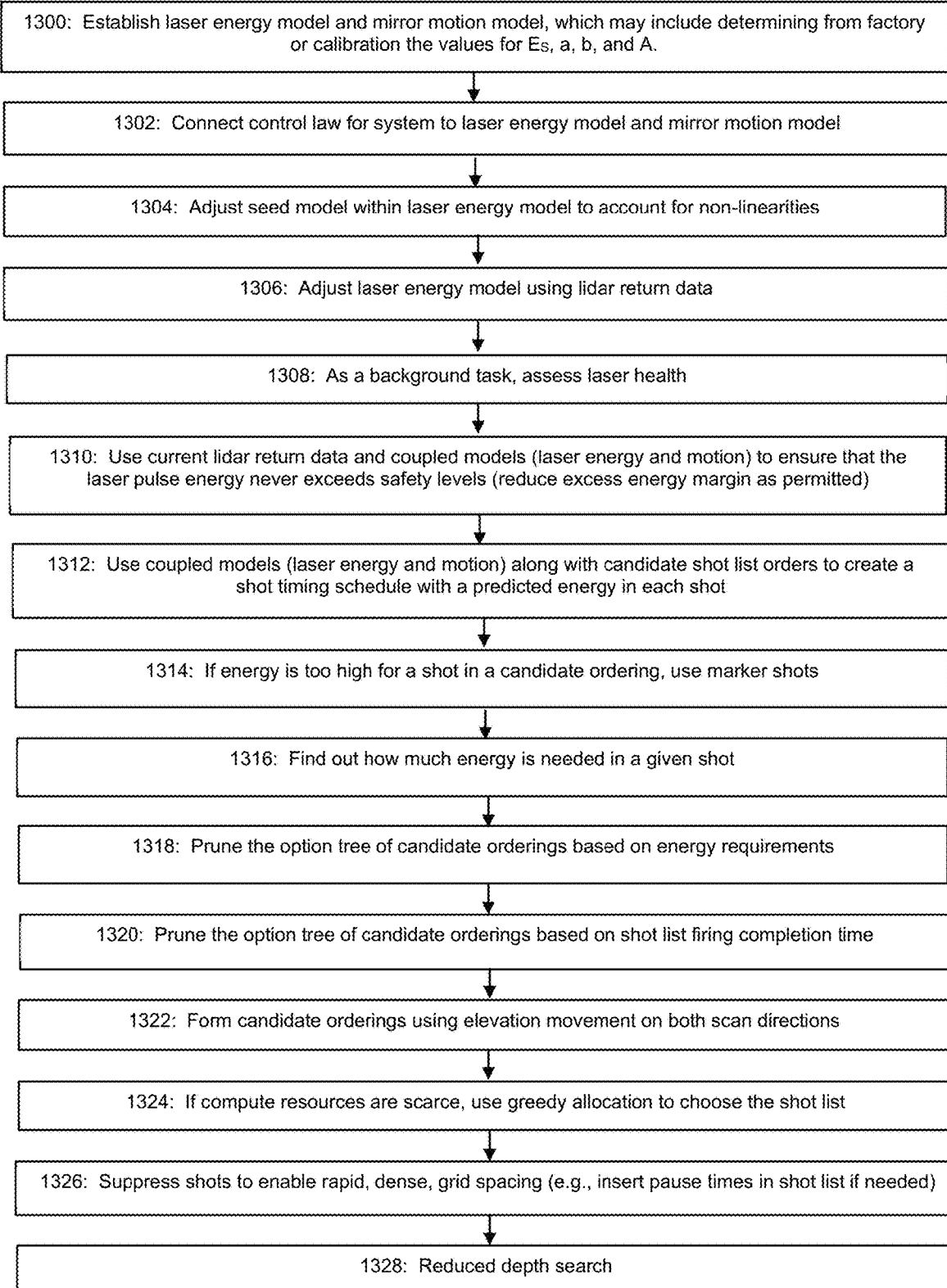
FIG. 13 depicts another example process for determining shot schedules using the models.

FIG. 13 shows another example of a process flow for the control circuit 106 with respect to using the models to dynamically determine the shot list for the transmitter 100.

At step 1300, the laser energy model 108 and mirror motion model 308 are established. This can include determining from factory or calibration the values to be used in the models for parameters such as $E_P$, a, b, and A. Step 1300 can also include establishing the eye safety model 1002 by defining values for parameters that govern such a model (e.g. parameters indicative of limits for aggregated energy for a defined spatial area over a defined time period). At step 1302, the control law for the system is connected to the models established at step 1300.

At step 1304, the seed energy model used by the laser energy model 108 is adjusted to account for nonlinearities. This can employ the clipped, offset (affine) model for seed energy as discussed above.

At step 1306, the laser energy model 108 can be updated based on lidar return data and other feedback from the system. For example, as noted above in connection with FIG. 2D, the actual energies in laser pulses 122 can be derived from the pulse return data included in point cloud 256. For example, the pulse return energy can be modeled as a function of the transmitted pulse energy according to the following expression (for returns from objects that are equal to or exceed the laser spot size and assuming modest atmospheric attenuation):

$$\text{Pulse Return Energy} = \left( \frac{PE \, Aperture_{Receiver}}{\pi R^2} \right) \text{Reflectivity}$$

In this expression, Pulse Return Energy represents the energy of the pulse return (which is known from the point cloud 256), PE represents the unknown energy of the transmitted laser pulse 122, $Aperture_{Receiver}$ represents the known aperture of the lidar receiver (see 1400 in FIG. 14), R represents the measured range for the return (which is known from the point cloud 256), and Reflectivity represents the percentage of reflectivity for the object from which the return was received. Therefore, one can solve for PE so long as the reflectivity is known. This will be the case for objects like road signs whose reflectivity is governed by regulatory agencies. Accordingly, by using returns from known fiducials such as road signs, the control circuit 106 can derive the actual energy of the transmitted laser pulse 122 and use this value to facilitate determinations as to whether any adjustments to the laser energy model 108 are needed (e.g., see discussions above re updating the values for a and b based on PE values which represent the actual energies of the transmitted laser pulses 122).

Also, at step 1308, the laser health can be assessed and monitored as a background task. The information derived from the feedback received for steps 1306 and 1308 can be used to update model parameters as discussed above. For example, as noted above, the values for the seed energy model parameters as well as the values for a and b can be updated by measuring the energy produced by the laser source 102 and fitting the data to the parameters. Techniques which can be used for this process include least squares, sample matrix inversion, regression, and multiple exponential extensions. Further still, as noted above, the amount of error can be reduced by using known targets with a given reflectivity and using these to calibrate the system. This is helpful because the reflectivity of a quantity that is known, i.e. a fiducial, allows one to explicitly extract shot energy (after backing out range dependencies and any obliquity). Examples of fiducials that may be employed include road signs and license plates.

At step 1310, the lidar return data and the coupled models can be used to ensure that the laser pulse energy does not exceed safety levels. These safety levels can include eye safety as well as camera safety as discussed above. Without step 1310, the system may need to employ a much more stringent energy requirement using trial and error to establish laser settings to ensure safety. For example if we only had a laser model where the shot energy is accurate to only ±3J per shot around the predicted shot, and maximum shot energy is limited to 8, we could not use any shots predicted to exceed 5. However, the hyper temporal modeling and control that is available from the laser energy model 108 and mirror motion model 308 as discussed herein allows us to obtain accurate predictions within a few percent error, virtually erasing the operational lidar impact of margin.

At step 1312, the coupled models are used with different orderings of shots, thereby obtaining a predicted shot energy in any chosen ordered sequence of shots drawn from the specified list of range points. Step 1312 may employ simulations to predict shot energies for different time slots of shots as discussed above.

At step 1314, the system inserts marker shots in the timing schedule if the models predict that too much energy will build up in the laser source 102 for a given shot sequence. This reduces the risk of too much energy being transferred into the fiber laser 116 and causing damage to the fiber laser 116.

At step 1316, the system determines the shot energy that is needed to detect targets with each shot. These values can be specified as a minimum energy threshold for each shot.

The value for such threshold(s) can be determined from radiometric modeling of the lidar, and the assumed range and reflectivity of a candidate target. In general, this step can be a combination of modeling assumptions as well as measurements. For example, we may have already detected a target, so the system may already know the range (within some tolerance). Since the energy required for detection is expected to vary as the square of the range, this knowledge would permit the system to establish the minimum pulse energy thresholds so that there will be sufficient energy in the shots to detect the targets.

Steps 1318 and 1320 operate to prune the candidate ordering options based on the energy requirements (e.g., minimum energy thresholds per shot) (for step 1318) and shot list firing completion times (to favor valid candidate orderings with faster completion times) (for step 1320).

At step 1322, candidate orderings are formed using elevation movements on both scan directions. This allows the system to consider taking shots on both a left-to-right scan and a right-to-left scan. For example, suppose that the range point list has been completed on a certain elevation, when the mirror is close to the left hand side. Then it is faster to move the elevation mirror at that point in time and begin the fresh window of range points to be scheduled beginning on this same left hand side and moving right. Conversely, if we deplete the range point list when the mirror is closer to the right hand side it is faster to move the mirror in elevation whilst it is on the right hand side. Moreover, in choosing an order from among the order candidates, and when moving from one elevation to another, movement on either side of the mirror motion, the system may move to a new elevation when mirror 110 is at one of its scan extremes (full left or full right). However, in instances where a benefit may arise from changing elevations when mirror 110 is not at one of its scan extremes, the system may implement interline skipping as described in the above-referenced and incorporated U.S. Pat. No. 10,078,133. The mirror motion model 308 can also be adjusted to accommodate potential elevation shift during a horizontal scan.

At step 1324, if processing time allows the control circuit 106 to implement auctioning (whereby multiple order candidates are investigated, the lowest "cost" (e.g., fastest lidar execution time) order candidate is selected by the control circuit 106 (acting as "auctioneer"). A practitioner may not want the control circuit to consider all of the possible order candidates as this may be too computationally expensive and introduce an undue amount of latency. Thus, the control circuit 106 can enforce maximums or other controls on how many order candidates are considered per batch of shots to be ordered. Greedy algorithms can be used when choosing ordering shots. Generally, the system can use a search depth value (which defines how many shots ahead the control circuit will evaluate) in this process in a manner that is consistent with any real time consideration in shot list generation. At step 1326, delays can be added in the shot sequence to suppress a set of shots and thus increase available shot energy to enable a finer (denser) grid as discussed above. The methodology for sorting through different order candidates can be considered a special case of the Viterbi algorithm which can be implemented using available software packages such as Mathworks. This can also be inferred using equivalence classes or group theoretic methods. Furthermore, if the system detects that reduced latency is needed, the search depth can be reduced (see step 1328).

Figure 14:
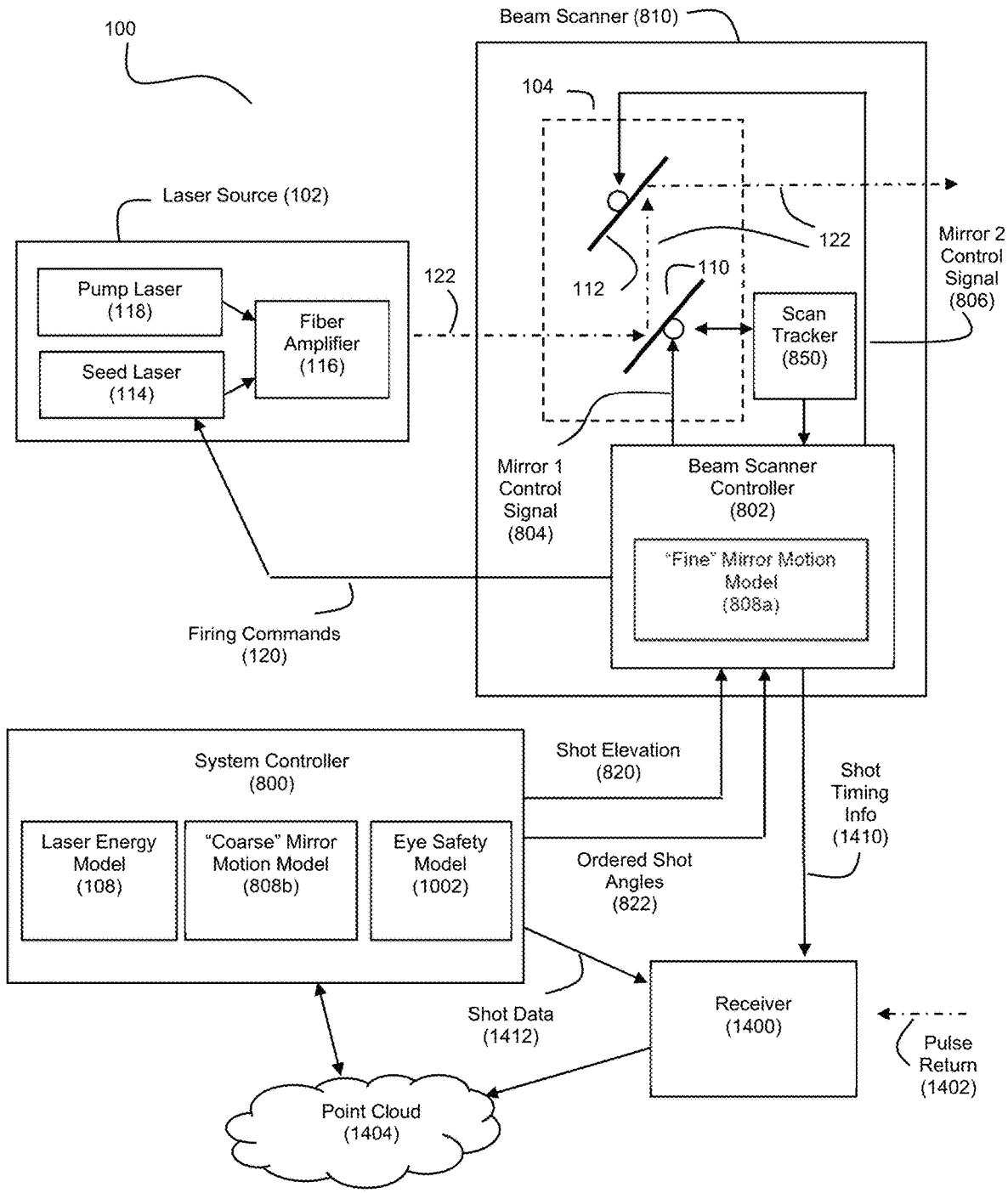
FIG. 14 depicts an example lidar system where a lidar transmitter and a lidar receiver coordinate their operations with each other.

FIG. 14 depicts an example embodiment for a lidar transmitter 100 that shows how the system controller 800 can interact with the lidar receiver 1400 to coordinate system operations. The lidar receiver 1400 can receive and process pulse returns 1402 to compute range information for objects in the field of view impacted by the laser pulses 122. This range information can then be included in the point cloud 1404 generated by the lidar system. Examples of suitable technology for use as the lidar receiver 1400 are described in U.S. Pat. Nos. 9,933,513 and 10,754,015, the entire disclosures of which are incorporated herein by reference. In the example of FIG. 14, the system controller 800 can use the point cloud 1404 to intelligently select range points for targeting with laser pulses, as discussed in the above-referenced and incorporated patents. For example, the point cloud data can be used to determine ranges for objects in the field of view that are to be targeted with laser pulses 122. The control circuit 106 can use this range information to determine desired energy levels for the laser pulses 122 which will target range points that are believed to correspond to those objects. In this fashion, the control circuit 106 can controllably adjust the laser pulse energy as a function of the estimated range of the object being targeted so the object is illuminated with a sufficient amount of light energy given its estimated range to facilitate adequate detection by the lidar receiver 1400. Further still, the beam scanner controller 802 can provide shot timing information 1410 to the receiver 1400 and the system controller 800 can provide shot data 1412 (such as data identifying the targeting range points) to the receiver 1400. The combination of this information informs the receiver how to control which pixels of the receiver 1400 should be activated for detecting pulse returns 1402 (including when those pixels should be activated). As discussed in the above-referenced and incorporated '513 and '015 patents, the receiver can select pixels for activation to detect pulse returns 1402 based on the locations of the targeted range points in the field of view. Accordingly, precise knowledge of which range points were targeted and when those range points were targeted helps improve the operations of receiver 1400. Although not shown in FIG. 14, it should also be understood that a practitioner may choose to also include a camera that images the field of view, and this camera can be optically co-axial (co-bore sighted) with the lidar transmitter 100. Camera images can also be used to facilitate intelligent range point selection among other tasks.

Figure 15:
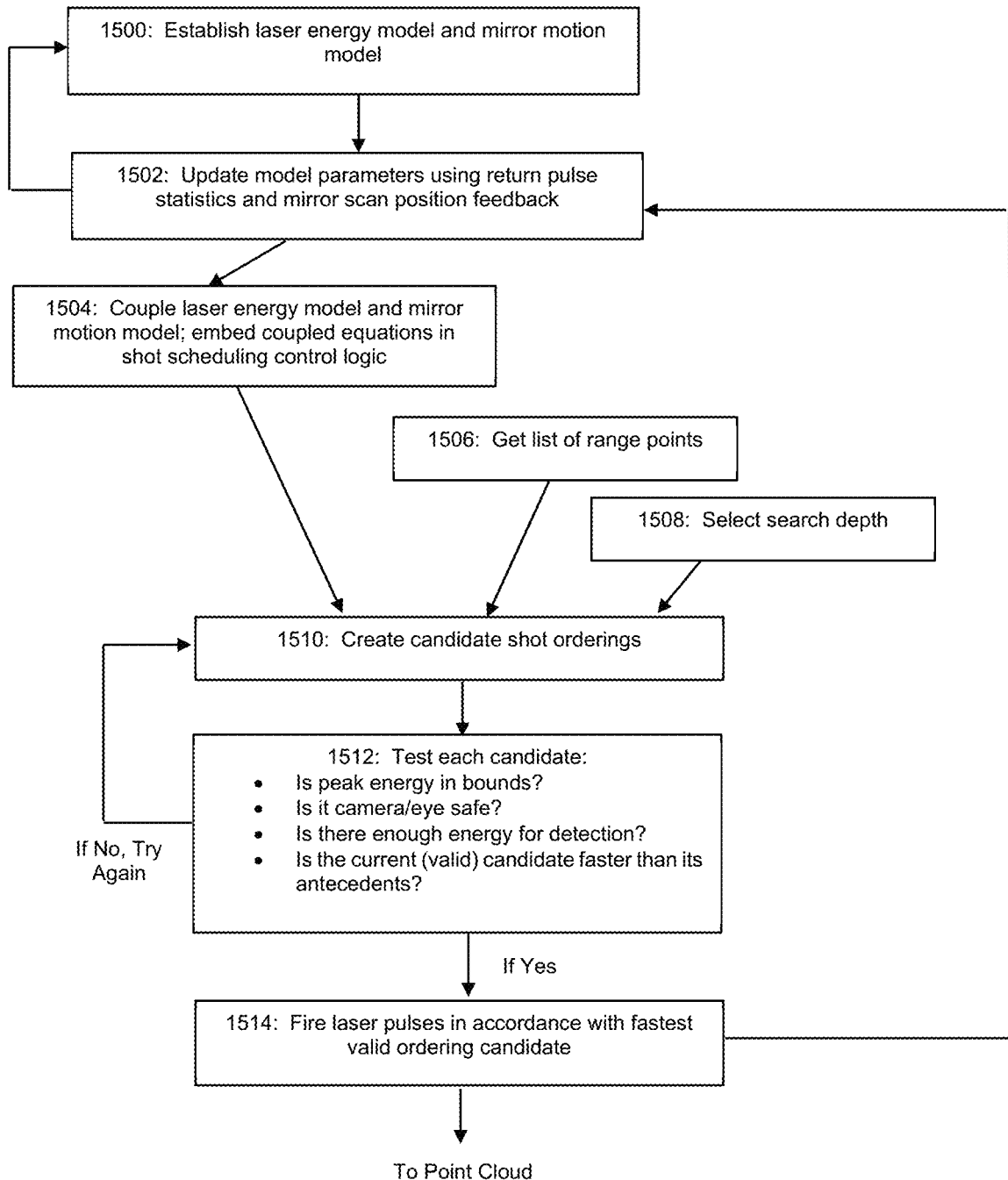
FIG. 15 depicts another example process for determining shot schedules using the models.

FIG. 15 shows another example of a process flow for the control circuit 106 with respect to using the models to dynamically determine the shot list for the transmitter 100. At step 1500, the laser energy model 108 and mirror motion model 308 are established. This can operate like step 1300 discussed above. At step 1502, the model parameters are updated using pulse return statistics (which may be derived from point cloud 1404 or other information provided by the receiver 1400) and mirror scan position feedback (e.g., from feedback system 850). At step 1504, the models are coupled so that shot angles are assigned to time slots according to the mirror motion model 308 for which shot energies can be predicted according to the laser energy model 108. These coupled models can then be embedded in the shot scheduling logic used by control circuit 106. At step 1506, a list of range points to be targeted with laser pulses 122 is received. At step 1508, a selection is made for the search depth that governs how far ahead the system will schedule shots.

Based on the listed range points and the defined search depth, the order candidates for laser pulse shots are created (step 1510). The mirror motion model 308 can assign time slots to these order candidates as discussed above. At step 1512, each candidate is tested using the laser energy model 108. This testing may also include testing based on the eye safety model 1002 and a camera safety model. This testing can evaluate the order candidates for compliance with criteria such as peak energy constraints, eye safety constraints, camera safety constraints, minimum energy thresholds, and completion times. If a valid order candidate is found, the system can fire laser pulses in accordance with the timing/sequencing defined by the fastest of the valid order candidates. Otherwise, the process flow can return to step 1510 to continue the search for a valid order candidate.

While the invention has been described above in relation to its example embodiments, various modifications may be made thereto that still fall within the invention's scope.

For example, while the example embodiments discussed above involve a mirror subsystem architecture where the resonant mirror (mirror 110) is optically upstream from the point-to-point step mirror (mirror 112), it should be understood that a practitioner may choose to position the resonant mirror optically downstream from the point-to-point step mirror.

As another example, while the example mirror subsystem 104 discussed above employs mirrors 110 and 112 that scan along orthogonal axes, other architectures for the mirror subsystem 104 may be used. As an example, mirrors 110 and 112 can scan along the same axis, which can then produce an expanded angular range for the mirror subsystem 104 along that axis and/or expand the angular rate of change for the mirror subsystem 104 along that axis. As yet another example, the mirror subsystem 104 can include only a single mirror (mirror 110) that scans along a first axis. If there is a need for the lidar transmitter 100 to also scan along a second axis, the lidar transmitter 100 could be mechanically adjusted to change its orientation (e.g., mechanically adjusting the lidar transmitter 100 as a whole to point at a new elevation while mirror 110 within the lidar transmitter 100 is scanning across azimuths).

As yet another example, a practitioner may find it desirable to drive mirror 110 with a time-varying signal other than a sinusoidal control signal. In such a circumstance, the practitioner can adjust the mirror motion model 308 to reflect the time-varying motion of mirror 110.

As still another example, it should be understood that the techniques described herein can be used in non-automotive applications. For example, a lidar system in accordance with any of the techniques described herein can be used in vehicles such as airborne vehicles, whether manned or unmanned (e.g., airplanes, drones, etc.). Further still, a lidar system in accordance with any of the techniques described herein need not be deployed in a vehicle and can be used in any lidar application where there is a need or desire for hyper temporal control of laser pulses and associated lidar processing.

These and other modifications to the invention will be recognizable upon review of the teachings herein.

What is claimed is:

1. A lidar system comprising:
    a laser source;
    a mirror positioned to reflect a plurality of laser pulse shots from the laser source into a field of view, wherein the mirror is scannable to control where the laser pulse shots are directed in the field of view; and
    a circuit that schedules a variable rate firing of a plurality of upcoming laser pulse shots by the laser source using a laser energy model as compared to a plurality of energy requirements applicable to the upcoming laser pulse shots, and wherein the laser energy model takes into consideration a retention of energy in the laser source after the upcoming laser pulse shots are fired and quantitatively predicts available energy amounts for the upcoming laser pulse shots from the laser source based on a history of prior laser pulse shots by the laser source.

2. The system of claim 1 wherein the mirror scans in a resonant mode.

3. The system of claim 2 wherein the mirror scans through a plurality of scan angles along a scan axis in the resonant mode;
    wherein the scheduled laser pulse shots comprise a plurality of upcoming laser pulse shots that are to target to a plurality of scan angles in the field of view; and
    wherein the circuit schedules the variable rate firing of the upcoming laser pulse shots by the laser source using (1) the laser energy model as compared to the energy requirements applicable to the upcoming laser pulse shots and (2) a mirror motion model that models the scan angles for the mirror over time.

4. The system of claim 3 wherein the circuit determines a plurality of range points in the field of view to be targeted by upcoming laser pulse shots based on a determination that the targeted range points are in a region of interest within the field of view, wherein the targeted range points are defined by coordinates in the field of view, and wherein the coordinates include scan angles with respect to the mirror.

5. The system of claim 3 wherein the mirror motion model models the scan angles for the mirror as a plurality of time slots, and wherein the circuit schedules the upcoming laser pulse shots by generating a shot list that assigns the upcoming laser pulse shots to time slots that are applicable to the targeted scan angles according to the mirror motion model if the laser energy model indicates that there will be sufficient energy available in the laser source with respect to the applicable time slots in view of the energy requirements applicable to the upcoming laser pulse shots that correspond to the applicable time slots.

6. The system of claim 5 wherein the circuit (1) simulates a plurality of different shot order candidates for the upcoming laser pulse shots in view of the laser energy model and the mirror motion model and (2) determines the shot list based on which of the simulated shot order candidates are valid in view of the laser energy model and the energy requirements applicable to the upcoming laser pulse shots.

7. The system of claim 3 wherein the mirror is a first mirror, wherein the scan angles comprise a plurality of first mirror scan angles along a first scan axis, the system further comprising:
    a second mirror, wherein the second mirror is scannable through a plurality of second mirror scan angles to control where the laser pulse shots fired by the laser source are directed along a second scan axis; and
    wherein the mirror motion model models the first mirror scan angles for the first mirror over time.

8. The system of claim 7 wherein the circuit determines a plurality of range points in the field of view to be targeted by upcoming laser pulse shots, wherein the targeted range points are defined by coordinates in the field of view that correspond to first mirror scan angles and second mirror scan angles, (2) sorts a list of upcoming laser pulse shots by their second mirror scan angles to define a plurality of groups of upcoming laser pulse shots that target a plurality of different first mirror scan angles while targeting the same second mirror scan angle, and (3) schedules the sorted upcoming laser shots using the laser energy model and the mirror motion model on a group-by-group basis.

9. The system of claim 8 wherein the scheduled upcoming laser pulse shots include one or more scan line repeats.

10. The system of claim 7 wherein the upcoming laser pulse shots target a plurality of range points in the field of view, wherein the targeted range points are defined by coordinates in the field of view that correspond to first mirror scan angles and second mirror scan angles, and wherein the second mirror scans through the second mirror scan angles in a point-to-point mode that varies as a function of the second mirror scan angles of the scheduled upcoming laser pulse shots.

11. The apparatus of claim 2 wherein the mirror scans at a frequency in a range between 10 kHz and 20 kHz.

12. The apparatus of claim 1 wherein the laser source comprises a pulsed fiber laser source.

13. The apparatus of claim 12 wherein the pulsed fiber laser source comprises a seed laser, a pump laser, and a fiber amplifier, and wherein the laser energy model models (1) seed energy for the pulsed fiber laser source over time and (2) energy stored in the fiber amplifier over time.

14. The apparatus of claim 1 wherein the energy requirements include a minimum laser pulse energy.

15. The apparatus of claim 14 wherein the minimum laser pulse energy is non-uniform for the upcoming laser pulse shots.

16. The apparatus of claim 1 wherein a plurality of the energy requirements are based on a plurality of range estimates for a plurality of range points in the field of view that are to be targeted by a plurality of the upcoming laser pulse shots.

17. The system of claim 1 wherein the circuit also schedules the upcoming laser pulse shots based on (1) an eye safety model as compared to a plurality of eye safety requirements and/or (2) a camera safety model as compared to a plurality of camera safety requirements.

18. The apparatus of claim 1 wherein the circuit comprises (1) a system controller and (2) a beam scanner controller;
wherein the system controller schedules the upcoming laser pulse shots using the laser energy model; and
wherein the beam scanner controller provides firing commands to the laser source in accordance with the scheduled upcoming laser pulse shots.

19. A method comprising:
scanning a mirror through a plurality of scan angles over time;
scheduling a variable rate firing of a plurality of upcoming laser pulse shots by a laser source using a laser energy model as compared to a plurality of energy requirements applicable to the upcoming laser pulse shots, wherein the upcoming laser pulse shots are to target a plurality of range points in a field of view, and wherein the laser energy model takes into consideration a retention of energy in the laser source after the upcoming laser pulse shots are fired and quantitatively predicts available energy amounts for the upcoming laser pulse shots from the laser source based on a history of prior laser pulse shots by the laser source; and
firing a plurality of laser pulse shots from the laser source in accordance with the scheduling, wherein the fired laser pulse shots are directed by the scanning mirror toward the targeted range points.

20. An article of manufacture for control of a lidar system that includes a laser source and a scannable mirror, the article comprising:
machine-readable code that is resident on a non-transitory machine-readable storage medium, wherein the code defines processing operations to be performed by a processor to cause the processor to:
schedule a variable rate firing of a plurality of upcoming laser pulse shots by a laser source using a laser energy model as compared to a plurality of energy requirements applicable to the upcoming laser pulse shots, wherein the upcoming laser pulse shots are to target a plurality of range points in a field of view, and wherein the laser energy model takes into consideration a retention of energy in the laser source after the upcoming laser pulse shots are fired and quantitatively predicts available energy amounts for the upcoming laser pulse shots from the laser source based on a history of prior laser pulse shots by the laser source; and
provide a plurality of firing commands to the laser source so that the laser source fires a plurality of laser pulse shots in accordance with the scheduled variable rate firing of the upcoming laser pulse shots, wherein the fired laser pulse shots are directed by the scannable mirror toward the targeted range points.

* * * * *